(12) United States Patent
Kim et al.

(10) Patent No.: US 10,887,057 B2
(45) Date of Patent: Jan. 5, 2021

(54) METHOD AND APPARATUS FOR PERFORMING LIGHT CONNECTION IN WIRELESS COMMUNICATION SYSTEM

(71) Applicant: Samsung Electronics Co., Ltd., Gyeonggi-do (KR)

(72) Inventors: Soenghun Kim, Suwon-si (KR); Jaehyuk Jang, Suwon-si (KR); Donggun Kim, Seoul (KR); Sangbum Kim, Suwon-si (KR); Alexander Sayenko, Seoul (KR); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 15/594,395

(22) Filed: May 12, 2017

(65) Prior Publication Data

US 2017/0332419 A1 Nov. 16, 2017

(30) Foreign Application Priority Data

May 12, 2016 (KR) .................. 10-2016-0058340
May 17, 2016 (KR) .................. 10-2016-0060337

(51) Int. Cl.
*H04L 1/18* (2006.01)
*H04W 72/04* (2009.01)
(Continued)

(52) U.S. Cl.
CPC .......... *H04L 1/1861* (2013.01); *H04L 1/1887* (2013.01); *H04L 1/1896* (2013.01);
(Continued)

(58) Field of Classification Search
CPC ............ H04W 76/02; H04W 74/0833; H04W 72/042; H04W 76/27; H04L 1/1861; H04L 1/1896; H04L 1/1887
See application file for complete search history.

(56) References Cited

U.S. PATENT DOCUMENTS 8,448,037 B2  5/2013  Bergquist et al.
2010/0260130 A1  10/2010  Earnshaw et al.
(Continued)

FOREIGN PATENT DOCUMENTS

EP  2223456 A1  9/2010
EP  2264936 A2  12/2010
KR  10-2016-0048651 A  5/2016

OTHER PUBLICATIONS

ISA/KR, "International Search Report," Application No. PCT/KR2017/004947, dated Aug. 18, 2017, 3 pages.
(Continued)

*Primary Examiner* — Walter J Divito
*Assistant Examiner* — Anthony Luo

(57) ABSTRACT

The present disclosure relates to a communication technology and system for integrating a 5G communication system with IoT technologies to achieve a data rate higher than those of 4G systems. The present disclosure is applicable to intelligent services based on the 5G communication technologies and IoT technologies (e.g., smart home, smart building, smart city, smart car or connected car, health care, digital education, retail business, and security and safety services). The present disclosure proposes a method for supporting a light connected mode as a new terminal operation mode in addition to the idle mode and connected mode to facilitate operations of the terminals and base stations in a mobile communication system.

18 Claims, 30 Drawing Sheets

(51) Int. Cl.
H04W 74/08 (2009.01)
H04W 76/27 (2018.01)

(52) U.S. Cl.
CPC ..... *H04W 72/042* (2013.01); *H04W 74/0833* (2013.01); *H04W 76/27* (2018.02)

(56) References Cited

U.S. PATENT DOCUMENTS

| | | | |
|---|---|---|---|
| 2014/0241318 A1* | 8/2014 | Zhong | H04W 74/0833 370/331 |
| 2015/0163790 A1* | 6/2015 | Lee | H04L 1/0025 370/329 |
| 2015/0381320 A1 | 12/2015 | Khan et al. | |
| 2016/0119975 A1 | 4/2016 | Van Der Velde et al. | |
| 2017/0223673 A1* | 8/2017 | Dinan | H04W 72/042 |
| 2017/0303317 A1* | 10/2017 | Islam | H04W 74/0833 |
| 2017/0373745 A1* | 12/2017 | Park | H04B 7/0456 |
| 2018/0278378 A1* | 9/2018 | Suzuki | H04L 1/1861 |
| 2019/0173623 A1* | 6/2019 | Khosravirad | H04L 1/0079 |

OTHER PUBLICATIONS

Cipriano, Antonio Maria, et al., "Overview of ARQ and HARQ in beyond 3G systems," IEEE, Dec. 17, 2010, 8 pages.

Supplementary European Search Report dated Mar. 28, 2019 in connection with European Patent Application No. 17 79 6426, 8 pages.

* cited by examiner

MO case

METHOD AND APPARATUS FOR PERFORMING LIGHT CONNECTION IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed on May 12, 2016 in the Korean Intellectual Property Office and assigned Serial number 10-2016-0058340 and a Korean patent application filed on May 17, 2016 in the Korean Intellectual Property Office and assigned Serial number 10-2016-0060337, the entire disclosure of which is hereby incorporated by reference.

TECHNICAL FIELD

The present disclosure relates to a method and apparatus for facilitating operations of terminals and base stations in a mobile communication system.

BACKGROUND

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long Term Evolution (LTE) system. Consideration is being given to implementing the 5G communication system in millimeter wave (mmWave) frequency bands (e.g., 60 GHz bands) to accomplish higher data rates. In order to increase the propagation distance by mitigating propagation loss in the 5G communication system, discussions are underway about various techniques such as beamforming, massive Multiple-Input Multiple Output (MIMO), Full Dimensional MIMO (FD-MIMO), array antenna, analog beamforming, and large scale antenna. Also, in order to enhance network performance of the 5G communication system, developments are underway of various techniques such as evolved small cell, advanced small cell, cloud Radio Access Network (RAN), ultra-dense network, Device to Device (D2D) communication, wireless backhaul, moving network, cooperative communication, Coordinated Multi-Points (CoMP), and interference cancellation. Furthermore, the ongoing research includes the use of Hybrid Frequency Shift Keying (FSK) and Quadrature Amplitude Modulation (QAM) and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

Meanwhile, the Internet is evolving from a human-centric communication network in which information is generated and consumed by humans to the Internet of Things (IoT) in which distributed things or components exchange and process information. The combination of the cloud server-based big data processing technology and the IoT begets Internet of Everything technology. In order to secure the sensing technology, wired/wireless communication and network infrastructure, service interface technology, and security technology required for implementing the IoT, recent research has focused on sensor network, Machine to Machine (M2M), and Machine Type Communication (MTC) technologies. In the IoT environment, it is possible to provide an intelligent internet technology that is capable of collecting and analyzing data generated from connected things to create new values for human life. The IoT can be applied to various fields such as smart home, smart building, smart city, smart car or connected car, smart grid, health care, smart appliance, and smart medical service through legacy Information Technology (IT) and convergence of various industries.

Thus, there are various attempts to apply the IoT to the 5G communication system. For example, the sensor network, Machine to Machine (M2M), and Machine Type Communication (MTC) technologies are implemented by means of the 5G communication technologies such as beamforming, MIMO, and array antenna. The application of the aforementioned cloud RAN as a big data processing technology is an example of convergence between the 5G and IoT technologies.

With the advance of Long-Term Evolution (LTE) and LTE-Advanced technologies, it may be useful to adopt a new operation mode of a terminal in addition to the legacy idle and connected modes for reduction of signaling overhead caused by the conventional handover and paging procedures. There is therefore a need of a method and apparatus for light connection in a mobile communication system.

SUMMARY

To address the above-discussed deficiencies, it is a primary object to provide a method for implementing a light connected mode as a new terminal operation mode, in addition to the legacy idle and connected modes, to facilitate operations of the terminals and base stations in a mobile communication system.

Also, the present disclosure aims to provide a method for a terminal supporting a base station-controlled LTE-WLAN interworking technology to report, in the case where the configuration information received in the RRC_CONNECTED state from the base station is used still in the RRC_IDLE state, a predetermined configuration information to the base station upon transitioning back to the RRC_CONNECTED state.

Also, the present disclosure aims to provide a method for allowing a terminal operating in an uplink asynchronous Hybrid Repeat Request (HARQ) mode to use the uplink resources allocated in the random-access procedure.

Also, the present disclosure aims to provide a procedure and method for allowing a terminal disconnected from a network or operating in an extended coverage mode (NarrowBand IoT (NB-IoT) User Equipment (UE), Bandwidth rescued Low complexity (BL) UE, UE in Coverage Enhancement (CE), or enhanced Machine Type Communication (eMTC UE)) to select and use a Resume ID efficiently for fast reconnection to the network.

Also, the present disclosure aims to provide a method for facilitating semi-persistent scheduling for a terminal supporting Vehicle to Vehicle (V2V) communication in a situation where the V2V message transmission interval and size varies according to the vehicle status and traffic condition.

In one embodiment, a communication method of a first base station in a wireless communication system includes: transmitting to a terminal a message which includes at least one of a resume identifier (id) and paging area (pa) information and instructs the terminal to operate in a light connected mode; and storing a context of the terminal corresponding to the resume id.

Implementations may include one or more of the following features. The method where the resume id identifies the terminal in the light connected mode and the first base station, and the pa information is a list of base stations located in the pa. The method further including: receiving, when the terminal moves to a second base station, a context request message for retrieving the context of the terminal corresponding to the resume id from the second base station; and transmitting a context response message including the context of the terminal to the second base station. The method further including: receiving data from a mobility management entity (mme); and triggering a paging operation to broadcast a paging message within a service area. The method where the resume id identifies the terminal in the light connected mode and the first base station, and the pa information is a list of base stations located in the pa. The method further including: moving to a service area of a second base station located within the pa including the first base station; receiving a paging message from the second base station; and transmitting to the second base station a light connection update message including at least one of the resume id, a message authentication code, and resume cause information. The method where the second base station identifies the first base station using the resume id. The method further including: moving to a service area of a second base station located within a pa different from the pa where the first base station is located; receiving system information including the pa of the second base station from the second base station; and transmitting to the second base station a light connection update message including at least one of the resume id, a message authentication code, and resume cause information. The method where the second base station identifies the first base station using the resume id. The base station where the resume id identifies the terminal in the light connected mode and the first base station, and the pa information is a list of base stations located in the pa. The base station where the controller controls the transceiver to receive, when the terminal moves to a second base station, a context request message for retrieving the context of the terminal corresponding to the resume id from the second base station and to transmit a context response message including the context of the terminal to the second base station. The base station where the controller controls the transceiver to receive data from a mobility management entity (mme) and to trigger a paging operation to broadcast a paging message within a service area. The terminal where the resume id identifies the terminal in the light connected mode and the first base station, and the pa information is a list of base stations located in the pa. The terminal where the controller controls the terminal to move to a service area of a second base station located within the pa including the first base station, to receive a paging message from the second base station, and to transmit to the second base station a light connection update message including at least one of the resume id, a message authentication code, and resume cause information. The terminal where the second base station identifies the first base station using the resume id. The terminal where the controller controls the terminal to move to a service area of a second base station located within a pa different from the pa where the first base station is located, to receive system information including the pa of the second base station from the second base station, and to transmit to the second base station a light connection update message including at least one of the resume id, a message authentication code, and resume cause information. The terminal where the second base station identifies the first base station using the resume id.

In another embodiment, a communication method of a terminal in a wireless communication system includes: receiving a message from a first base station, the message including at least one of a resume identifier (id) and paging area (pa) information and instructs the terminal to operate in a light connected mode; and configuring the light connected mode based on the message.

Implementations may include one or more of the following features. The method where the resume id identifies the terminal in the light connected mode and the first base station, and the pa information is a list of base stations located in the pa. The method further including: moving to a service area of a second base station located within the pa including the first base station; receiving a paging message from the second base station; and transmitting to the second base station a light connection update message including at least one of the resume id, a message authentication code, and resume cause information. The method where the second base station identifies the first base station using the resume id. The method further including: moving to a service area of a second base station located within a pa different from the pa where the first base station is located; receiving system information including the pa of the second base station from the second base station; and transmitting to the second base station a light connection update message including at least one of the resume id, a message authentication code, and resume cause information. The method where the second base station identifies the first base station using the resume id. The base station where the resume id identifies the terminal in the light connected mode and the first base station, and the pa information is a list of base stations located in the pa. The base station where the controller controls the transceiver to receive, when the terminal moves to a second base station, a context request message for retrieving the context of the terminal corresponding to the resume id from the second base station and to transmit a context response message including the context of the terminal to the second base station. The base station where the controller controls the transceiver to receive data from a mobility management entity (mme) and to trigger a paging operation to broadcast a paging message within a service area. The terminal where the resume id identifies the terminal in the light connected mode and the first base station, and the pa information is a list of base stations located in the pa. The terminal where the controller controls the terminal to move to a service area of a second base station located within the pa including the first base station, to receive a paging message from the second base station, and to transmit to the second base station a light connection update message including at least one of the resume id, a message authentication code, and resume cause information. The terminal where the second base station identifies the first base station using the resume id. The terminal where the controller controls the terminal to move to a service area of a second base station located within a pa different from the pa where the first base station is located, to receive system information including the pa of the second base station from the second base station, and to transmit to the second base station a light connection update message including at least one of the resume id, a message authentication code, and resume cause information. The terminal where the second base station identifies the first base station using the resume id.

In a further embodiment, a base station of a wireless communication system includes: a transceiver; and a controller which controls the transceiver to transmit and receive signals, to transmit to a terminal a message which includes at least one of a resume identifier (id) and paging area (pa) information and instructs the terminal to operate in a light connected mode, and to store a context of the terminal corresponding to the resume id.

Implementations may include one or more of the following features. The base station where the resume id identifies the terminal in the light connected mode and the first base station, and the pa information is a list of base stations located in the pa. The base station where the controller controls the transceiver to receive, when the terminal moves to a second base station, a context request message for retrieving the context of the terminal corresponding to the resume id from the second base station and to transmit a context response message including the context of the terminal to the second base station. The base station where the controller controls the transceiver to receive data from a mobility management entity (mme) and to trigger a paging operation to broadcast a paging message within a service area. The terminal where the resume id identifies the terminal in the light connected mode and the first base station, and the pa information is a list of base stations located in the pa. The terminal where the controller controls the terminal to move to a service area of a second base station located within the pa including the first base station, to receive a paging message from the second base station, and to transmit to the second base station a light connection update message including at least one of the resume id, a message authentication code, and resume cause information. The terminal where the second base station identifies the first base station using the resume id. The terminal where the controller controls the terminal to move to a service area of a second base station located within a pa different from the pa where the first base station is located, to receive system information including the pa of the second base station from the second base station, and to transmit to the second base station a light connection update message including at least one of the resume id, a message authentication code, and resume cause information. The terminal where the second base station identifies the first base station using the resume id.

In yet another embodiment, a terminal of a wireless communication system includes: a transceiver; and a controller which controls the transceiver to receive a message from a first base station, the message including at least one of a resume identifier (id) and paging area (pa) information and instructs the terminal to operate in a light connected mode, and configures the light connected mode based on the message.

Implementations may include one or more of the following features. The terminal where the resume id identifies the terminal in the light connected mode and the first base station, and the pa information is a list of base stations located in the pa. The terminal where the controller controls the terminal to move to a service area of a second base station located within the pa including the first base station, to receive a paging message from the second base station, and to transmit to the second base station a light connection update message including at least one of the resume id, a message authentication code, and resume cause information. The terminal where the second base station identifies the first base station using the resume id. The terminal where the controller controls the terminal to move to a service area of a second base station located within a pa different from the pa where the first base station is located, to receive system information including the pa of the second base station from the second base station, and to transmit to the second base station a light connection update message including at least one of the resume id, a message authentication code, and resume cause information. The terminal where the second base station identifies the first base station using the resume id.

In one embodiment, an uplink transmission method of a terminal includes: transmitting to a base station a first message including a random access preamble for connection to the base station; receiving a second message related to resource allocation from the base station in response to the random access preamble; and transmitting, if the terminal is configured to use asynchronous hybrid automatic repeat request (harq), a third message with a fixed harq process identifier in response to the second message.

Implementations may include one or more of the following features. The method where the fixed harq process identifier is set to 0. The method further including receiving a physical downlink control channel (pdcch) from the base station to determine whether the third message is successfully arrived at the base station. The method further including determining whether the third message is successfully arrived at the base station based on the fixed harq process identifier and a new data indicator (ndi) included in the pdcch. The method further including retransmitting, if the third message is not successfully arrived at the base station, the third message with the fixed harq process identifier to the base station. The method where the fixed harq process identifier is set to 0. The method further including transmitting a physical downlink control channel (pdcch) for the terminal to determine whether the third message is successfully arrived at the base station. The method where whether the third message is successfully arrived at the base station is determined based on the fixed harq process identifier and a new data indicator (ndi) included in the pdcch. The method further including receiving, when the third message is not successfully arrived at the base station, the third message which the terminal retransmits with the fixed harq process identifier. The terminal where the fixed harq process identifier is set to 0. The terminal where the controller controls the transceiver to receive a physical downlink control channel (pdcch) from the base station to determine whether the third message is successfully arrived at the base station. The terminal where the controller determines whether the third message is successfully arrived at the base station based on the fixed harq process identifier and a new data indicator (ndi) included in the pdcch. The terminal where the controller controls the transceiver to retransmit, if the third message is not successfully arrived at the base station, the third message with the fixed harq process identifier to the base station. The base station where the fixed harq process identifier is set to 0. The base station where the controller controls the transceiver to transmit a physical downlink control channel (pdcch) for the terminal to determine whether the third message is successfully arrived at the base station. The base station where whether the third message is successfully arrived at the base station is determined based on the fixed harq process identifier and a new data indicator (ndi) included in the pdcch. The base station where the controller the transceiver to receive, when the third message is not successfully arrived at the base station, the third message which the terminal retransmits with the fixed harq process identifier.

In another embodiment, an uplink reception method of a base station includes: receiving a first message transmitted by a terminal, the first message including a random access preamble for connection to the base station; transmitting a second message related to resource allocation to the terminal in response to the random access preamble; and receiving, if the terminal is configured to use asynchronous hybrid automatic repeat request (harq), a third message with a fixed harq process identifier from the terminal in response to the second message.

Implementations may include one or more of the following features. The method where the fixed harq process identifier is set to 0. The method further including transmitting a physical downlink control channel (pdcch) for the terminal to determine whether the third message is successfully arrived at the base station. The method where whether the third message is successfully arrived at the base station is determined based on the fixed harq process identifier and a new data indicator (ndi) included in the pdcch. The method further including receiving, when the third message is not successfully arrived at the base station, the third message which the terminal retransmits with the fixed harq process identifier. The terminal where the fixed harq process identifier is set to 0. The terminal where the controller controls the transceiver to receive a physical downlink control channel (pdcch) from the base station to determine whether the third message is successfully arrived at the base station. The terminal where the controller determines whether the third message is successfully arrived at the base station based on the fixed harq process identifier and a new data indicator (ndi) included in the pdcch. The terminal where the controller controls the transceiver to retransmit, if the third message is not successfully arrived at the base station, the third message with the fixed harq process identifier to the base station. The base station where the fixed harq process identifier is set to 0. The base station where the controller controls the transceiver to transmit a physical downlink control channel (pdcch) for the terminal to determine whether the third message is successfully arrived at the base station. The base station where whether the third message is successfully arrived at the base station is determined based on the fixed harq process identifier and a new data indicator (ndi) included in the pdcch. The base station where the controller the transceiver to receive, when the third message is not successfully arrived at the base station, the third message which the terminal retransmits with the fixed harq process identifier.

In yet another embodiment, a terminal for performing uplink transmission includes: a transceiver which transmits and receives signals; a controller which controls the transceiver to transmit to a base station a first message including a random access preamble for connection to the base station, to receive a second message related to resource allocation from the base station in response to the random access preamble, and to transmit, if the terminal is configured to use asynchronous hybrid automatic repeat request (harq), a third message with a fixed harq process identifier in response to the second message.

Implementations may include one or more of the following features. The terminal where the fixed harq process identifier is set to 0. The terminal where the controller controls the transceiver to receive a physical downlink control channel (pdcch) from the base station to determine whether the third message is successfully arrived at the base station. The terminal where the controller determines whether the third message is successfully arrived at the base station based on the fixed harq process identifier and a new data indicator (ndi) included in the pdcch. The terminal where the controller controls the transceiver to retransmit, if the third message is not successfully arrived at the base station, the third message with the fixed harq process identifier to the base station. The base station where the fixed harq process identifier is set to 0. The base station where the controller controls the transceiver to transmit a physical downlink control channel (pdcch) for the terminal to determine whether the third message is successfully arrived at the base station. The base station where whether the third message is successfully arrived at the base station is determined based on the fixed harq process identifier and a new data indicator (ndi) included in the pdcch. The base station where the controller the transceiver to receive, when the third message is not successfully arrived at the base station, the third message which the terminal retransmits with the fixed harq process identifier.

In a further embodiment, a base station for performing uplink reception includes: a transceiver which transmits and receives signals; and a controller which controls the transceiver to receive a first message transmitted by a terminal, the first message including a random access preamble for connection to the base station, to transmit a second message related to resource allocation to the terminal in response to the random access preamble, and to receive, if the terminal is configured to use asynchronous hybrid automatic repeat request (harq), a third message with a fixed harq process identifier from the terminal in response to the second message.

Implementations may include one or more of the following features. The base station where the fixed harq process identifier is set to 0. The base station where the controller controls the transceiver to transmit a physical downlink control channel (pdcch) for the terminal to determine whether the third message is successfully arrived at the base station. The base station where whether the third message is successfully arrived at the base station is determined based on the fixed harq process identifier and a new data indicator (ndi) included in the pdcch. The base station where the controller the transceiver to receive, when the third message is not successfully arrived at the base station, the third message which the terminal retransmits with the fixed harq process identifier.

In one embodiment, a radio resource control (rrc) configuration method of a first base station in a wireless communication system includes: determining whether to suspend an rrc connection with a terminal; and transmitting, if determined to suspend the rrc connection, an rrc connection release message (rrcconnectionrelease) including a resume identifier (id) related to a context of the terminal to the terminal, where the context of the terminal is stored in association with the resume id included in the rrc connection release message.

Implementations may include one or more of the following features. The method further including receiving, if determined to resume the rrc connection, an rrc connection resume request message including at least one of the resume id, a message authentication code, and resume cause information from the terminal. The method further including transmitting, if the terminal is successfully identified with the resume id, an rrc connection resume message for resuming the rrc connection to the terminal in response to the rrc connection resume request message. The method further including transmitting, if the terminal is not successfully identified with the resume id, an rrc connection setup message (rrcconnectionsetup) to the terminal. The method where the resume id included in the rrc connection resume request message is one of a first resume id with a first size and a second resume id with a second size smaller than the first size. The method where each of the first and second resume ids includes a first part for identifying the first base station and a second part for identifying the terminal. The method further including: receiving, if the terminal establishes an rrc connection with a second base station, a context request message for retrieving a context of the terminal corresponding to the resume id from the second base station; and transmitting a context response message including the context of the terminal to the second base station. The method further including transmitting system information to the terminal, the system information including at least one of resume id type information indicating types of the resume ids supported in a cell, control plane-based (cp-based) scheme supportability information, and user plane-based (up-based) scheme supportability information. The method further including transmitting, if determined to resume the rrc connection, an rrc connection resume request message including at least one of the resume id, a message authentication code, and resume cause information to the base station. The method further including receiving, when the terminal is successfully identified with the resume id, an rrc connection resume message for resuming the rrc connection from the base station in response to the rrc connection resume request message. The method further including receiving, when the terminal is not successfully identified with the resume id, an rrc connection setup message (rrc-connectionsetup) from the base station. The method where the resume id included in the rrc connection resume request message is one of a first resume id with a first size and a second resume id with a second size smaller than the first size. The method where each of the first and second resume ids includes a first part for identifying the first base station and a second part for identifying the terminal. The base station where the controller controls the transceiver to receive, if determined to resume the rrc connection, an rrc connection resume request message including at least one of the resume id, a message authentication code, and resume cause information from the terminal. The base station where the controller controls the transceiver to receive, if the terminal establishes an rrc connection with a second base station, a context request message for retrieving a context of the terminal corresponding to the resume id from the second base station and to transmit a context response message including the context of the terminal to the second base station. The method further including system information from the base station, the system information including at least one of resume id type information indicating types of the resume ids supported in a cell, control plane-based (cp-based) scheme supportability information, and user plane-based (up-based) scheme supportability information. The terminal where the controller controls the transceiver to transmit, if determined to resume the rrc connection, an rrc connection resume request message including at least one of the resume id, a message authentication code, and resume cause information to the base station, the resume id included in the rrc connection resume request message is one of a first resume id with a first size and a second resume id with a second size smaller than the first size, and each of the first and second resume ids includes a first part for identifying the first base station and a second part for identifying the terminal.

In another embodiment, a radio resource control (rrc) configuration method of a terminal in a wireless communication system includes: receiving, when determined to suspend an rrc connection with a base station, a rrc connection release message (rrcconnectionrelease) including a resume identifier (id) related to a context of the terminal from the base station; and storing the context of the terminal corresponding to the resume id included in the rrc connection release message.

Implementations may include one or more of the following features. The method further including transmitting, if determined to resume the rrc connection, an rrc connection resume request message including at least one of the resume id, a message authentication code, and resume cause information to the base station. The method further including receiving, when the terminal is successfully identified with the resume id, an rrc connection resume message for resuming the rrc connection from the base station in response to the rrc connection resume request message. The method further including receiving, when the terminal is not successfully identified with the resume id, an rrc connection setup message (rrcconnectionsetup) from the base station. The method where the resume id included in the rrc connection resume request message is one of a first resume id with a first size and a second resume id with a second size smaller than the first size. The method where each of the first and second resume ids includes a first part for identifying the first base station and a second part for identifying the terminal. The base station where the controller controls the transceiver to receive, if determined to resume the rrc connection, an rrc connection resume request message including at least one of the resume id, a message authentication code, and resume cause information from the terminal. The base station where the controller controls the transceiver to receive, if the terminal establishes an rrc connection with a second base station, a context request message for retrieving a context of the terminal corresponding to the resume id from the second base station and to transmit a context response message including the context of the terminal to the second base station. The method further including system information from the base station, the system information including at least one of resume id type information indicating types of the resume ids supported in a cell, control plane-based (cp-based) scheme supportability information, and user plane-based (up-based) scheme supportability information. The terminal where the controller controls the transceiver to transmit, if determined to resume the rrc connection, an rrc connection resume request message including at least one of the resume id, a message authentication code, and resume cause information to the base station, the resume id included in the rrc connection resume request message is one of a first resume id with a first size and a second resume id with a second size smaller than the first size, and each of the first and second resume ids includes a first part for identifying the first base station and a second part for identifying the terminal.

In yet another embodiment, a base station for performing radio resource control (rrc) configuration in a wireless communication system includes: a transceiver; and a controller which controls the transceiver to transmits and receives signals, determines whether to suspend an rrc connection with a terminal, and controls the transceiver to transmit, if determined to suspend the rrc connection, an rrc connection release message (rrcconnectionrelease) including a resume identifier (id) related to a context of the terminal to the terminal, where the context of the terminal is stored in association with the resume id included in the rrc connection release message.

Implementations may include one or more of the following features. The base station where the controller controls the transceiver to receive, if determined to resume the rrc connection, an rrc connection resume request message including at least one of the resume id, a message authentication code, and resume cause information from the terminal. The base station where the controller controls the transceiver to receive, if the terminal establishes an rrc connection with a second base station, a context request message for retrieving a context of the terminal corresponding to the resume id from the second base station and to transmit a context response message including the context of the terminal to the second base station. The method further including system information from the base station, the system information including at least one of resume id type information indicating types of the resume ids supported in a cell, control plane-based (cp-based) scheme supportability information, and user plane-based (up-based) scheme supportability information. The terminal where the controller controls the transceiver to transmit, if determined to resume the rrc connection, an rrc connection resume request message including at least one of the resume id, a message authentication code, and resume cause information to the base station, the resume id included in the rrc connection resume request message is one of a first resume id with a first size and a second resume id with a second size smaller than the first size, and each of the first and second resume ids includes a first part for identifying the first base station and a second part for identifying the terminal.

In a further embodiment, a terminal for perform radio resource control (rrc) configuration in a wireless communication system includes: a transceiver; and a controller which controls the transceiver to transmit and receive signals and, when determined to suspend an rrc connection with a base station, to receive a rrc connection release message (rrcconnectionrelease) including a resume identifier (id) related to a context of the terminal from the base station and which control the terminal to store the context of the terminal corresponding to the resume id included in the rrc connection release message.

Implementations may include one or more of the following features. The method further including system information from the base station, the system information including at least one of resume id type information indicating types of the resume ids supported in a cell, control plane-based (cp-based) scheme supportability information, and user plane-based (up-based) scheme supportability information. The terminal where the controller controls the transceiver to transmit, if determined to resume the rrc connection, an rrc connection resume request message including at least one of the resume id, a message authentication code, and resume cause information to the base station, the resume id included in the rrc connection resume request message is one of a first resume id with a first size and a second resume id with a second size smaller than the first size, and each of the first and second resume ids includes a first part for identifying the first base station and a second part for identifying the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
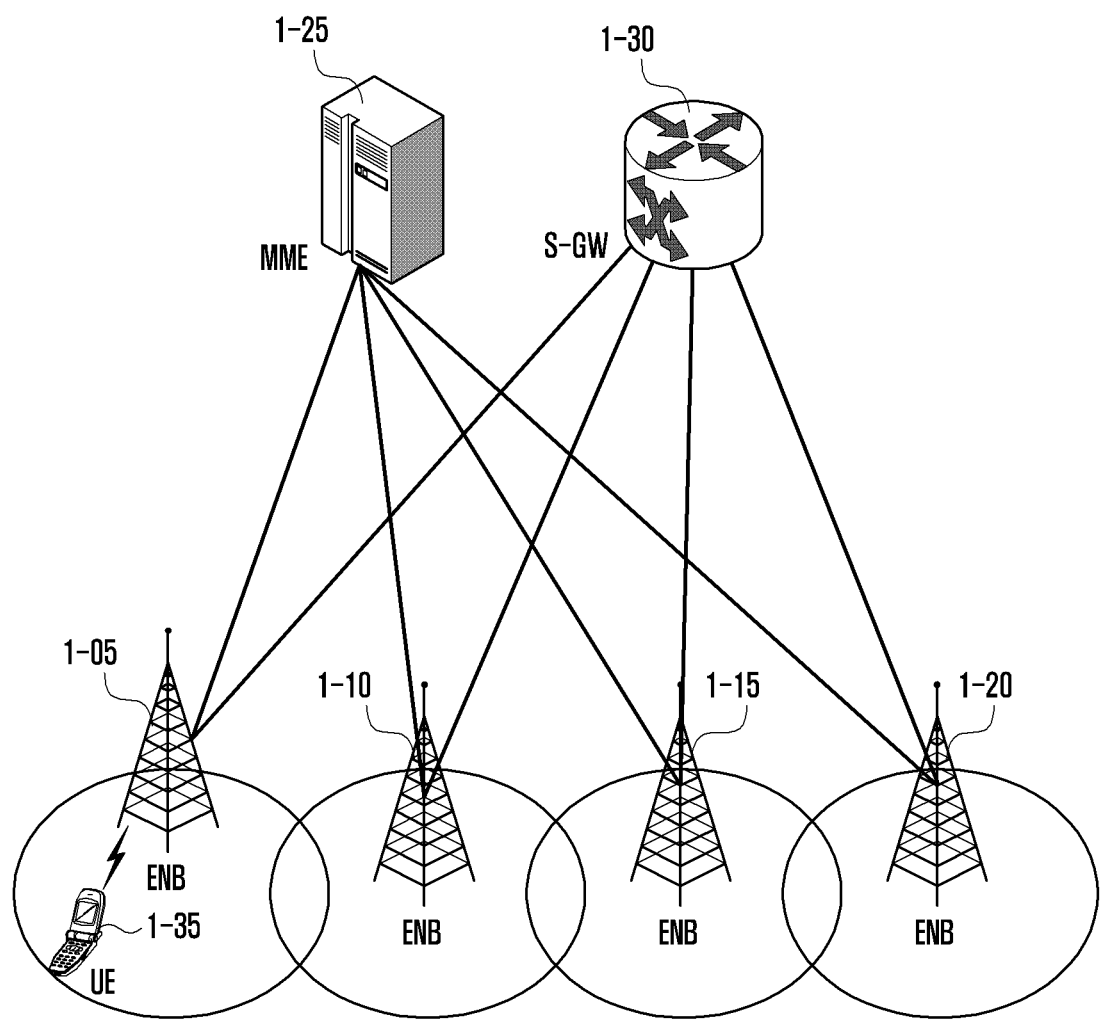
FIG. 1 is a diagram illustrating architecture of an LTE system to which the first embodiment of the present disclosure is applied.

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Exemplary embodiments of the present disclosure are described with reference to the accompanying drawings in detail. Detailed description of well-known functions and structures incorporated herein may be omitted to avoid obscuring the subject matter of the present disclosure. Further, the following terms are defined in consideration of the functionality in the present disclosure, and may vary according to the intention of a user or an operator, usage, etc. Therefore, the definition should be made on the basis of the overall content of the present specification.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce manufacture articles embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

First Embodiment

The first embodiment of the present disclosure proposes a method for supporting a light connected mode as a new terminal operation mode in addition to the legacy idle and connected modes for improving operation efficiency of terminals and base station in a mobile communication system.

FIG. 1 is a diagram illustrating architecture of an LTE system to which the first embodiment of the present disclosure is applied.

In reference to FIG. 1, the Radio Access Network of the LTE system includes next generation base stations (evolved Node Bs (eNBs)) 1-05, 1-10, 1-15, and 1-20; a Mobility Management Entity (MME) 1-25; and a Serving Gateway (S-GW) 1-30. A user terminal (User Equipment (UE)) 1-35 connects to an external network via the eNBs 1-05, 1-10, 1-15, and 1-20 and the S-GW 1-30.

In FIG. 1, the eNBs 1-05, 1-10, 1-15, and 1-20 are equivalent to a legacy node B of the universal mobile telecommunications system (UMTS). The UE 1-35 connects to one of the eNBs 1-05, 1-10, 1-15, and 1-20 via a radio channel, and the eNBs 1-05, 1-10, 1-15, and 1-20 are more complex in functionality than the legacy node B. In the LTE system where all user traffic including real time services such as Voice over IP (VoIP) is served through share channels, it is beneficial to schedule UEs based on scheduling information such as buffer status, power headroom status, and channel status collected from the UEs, an eNB serving the UEs takes charge of this function.

Typically, one eNB hosts a plurality of cells. For example, the LTE system adopts Orthogonal Frequency Division Multiplexing (OFDM) as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 1-30 as an entity handling bearers establishes and releases data bearers under the control of the MME 1-25. The MME 1-25 takes charge of various control functions and maintains connections with a plurality of eNBs.

Figure 2:
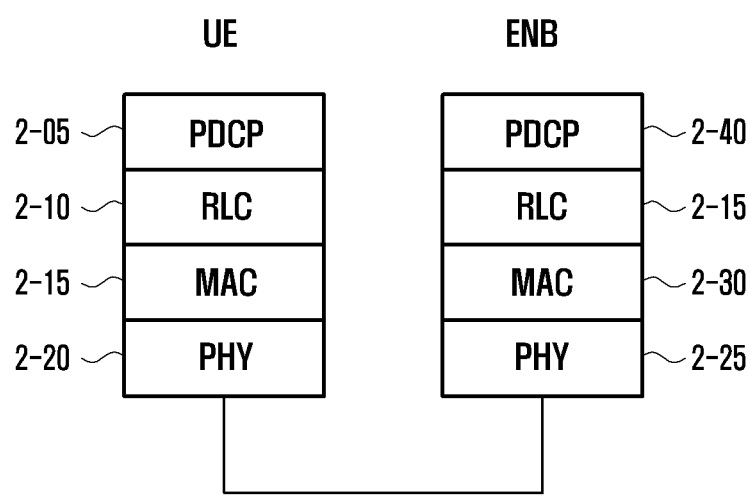
FIG. 2 is a diagram illustrating a protocol stack of an interface between UE and an eNB in an LTE system to which the first embodiment of the present disclosure is applied.

FIG. 2 is a diagram illustrating a protocol stack of an interface between UE and an eNB in an LTE system to which the first embodiment of the present disclosure is applied.

In reference to FIG. 2, the protocol stack of the interface between the UE and the eNB includes a plurality of protocol layers stacked from the bottom to the top: physical layer denoted by reference numbers 2-20 and 2-25, medium access control (MAC) layer denoted by reference numbers 2-15 and 2-30, radio link control (RLC) layer denoted by reference numbers 2-10 and 2-35, and packet data convergence protocol (PDCP) layer denoted by reference numbers 2-05 and 2-40. The PDCP layer denoted by reference numbers 2-05 and 2-40 takes charge of compressing/decompressing an IP header, and the RLC layer denoted by reference numbers 2-10 and 2-15 takes charge of segmenting a PDCP Packet Data Unit (PDU) into segments of appropriate size. The MAC layer denoted by reference number 2-15 and 2-30 allows for connection of multiple RLC entities and takes charge of multiplexing RLC PDUs from the RLC layer into a MAC PDU and demultiplexing a MAC PDU into RLC PDUs. The PHY layer denoted by reference numbers 2-20 and 2-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 3:
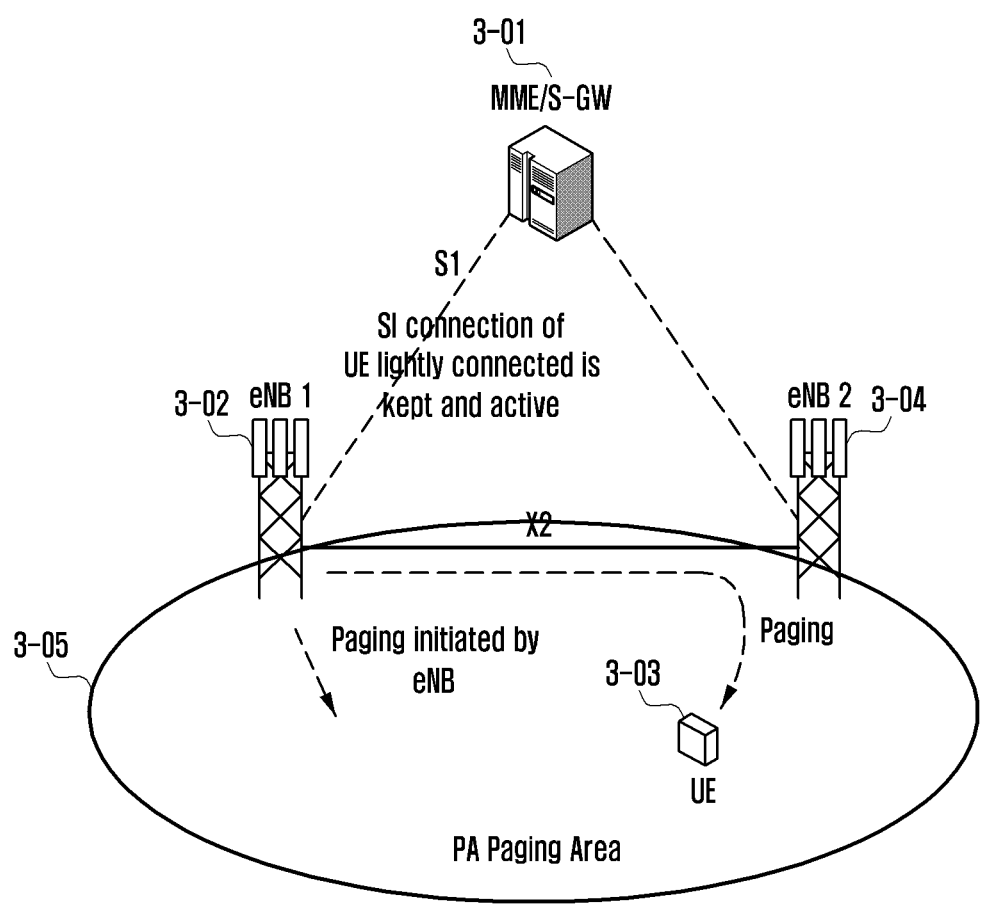
FIG. 3 is a diagram illustrating a configuration of a PA for explaining the concept of light connection.

FIG. 3 is a diagram illustrating a configuration of a Paging Area (PA) for explaining the concept of light connection. The light connection technique is introduced to define a new UE operation mode in addition to the legacy idle and connected modes to reduce signaling overhead caused by legacy handover and paging operations. The terminal 3-03 in the light connected mode is characterized by the S1 connections kept between the MME 3-01 and the eNBs 3-02 and 3-04 and in that one of the MME 3-01 and the eNBs 3-02 and 3-04 triggers paging.

The MME 3-01 assumes that the UE in the light connected mode is operating in the connected mode and thus, if there is any data to transmit to the UE, the MME 3-01 transmits the data to the eNB without triggering a paging procedure. If the data are received, the eNB transmits a paging message to all eNBs within the PA 3-05 such that the eNBs broadcast the paging message.

The present disclosure proposes UE and network operations in a Mobile Termination (MT) or Mobile Originating (MO) transfer or PA change situation in consideration of the above-described characteristics of light connection.

Figure 4:
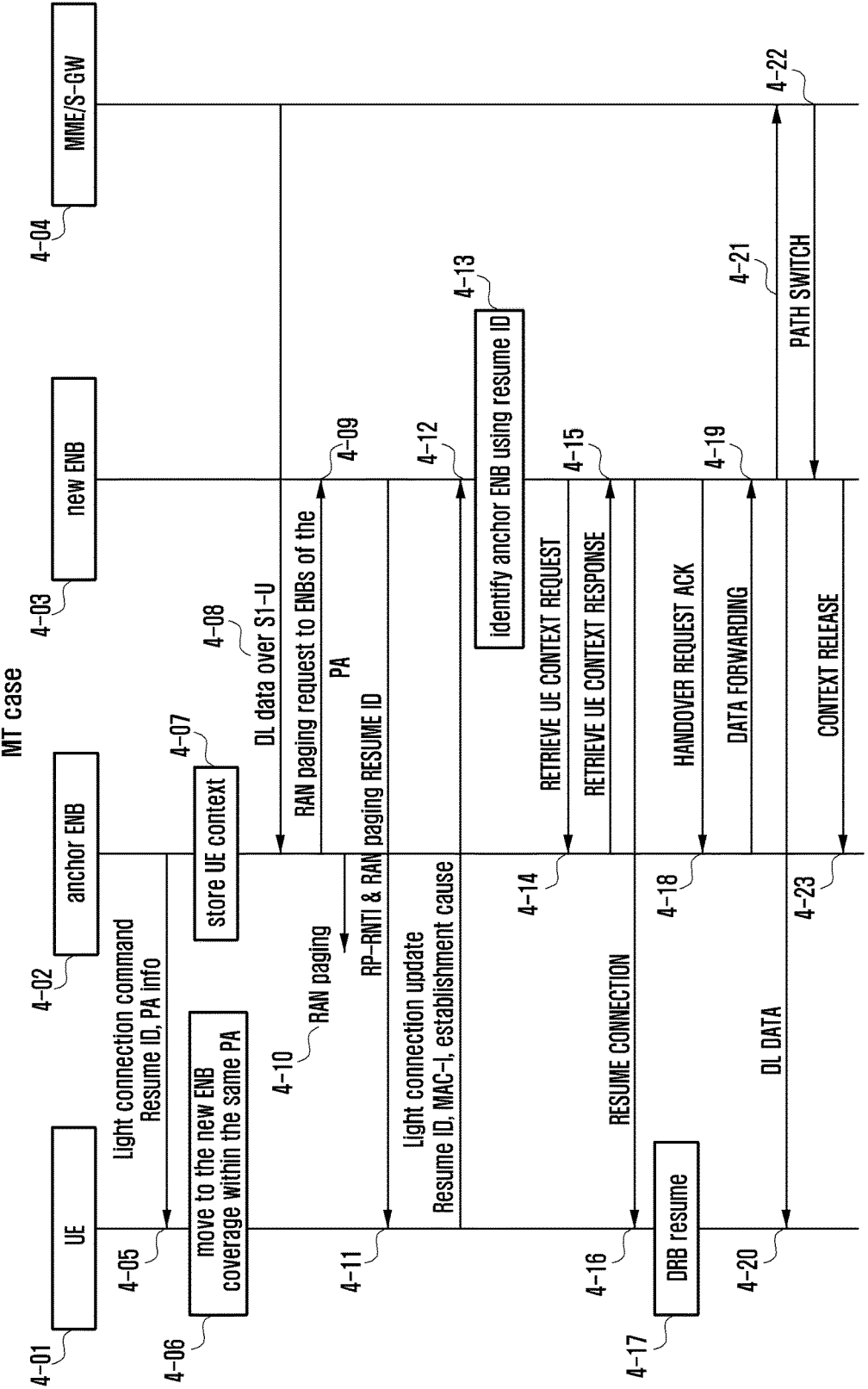
FIG. 4 is a signal flow diagram illustrating a procedure of transmitting MT data to a UE according to the first embodiment of the present disclosure.

FIG. 4 is a signal flow diagram illustrating a procedure of transmitting MT data to a UE according to the first embodiment of the present disclosure. The UE 4-01 in the connected state (or mode) to the Anchor eNB 4-02 receives a light connection command from the anchor eNB 4-02 at step 4-05. The light connection command may be used to instruct the UE 4-01 to transition to the light connected mode and include at least one of a resume ID and PA information.

The resume ID may be used as an identifier for identifying a UE in the light connected mode. The resume ID may also be associated with the eNB transmitting the light connection command. The resume ID is unique in a predetermined area, i.e., PA. An example of the PA information is a list of eNBs forming a PA. The PA information is described later in more detail.

The anchor eNB 4-02 may store the UE context of the UE 4-01 at step 4-07. The UE 4-01 may move to a new eNB 4-03 within the same PA at step 4-06. If the MME 4-04 has any MT data (or downlink data) to transmit to the UE 4-01, it transmits the data to the anchor eNB 4-02 at step 4-08.

The MME 4-04 transmits to the anchor eNB 4-02 the MT data rather than a paging request because it regards the UE 4-01 in the light connected mode as a UE in the connected mode.

If the MT data is received, the anchor eNB 4-02 triggers a paging procedure to broadcast a paging message within its service area (RAN paging) at step 4-10. The anchor eNB 4-02 also transmits the paging message to neighboring eNBs located within the same PA at step 4-09. Upon receipt of the paging message, the neighboring eNBs broadcast the paging message at step 4-11.

One of the important characteristics of the light connection technique is that the paging procedure is triggered by an eNB rather than the MME 4-04. The paging message includes a resume ID for identifying the UE in the light connected mode. The UE 4-01 may determine whether the paging message is destined for the UE 4-01 based on the resume ID. In order to distinguish the eNB-triggered paging from the legacy paging, it may be possible to define a separate Radio Network Temporary Identifier called RP-RNTI.

The UE 4-01 may receive the paging message from a new eNB 4-03 located within the same PA as that in which the anchor eNB 4-02 is located. The UE 4-01 transmits a light connection update message to the new eNB 4-03 at step 4-12.

The light connection update message may include at least one of a resume ID, a Message Authentication Code for Integrity (MAC-I), and an establishment cause. Upon receipt of the light connection update message, the new eNB 4-03 may identify the anchor eNB 4-02 using the resume ID at step 4-13.

Accordingly, the new eNB 4-03 may request to the anchor eNB 4-02 for the UE context of the UE 4-01 at steps 4-14 and 4-15. At this time, it may be possible to use UE CONTEXT REQUEST and UE CONTEXT RESPONSE messages.

The new eNB 4-30 may transmit the UE CONTEXT REQUEST message to the anchor eNB 4-02 to retrieve the UE context of the UE 4-01 from the anchor eNB 4-02. The anchor eNB 4-02 may transmit the UE CONTEXT RESPONSE message including the UE context of the UE 4-01 to the new eNB 4-03 in response to the UE CONTEXT REQUEST message.

The new eNB 4-03 transmits a RESUME CONNECTION message to the UE 4-01 at step 4-16. Upon receipt of the RESUME CONNECTION message, the UE 4-01 reactivates the DRB at step 4-17 to receive MT data. After transmitting the RESUME CONNECTION message, the new eNB 4-03 transmits a HANDOVER REQUEST ACK message to the anchor eNB 4-02 at step 4-18; if the anchor eNB 4-02 has data to forward, it forwards the data to the new eNB 4-03 at step 4-19. The new eNB 4-03 may use the HANDOVER REQUEST ACK message to notify the anchor eNB 4-02 that the UE 4-01 has connected to the new eNB 4-03 for data communication.

Afterward, the new eNB 4-03 which has received a paging response is regarded as a new anchor eNB because the UE 4-01 is out of the service area of the anchor eNB 4-02. The new eNB 4-03 requests to the MME 4-04 for path switch at steps 4-21 and 4-22 and to the anchor eNB 4-02 for context release at step 4-23.

Figure 5:
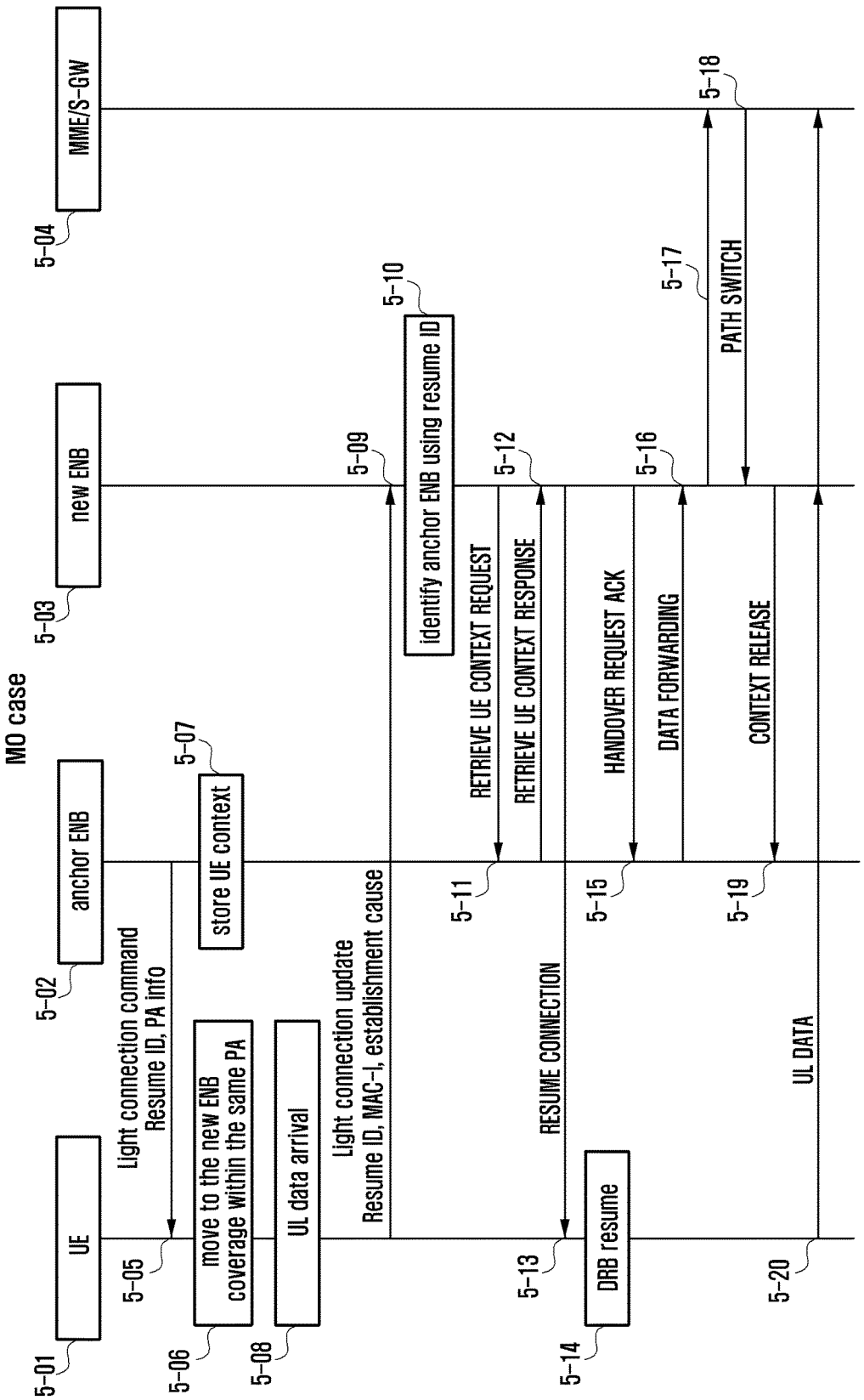
FIG. 5 is a signal flow diagram illustrating a procedure for transmitting MO data to a UE according to the first embodiment of the present.

FIG. 5 is a signal flow diagram illustrating a procedure for transmitting MO data to a UE according to the first embodiment of the present disclosure. The UE 5-01 in the connected state to the Anchor eNB 5-02 receives a light connection command from the anchor eNB 5-02 at step 5-05. Upon receipt of the light connection command, the UE 5-01 transitions to the light connected mode.

The anchor eNB 5-02 stores the UE context of the UE 5-01 at step 5-07. The UE 5-01 may move to a new eNB 5-03 within the same PA at step 5-06. If MO data is generated at the UE 5-01 at step 5-08, the UE 5-01 may move and transmit a light connection update message to the new eNB 5-03 rather than the anchor eNB 5-02 at step 5-09.

The light connection update message may include at least one of a resume ID, a MAC-I, and an establishment cause. Upon receipt of the light connection update message, the new eNB 5-03 may identify the anchor eNB 5-02 based on the resume ID at step 5-10. The new eNB 5-03 may request to the anchor eNB 5-02 for UE context of the UE 5-01 at steps 5-11 and 5-12.

The new eNB 5-03 may transmit a UE CONTEXT REQUEST message to the anchor eNB 5-02 for retrieving the UE context of the UE 5-01 from the anchor eNB 5-02. The anchor eNB 5-02 may transmit a UE CONTEXT RESPONSE message including the UE context of the UE 5-01 in response to the UE CONTEXT REQUEST message.

The new eNB 5-03 transmits a RESUME CONNECTION message to the UE 5-01 at step 5-13. Upon receipt of the RESUME CONNECTION message, the UE 5-01 reactivates the DRB to transmit MO data.

After transmitting the RESUME CONNECTION message, the new eNB 5-03 transmits a HANDOVER REQUEST ACK message to the anchor eNB 5-02 at step 5-15; if the anchor eNB 5-02 has data to forward, it forwards the data to the new eNB 5-03 at step 5-16.

Next, the new eNB 5-03 which has transmitted the RESUME CONNECTION message may be regarded as a new anchor eNB because the UE 5-01 is out of the service area of the anchor eNB 5-02. The new eNB 5-03 requests to the MME/S-GW 5-04 at steps 5-17 and 5-18 and to the anchor eNB 5-02 for context release at step 5-19. Afterward, the UE 5-01 transmit uplink data to the MME/S-GW 5-04 via the new eNB 5-03 at step 5-20.

Figure 6:
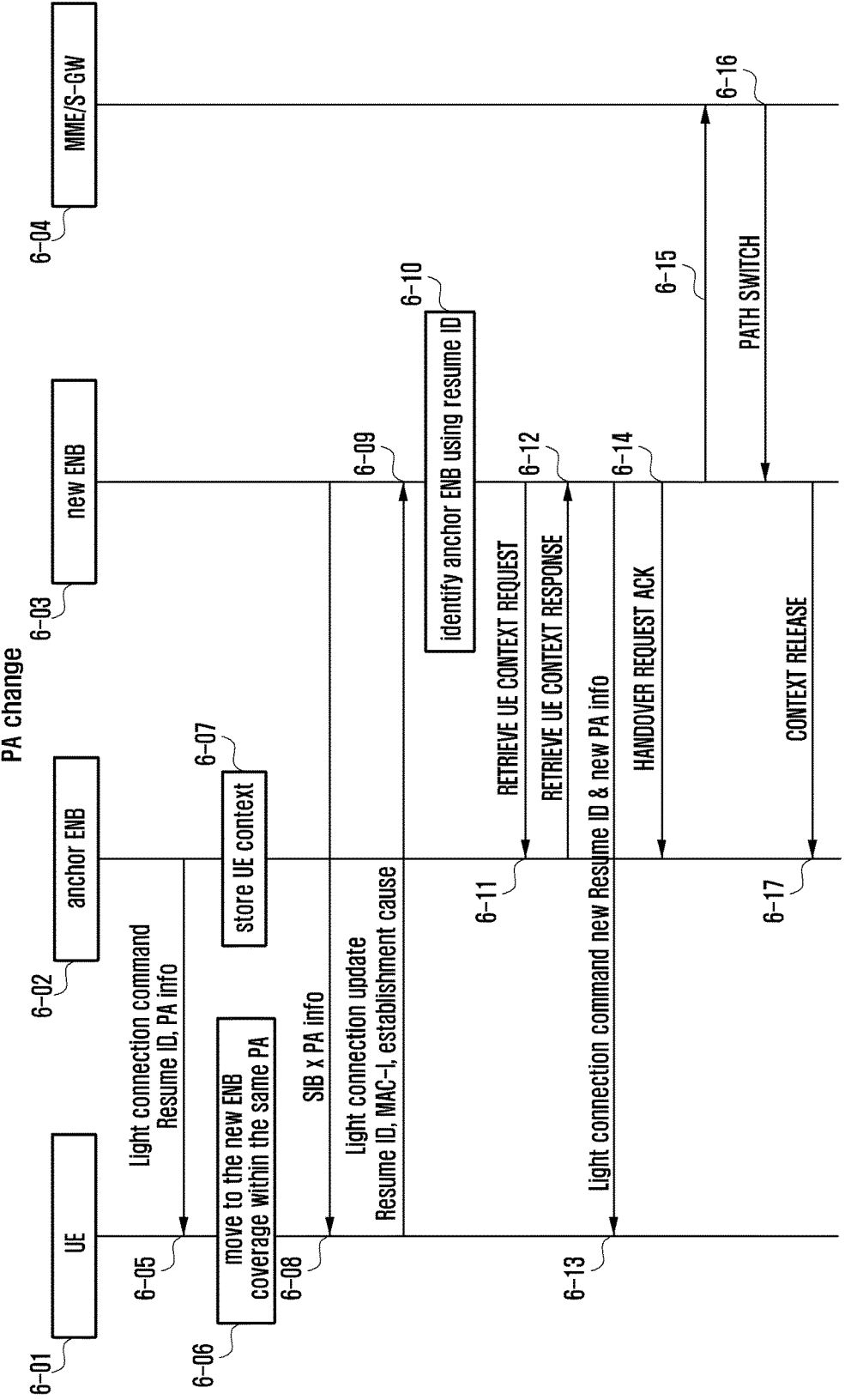
FIG. 6 is a signal flow diagram illustrating a PA change procedure according to the first embodiment of the present disclosure.

FIG. 6 is a signal flow diagram illustrating a PA change procedure according to the first embodiment of the present disclosure. The UE 6-01 in the connected state to the anchor eNB 6-02 receives a light connection command from the anchor eNB 6-02 at step 6-05. Upon receipt of the light connection command, the UE 6-01 transitions to the light connected mode.

The anchor eNB 6-02 stores the UE context of the UE 6-01 at step 6-07. The UE 6-01 may move to a new eNB 6-03 located in another PA at step 6-06.

The new eNB 6-03 transmits its PA information to the UE 6-01 using a System Information Block (SIBx) at step 6-08. Upon receipt of the PA information, the UE 6-01 may determine whether the eNB 6-03 on which it has camped and the anchor eNB 6-02 which has transmitted the light connection command are located in the same PA.

If the eNB 6-03 on which the UE 6-01 has camped and the anchor eNB 6-02 which has transmitted the light connection command are located in different PAs, the UE 6-01 transmits, at step 6-09, a light connection update message to the eNB 6-03 on which it has camped.

The light connection update message may include at least one of a resume ID, a MAC-I, and an establishment cause. Upon receipt of the light connection update message, the new eNB 6-03 may identify the anchor eNB 6-02 based on the resume ID at step 6-10. Accordingly, the new eNB 6-03 may request to the anchor eNB 6-02 for the UE context of the UE 6-01 at steps 6-11 and 6-12.

Next, the new eNB 6-03 transmits a light connection command message to the UE 6-01 at step 6-13. The light connection command message includes a new resume ID and PA information. After transmitting the light connection command message, the eNB 6-03 transmits a HANDOVER REQUEST ACK message to the anchor eNB 6-02 at step 6-14; if the anchor eNB 6-02 has data to forward, it forwards the data to the new eNB 6-03.

Next, the new eNB 6-03 which has transmitted the light connection command message may be regarded as a new anchor eNB because the UE 6-01 is out of the service area of the anchor eNB 6-02. Accordingly, the new eNB 6-03 requests to the MME 6-04 for path switch at step 6-15 and 6-16 and to the anchor eNB 6-02 for context release at step 6-17.

Figure 7:
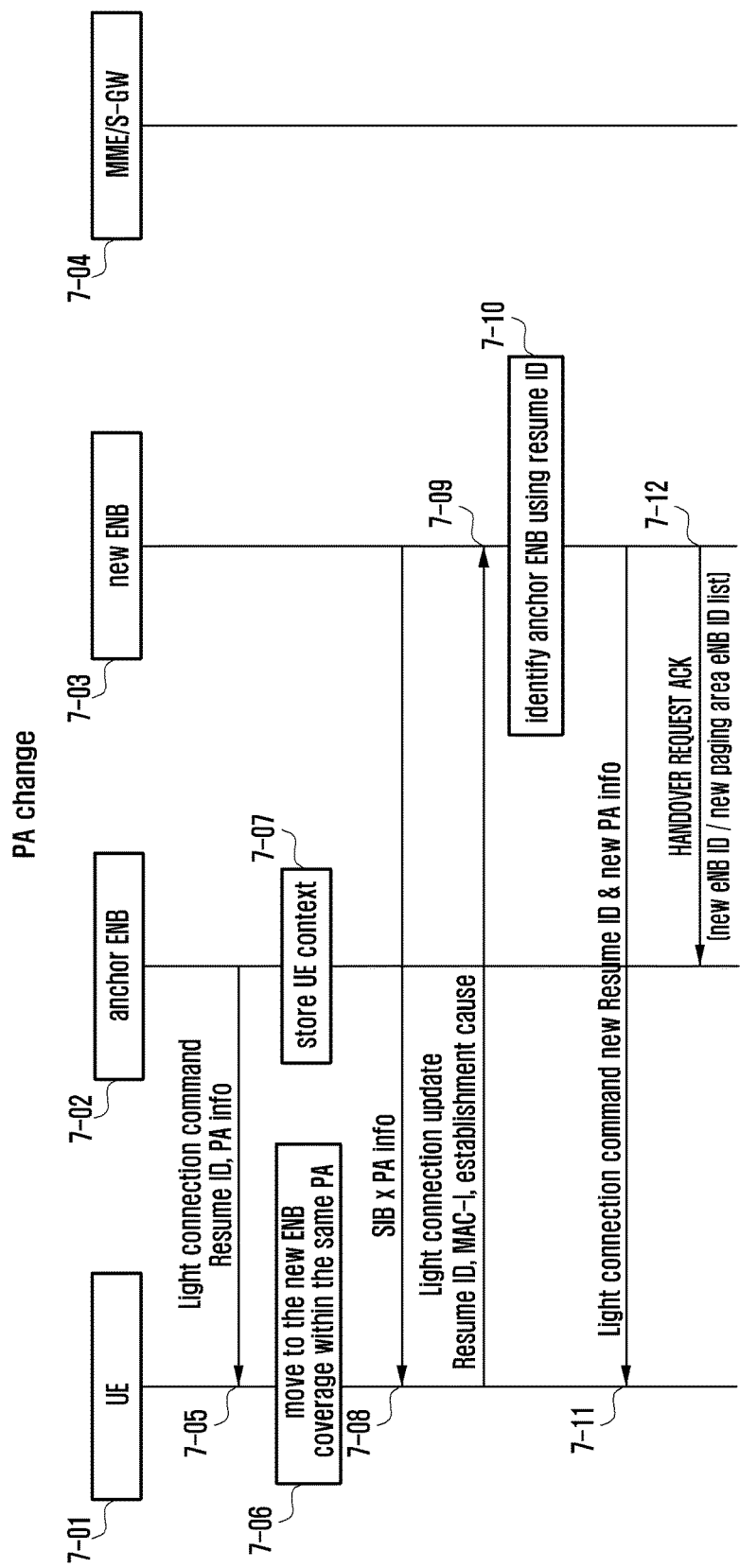
FIG. 7 is a signal flow diagram illustrating another PA change procedure according to the first embodiment of the present disclosure.

FIG. 7 is a signal flow diagram illustrating another PA change procedure according to the first embodiment of the present disclosure. The UE 7-01 in the connected state to the anchor eNB 7-02 receives a light connection command from the anchor eNB 7-02 at step 7-05. Upon receipt of the light connection command, the UE 7-01 transitions to the light connected mode. The anchor eNB 7-02 stores the UE context of the UE 7-01 at step 7-07.

The UE 7-01 may move to a new eNB 7-03 located in a PA different from that in which the anchor eNB 7-02 is located at step 7-06. The new eNB 7-03 transmits its PA information to the UE 7-01 using a SIB (SIBx) at step 7-08. Upon receipt of the PA information, the UE 7-01 may determine whether new eNB 7-03 on which the UE 7-01 has camped and the anchor eNB 7-02 which has transmitted the light connection command are located in the same PA.

If the new eNB 7-03 on which the UE 7-01 has camped and the anchor eNB 7-02 which has transmitted the light connection command are located in different PAs, the UE 7-01 transmits, at step 7-09, a light connection update message to the new eNB 7-03 on which it has camped.

The light connection update message may include at least one of a resume ID, a MAC-I, and an establishment cause. Upon receipt of the light connection update message, the new eNB 7-03 may identify the anchor eNB 7-02 based on the resume ID at step 7-10.

When the UE 7-01 moves from one PA to another PA, it is useful to transfer the UE context of the UE 7-01 from the anchor eNB 7-02 located in one PA to the new eNB 7-03 located in another PA. It may also be useful to switch the path to the MME/S-GW 7-04 from the anchor eNB 7-02 to the new eNB 7-03. Such a procedure entails signaling overhead and thus frequent PA change significantly increases signaling overhead. The signaling overhead also increases as the number of UEs to serve increases.

One of the solutions to mitigate the signaling overhead problem is not to transmit the UE context of the UE 7-01 to the new eNB 7-03 even when the UE 7-01 changes the PA. Instead, the new eNB 7-03 may provide the anchor eNB 7-02 with a list of the eNB IDs of eNBs (including the new eNB 7-03) located within a new PA at step 7-12. The new eNB 7-03 provides the UE 7-01 with a new resume ID and new PA information using the light connection command at step 7-11.

If there is MT data to transmit to the UE 7-01, the anchor eNB 7-02 triggers a paging procedure and transmits a paging message to the new eNB 7-03. The new eNB 7-03 may transmit the paging message to the eNBs located in the same PA as that in which the anchor eNB 7-02 is located. The new eNB 7-03 may also transmit the paging message to the eNBs located in the same PA as that in which the new eNB 7-03 is located. Upon receipt of the paging message, the eNBs broadcast the paging message.

Table 1 lists available PA ID (PAI) management methods according to the first embodiment of the present disclosure. In the legacy LTE, the paging message is broadcast by the Tracking Area (TA). The UE has a TA Update (TAU) list transmitted by the MME and, if it enters a TA which is not included in the TAU list, performs TAU.

In the present disclosure, the PA is similar to the legacy TA with the exception that the PA is managed by the eNB. That is, it is not necessary for the MME to manage the PA or to have the information on the PA.

In option 1 in table 1, each cell broadcasts the ID of the PA to which it belongs (single PAI) using a SIBx. The UE stores the PAI (e.g., when the light connected mode starts) and initiates Paging Area Update (PAU) upon entering a different PA. Option 1a is similar to option 1 with the exception that the eNB provides multiple PAIs in the form of a PAI list when the light connected mode starts. The UE initiates PAU upon entering a cell where none of the PAIs matches the PAI broadcast by the cell.

In option 2 of table 1, each cell broadcasts the IDs of multiple PAs to which it belongs (multiple PAIs) using a SIBx. The UE stores the PAIs (e.g., when the light connected mode starts) and initiates PAU upon entering a cell of which PAI match none of the stored PAIs. Option 2a is similar to option 2 with the exception that the eNB indicates a signal PAI when the light connected mode starts. The UE initiates PAU upon entering the cell where none of the PAIs of the current cell matches with the stored PAIs.

In option 3 of table 1, the eNB provides an n-bit mask information when the light connected mode starts. The UE initiates PAU upon entering a cell where n-MSB of a cellIdentity (E-UTRAN Cell Global Identifier (ECGI)) of the current cell does not match the mask. In option 4 of table 1, the eNB provides ECGIs when the light connected mode starts. The UE initiates PAU upon entering a cell whose cell ID does not match any of the ECGIs.

Figure 8:
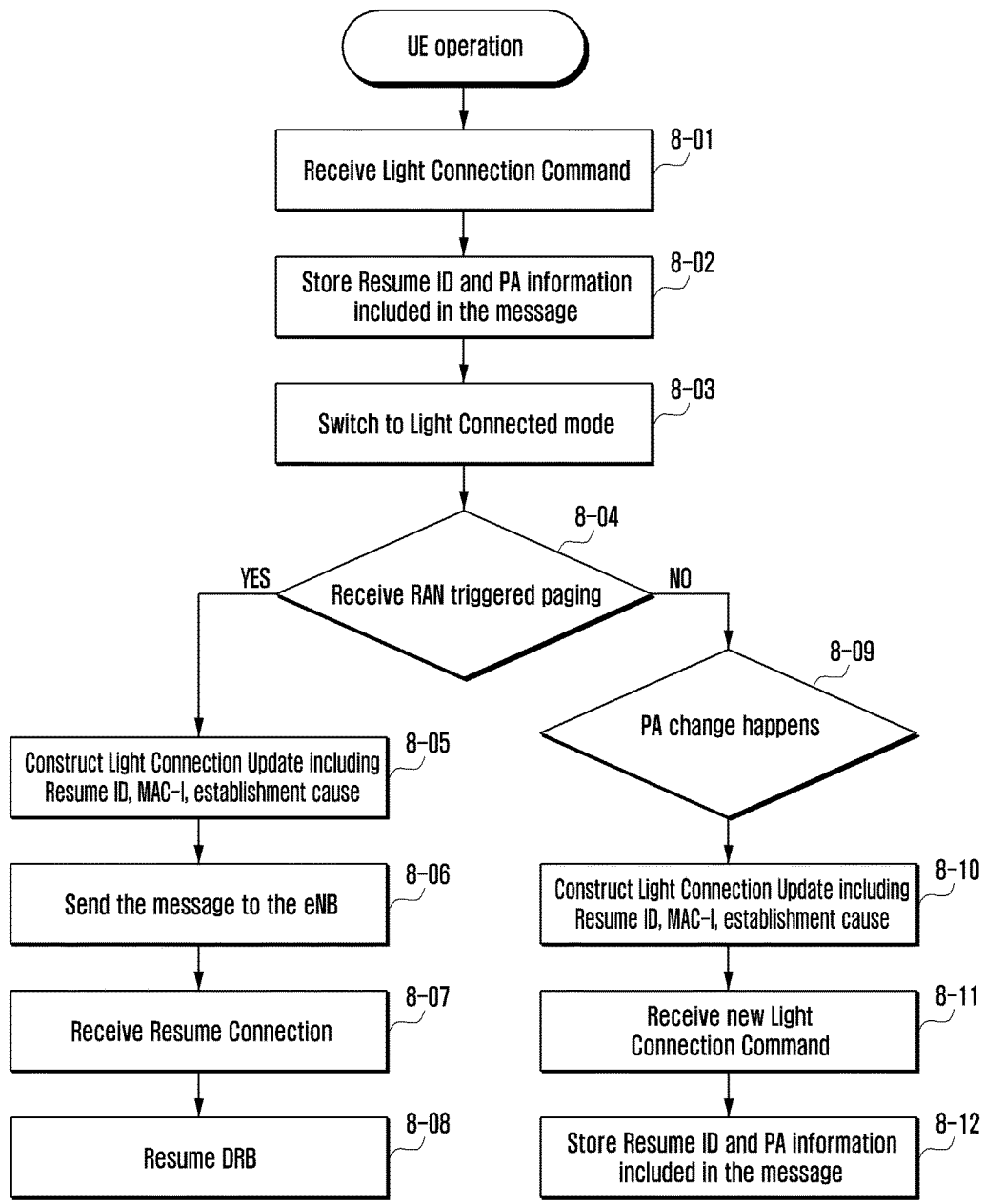
FIG. 8 is a flowchart illustrating operations of a UE according to the first embodiment of the present disclosure.

FIG. 8 is a flowchart illustrating operations of a UE according to the first embodiment of the present disclosure. The UE receives a Light Connection Command message from an eNB at step 8-01. The UE stores the resume ID and PA information included in the Light Connection Command message at step 8-02.

The UE transitions to the light connected mode at step 8-03. The UE receives a paging message and determines at step 8-04 whether the received paging message is a RAN-triggered paging message. The RAN-triggered paging message is distinguished the legacy paging message in terms of being transmitted with a newly defined RNTI, i.e., RP-RNTI.

If it is determined at step 8-04 that the received paging message is a RAN-triggered paging message, the UE gen-

TABLE 1

|  | NW | UE |
|---|---|---|
| Current | A single TAI is broadcasted in the SIB 1 | UE stores TAI list received from TAU accept UE initiates TAU upon entering TA not in the list of TAI list |
| Option 1 | A single PAI is broadcasted in the SIB x | UE stores the PAI of the cell when LC started UE initiates PAU upon entering different PA |
| Option 1A | Same as option 1 | ENB provides PAI lsit when LC starts UE initiates PAU upon entering cell where none of PAI in the list matches with PAI of the cell |
| Option 2 | Multiple PAIs are broadcasted in the SIB x | UE stores the PAI of the cell when LC started UE initiated PAU upon entering cell where none of PAI match |
| Option 2A | Same as option 2 | ENB indicates a single PAI when LC started UE indicates PAU upon entering cell where none of PAIs of the current cell macthes with the stored PAI |
| Option 3 | ECGI (cellIdentity) is broadcasted in the SIB 1 as now | ENB provides n bit mask when LC started, n can be 19, 20 or 21 bit UE initiate PAU upon entering cell where n MSB of cellIdentity does not match with mask |
| Option 4 | ECGI (cellIdentity) is broadcasted in the SIB 1 as now | ENB provides ECGIs when LC started UE initiates PAU upon entering cell whose cell id does not match | erates a Light Connection Update message at step 8-05, the Light Connection Update message including the resume ID, MAC-I, and establishment cause value stored previously. The UE transmits the Light Connection Update message to the eNB at step 8-06. The UE receives a Resume Connection message from the eNB at step 8-07. The UE resumes the DRB at step 8-08. If it is determined at step 8-04 that the received paging message is not a RAN-triggered paging message, the UE determines at step 8-09 whether PA change occurs. If it is determined at step 8-09 that PA change occurs, the UE transmits to the eNB a Light Connection Update message including the previously stored resume ID, MAC-I, and establishment cause value at step 8-10. The establishment cause value is a newly introduced value indicating PA change. The UE receives a new Light Connection Command at step 8-11. The UE stores a resume ID and PA information different from the previous ones at step 8-12.

Figure 9:
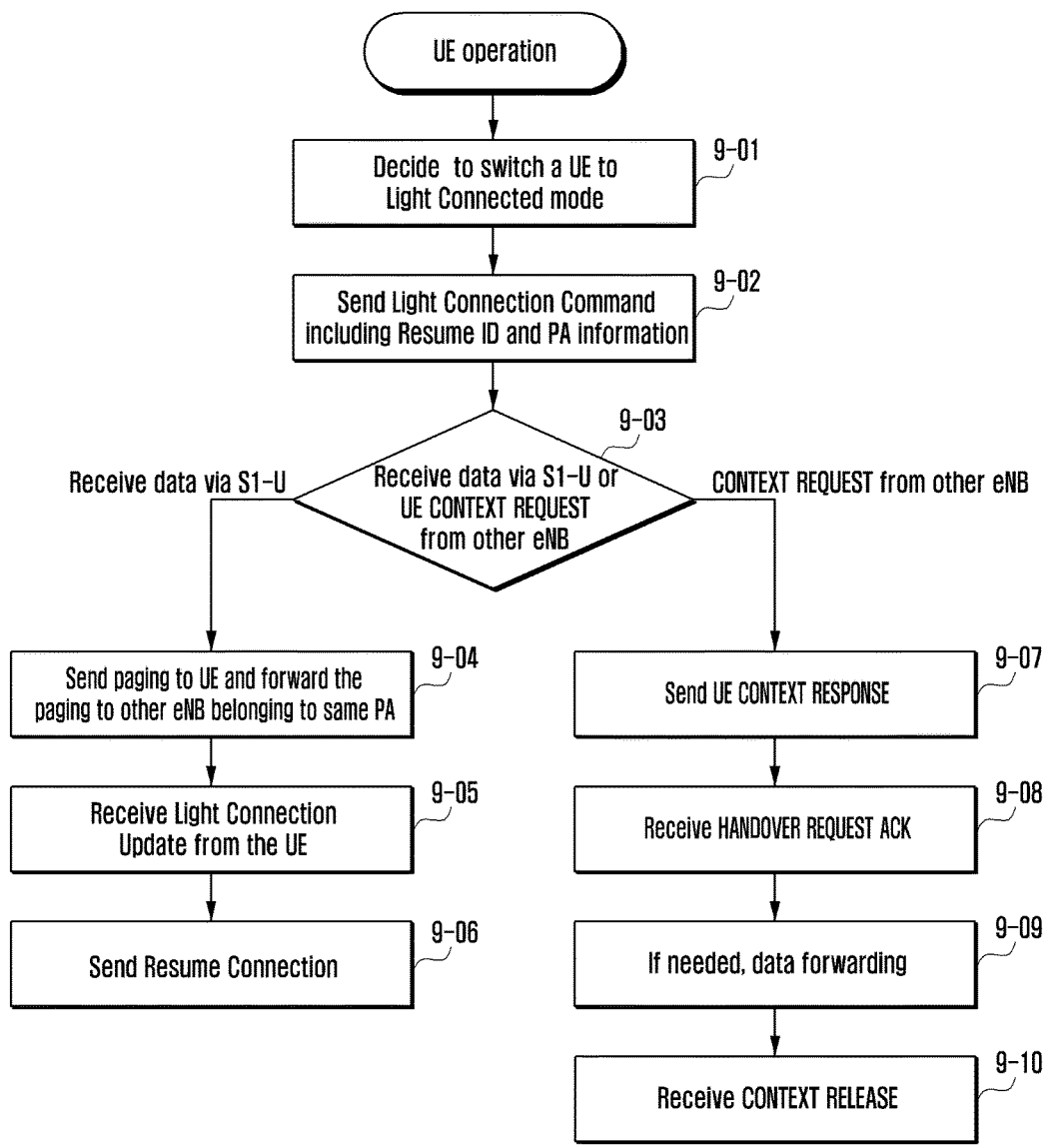
FIG. 9 is a flowchart illustrating operations of an anchor eNB according to the first embodiment of the present disclosure.

FIG. 9 is a flowchart illustrating operations of an anchor eNB according to the first embodiment of the present disclosure. An eNB determines to transition a UE to the Light Connected mode at step 9-01. The eNB becomes the anchor eNB of the UE. The eNB transmits to the UE a Light Connection Command message including a resume ID and PA information at step 9-02.

The eNB receives a signal and determines at step 9-03 whether the signal carries data transmitted from an S-GW to the UE or a UE CONTEXT REQUEST message from another eNB. If it is determined at step 9-03 that the received signal carries the data from the S-GW, the anchor eNB broadcasts a paging message to locate the UE and transmits the paging message to neighboring eNBs within the same PA as that of the anchor eNB at step 9-04. The eNB receives a Light Connection Update message from the UE at step 9-05. The eNB determines whether the resume ID included in the Light Connection Update message matches the resume ID used in the paging message and, if the resume IDs match, assumes that UE has successfully received the paging message.

The eNB transmits a Resume Connection message at step 9-06. If it is determined at step 9-03 that the received signal caries the UE CONTEXT REQUEST message transmitted by another eNB, the anchor eNB transmits a UE CONTEXT RESPONSE message to the corresponding eNB at step 9-07. The UE CONTEXT RESPONSE message includes the UE context of the corresponding UE. The anchor eNB receives a HANDOVER REQUEST ACK message from the corresponding eNB at step 9-08 and, if it has data to transmit, forwards the data to the corresponding eNB at step 9-09. The anchor eNB receives a CONTEXT RELEASE message from the corresponding eNB at step 9-10 and deletes the UE context of the UE from its storage.

Figure 10:
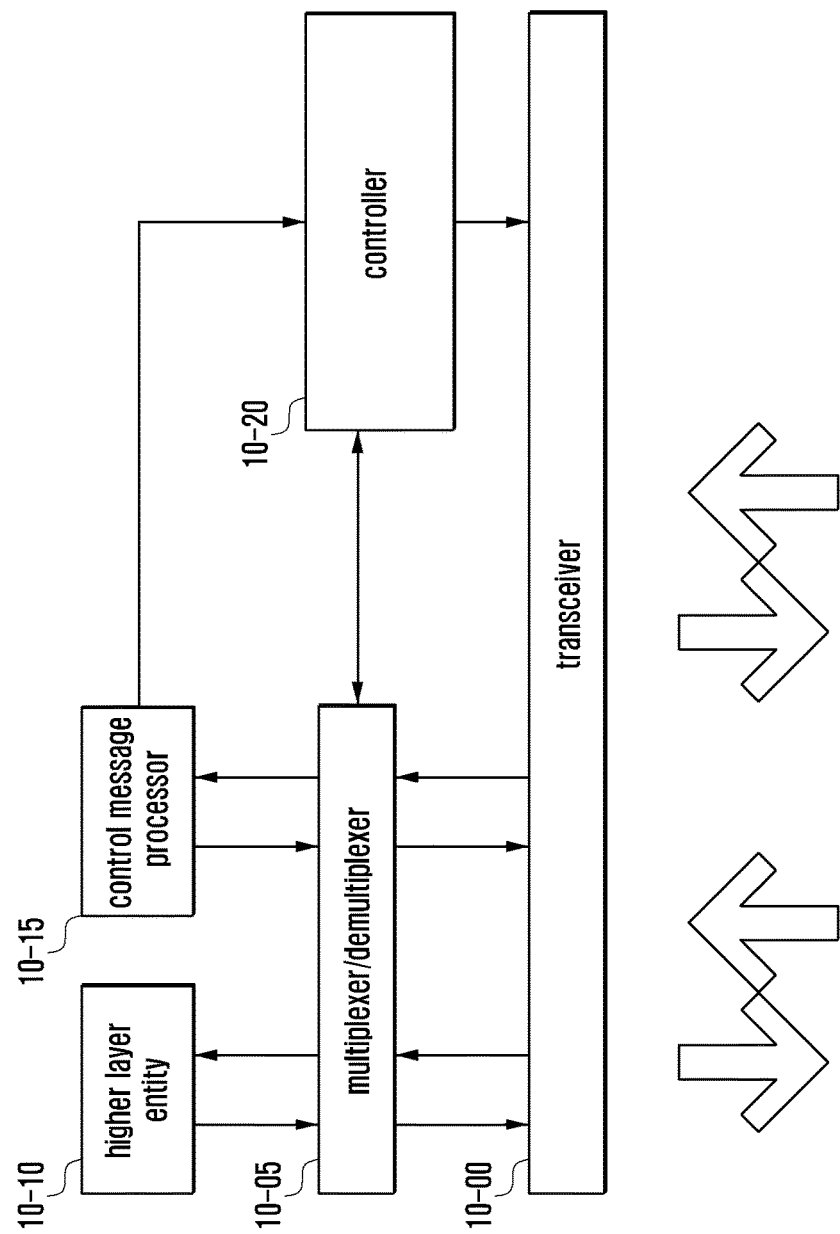
FIG. 10 is a diagram illustrating a configuration of a UE according to the first embodiment of the present disclosure.

FIG. 10 is a diagram illustrating a configuration of a UE according to the first embodiment of the present disclosure.

In reference to FIG. 10, the UE includes a transceiver 10-00, a multiplexer/demultiplexer 10-05, a higher layer entity 10-10, a control message processor 10-15, and a controller 10-20. In reference to FIG. 10, the UE communicates data by means of the higher layer entity 10-10 and communicate control messages by means of the control message processor 10-15. In the case of transmitting control signals and/or data to the eNB, the UE multiplexes the controls signals and/or data by means of the multiplexer/demultiplexer 10-05 and transmits the multiplexed signal by means of the transceiver 10-00 under the control of the controller 10-20. In the case of receiving signals, the UE receives a physical layer signal by means of the transceiver 10-00, demultiplexes the received signal by means of the multiplexer/demultiplexer 10-05, and delivers the demultiplexed information to the higher layer entity 10-10 and/or control message processor 10-15, under the control of the controller 10-20.

Figure 11:
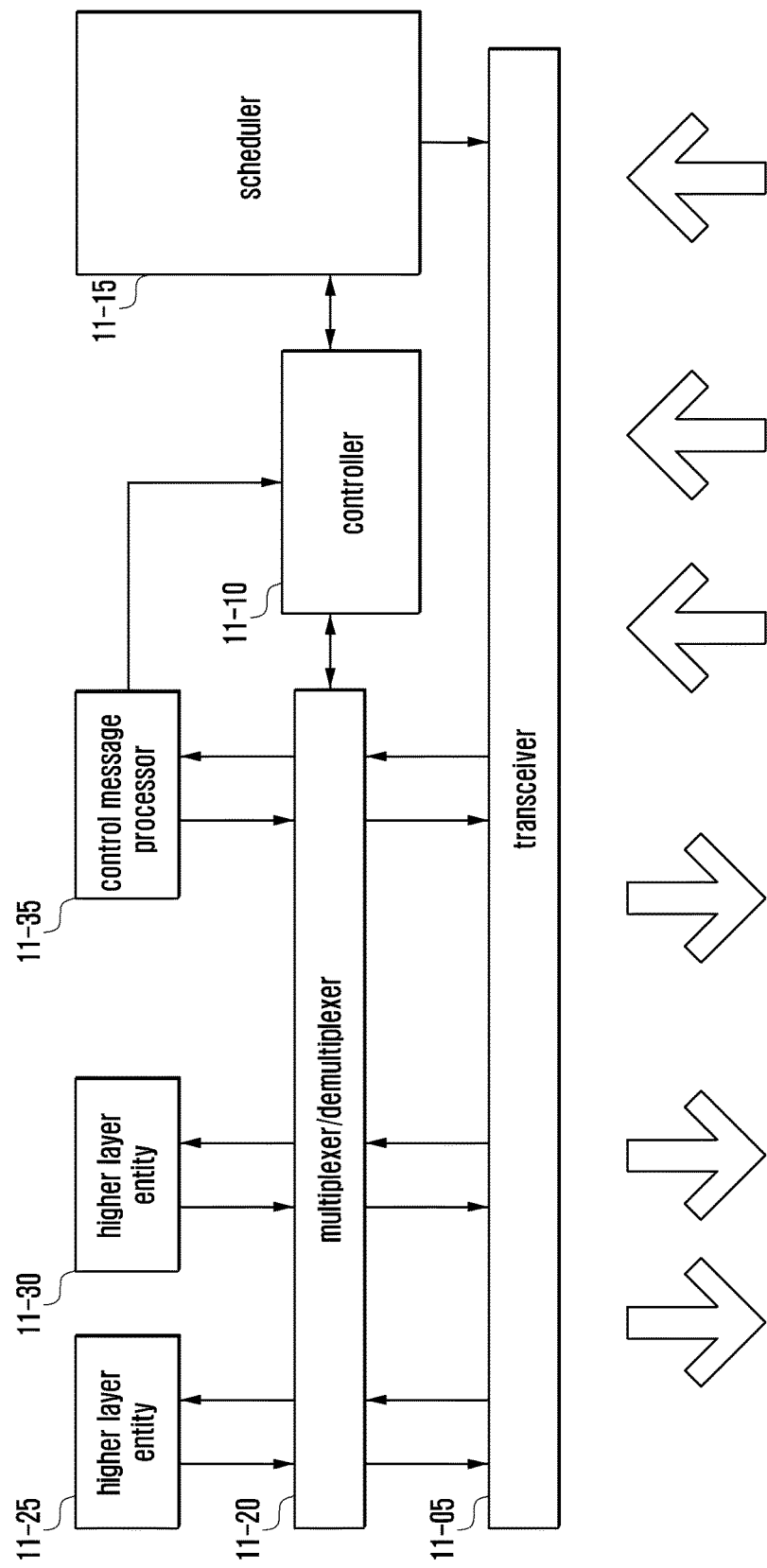
FIG. 11 is a block diagram illustrating a configuration of an eNB according to the first embodiment of the present disclosure.

FIG. 11 is a block diagram illustrating a configuration of an eNB according to the first embodiment of the present disclosure.

In reference to FIG. 11, the eNB includes a transceiver 11-05, a controller 11-10, a multiplexer/demultiplexer 11-20, a control message processor 11-35, higher layer entities 11-25 and 11-30, and a scheduler 11-15.

The transceiver 11-05 transmits data and predetermined control signals on a downlink carrier and receives data and predetermined controls signals on an uplink carrier. In the case that multiple carriers are configured, the transceiver 11-05 transmits and receives data and control signals on the multiple carriers. The multiplexer/demultiplexer 11-20 multiplexes data generated from the higher layer entities 11-25 and 11-30 and/or the control message processor 11-35 and demultiplexes the data received by the transceiver 11-05, the multiplexed data or demultiplexed data being delivered to the higher layer entities 11-25 and 11-30, the control message processor 11-35, and/or the controller 11-10.

The controller 11-10 determines whether to apply a band-specific measurement gap to a certain UE and whether to include the configuration information to an RRCConnectionReconfiguration message. The control message processor 11-35 generates the RRCConnectionReconfiguration message to a higher layer under the control of the control message processor 11-35, the RRCConnectionReconfiguration message being transmitted to the UE. The higher layer entities 11-25 and 11-30 may be established per UE or per service to process data generated by a user service such as File Transfer Protocol (FTP) and Voice over IP (VoIP) services, the processed data being transferred to the multiplexer/demultiplexer 11-20, or to process data from the multiplexer/demultiplexer 11-20, the processed data being delivered to a higher layer service application. The scheduler 11-15 allocates transmission resources at a suitable timing to a UE in consideration of UE's buffer status, channel status, and Active Time and controls the transceiver 11-05 to process the signal transmitted by the UE or to be transmitted to the UE.

Second Embodiment

The second embodiment relates to a method for performing random access in a wireless communication system, e.g., 3$^{rd}$ Generation Partnership Project Long Term Evolution (3GPP LTE) system, operating in an uplink asynchronous Hybrid Repeat Request (HARM) mode.

In the following description, the terms indicating various access nodes, network entities, messages, interfaces between network entities, and information items are used for convenience of explanation of the present disclosure. Accordingly, the terms used in the following description are not limited to specific meanings but may be replaced by other terms that are equivalent in technical meanings.

In the following description, the terms and definitions given in the 3$^{rd}$ Generation Partnership Project Long Term Evolution (3GPP LTE) standard are used for convenience of explanation. However, the present disclosure is not limited by the terms and definitions but can be applied to other standard communication systems in the same manner.

Figure 12:
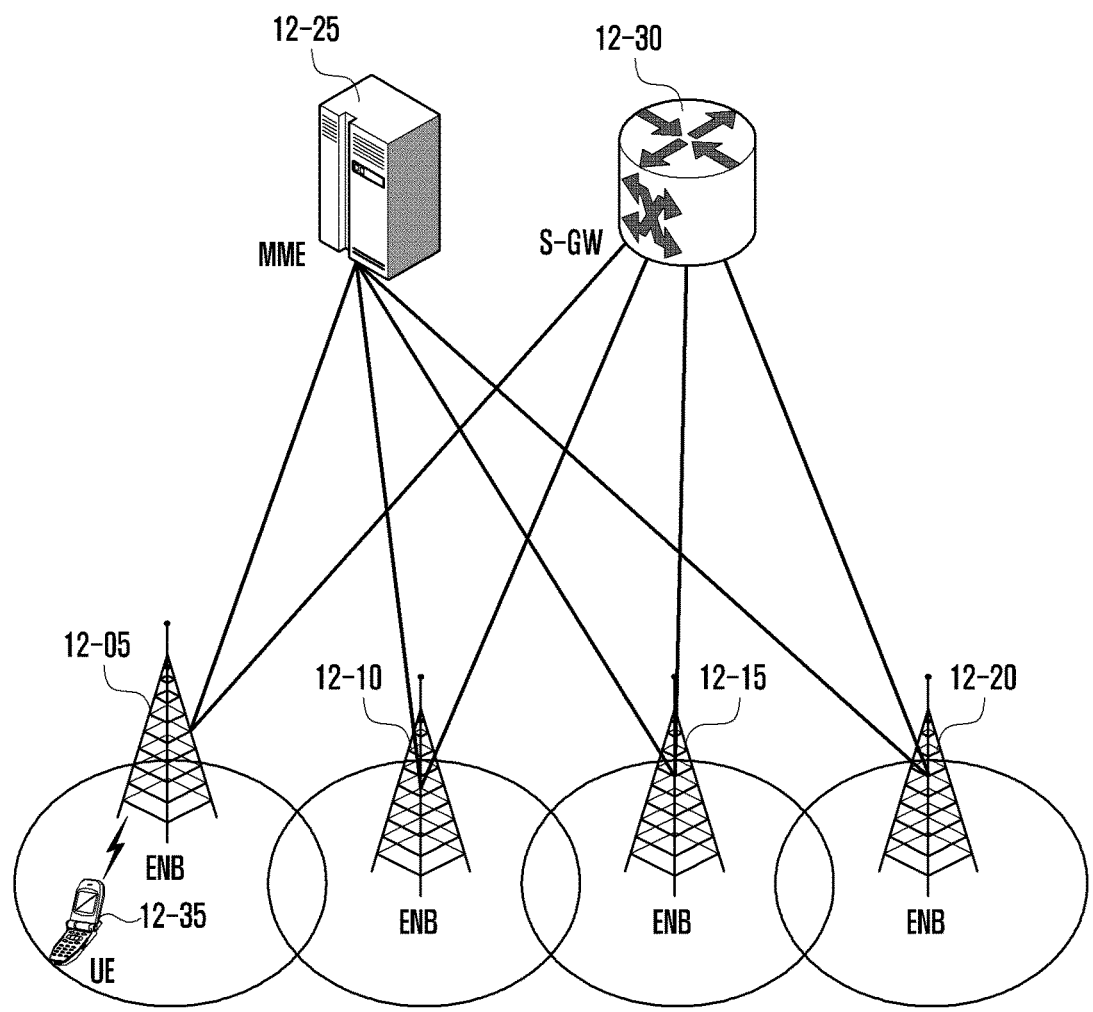
FIG. 12 is a diagram illustrating architecture of an LTE system to which the second embodiment of the present disclosure is applied.

FIG. 12 is a diagram illustrating architecture of an LTE system to which the second embodiment of the present disclosure is applied.

In reference to FIG. 12, the LTE system includes eNBs 12-05, 12-10, 12-15, and 12-20; a Mobility Management Entity (MME) 12-25; and a Serving Gateway (S-GW) 12-30. A user terminal (User Equipment (UE)) 12-35 connects to an external network via the eNBs 12-05, 12-10, 12-15, and 12-20 and the S-GW 12-30.

The eNBs 12-05, 12-10, 12-15, and 12-20 access nodes of a cellular network to provide network access service to UEs camped thereon. That is, the eNBs 12-05, 12-10, 12-15, and 12-20 schedules the UEs based on buffer status, power headroom status, and channel status collected from the UEs to connect the UEs to the Core Network (CN).

The MME 12-25 is an entity taking charge of UE mobility management and other control functions and maintains connections with a plurality of eNBs, and the S-GW 12-30 is an entity for handling bearers. The MME 12-25 and the S-GW 12-30 may perform authentication on the UEs connected to the network, manage bearers, and process the packets from the eNBs 12-05, 12-10, 12-15, and 12-20 or to be transmitted to the eNBs 12-05, 12-10, 12-15, and 12-20.

Figure 13:
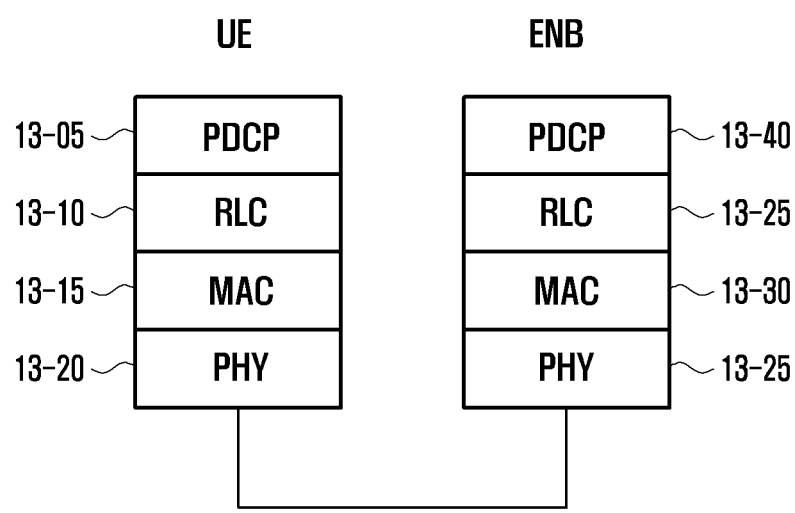
FIG. 13 is a diagram illustrating a protocol stack of an interface between UE and an eNB in an LTE system to which the second embodiment of the present disclosure is applied.

FIG. 13 is a diagram illustrating a protocol stack of an interface between UE and an eNB in an LTE system to which the second embodiment of the present disclosure is applied.

In reference to FIG. 13, the protocol stack of the interface between the UE and the eNB includes a plurality of protocol layers stacked from the bottom to the top: physical layer denoted by reference numbers 13-20 and 13-25, medium access control (MAC) layer denoted by reference numbers 13-15 and 13-30, radio link control (RLC) layer denoted by reference numbers 13-10 and 13-35, and packet data convergence control (PDCP) layer denoted by reference numbers 13-05 and 13-40. The PDCP layer denoted by reference numbers 13-05 and 13-40 takes charge of compressing/decompressing an IP header, and the RLC layer denoted by reference numbers 13-10 and 13-35 takes charge of segmenting a PDCP Packet Data Unit (PDU) into segments of appropriate size.

The MAC layer denoted by reference number 13-15 and 13-30 allows for connection of multiple RLC entities and takes charge of multiplexing RLC PDUs from the RLC layer into a MAC PDU and demultiplexing a MAC PDU into RLC PDUs. The PHY layer denoted by reference numbers 13-20 and 13-25 takes charge of channel-coding and modulation on higher layer data to generate and transmit OFDM symbols over a radio channel, and demodulating and channel-decoding on OFDM symbols received over the radio channel to deliver the decoded data to the higher layers. The PHY layer uses Hybrid ARQ (HARM) for additional error correction by transmitting 1-bit information indicative of positive or negative acknowledgement from the receiver to the transmitter. This is referred to as HARQ ACK/NACK information. The downlink HARQ ACK/NACK corresponding to the uplink transmission is carried by Physical Hybrid-ARQ Indicator Channel (PHICH), and the uplink HARQ ACK/NACK corresponding to downlink transmission is carried by Physical Uplink Control Channel (PUCCH) or Physical Uplink Shared Channel (PUSCH).

The HARQ is categorized into one of asynchronous HARQ and synchronous HARQ. The asynchronous HARQ is characterized by a variable retransmission timing for transmission whereas the synchronous HARQ is characterized by a fixed retransmission timing (e.g., 8 ms). Also, it may be possible to configure multiple HARQ processes running in parallel in downlink and uplink for one UE, the HARQ processes being identified by HARQ process identifiers (IDs).

In the asynchronous HARQ, it is important for the eNB to provide the UE with the information on the HARQ process to which the current transmission belongs and whether the current transmission is an initial transmission or retransmission through a Physical Downlink Control Channel (PDCCH). In detail, the HARQ process to which the current transmission belongs is indicated by a HARQ Process ID field of the PDCCH, and whether the current transmission is the initial transmission or retransmission is indicated by a New Data Indicator (NDI) bit in the PDCCH (the NDI bit is not toggled to indicate retransmission but is toggled to indicate initial transmission).

Accordingly, the UE acquires the detailed information on the corresponding transmission based on the resource allocation information included in the PDCCH transmitted by the eNB to receive downlink data through a Physical Downlink Shared Channel (PDSCH) or to transmit uplink data through a Physical Uplink Shared Channel (PUSCH).

Although not shown in the drawing, a Radio Resource Control (RRC) layer resides above the PDCP layer at both the UE and the eNB, and the UE and the eNB may exchange connection and measurement configuration control messaged for radio resource management through RRC layer signaling.

Figure 14:
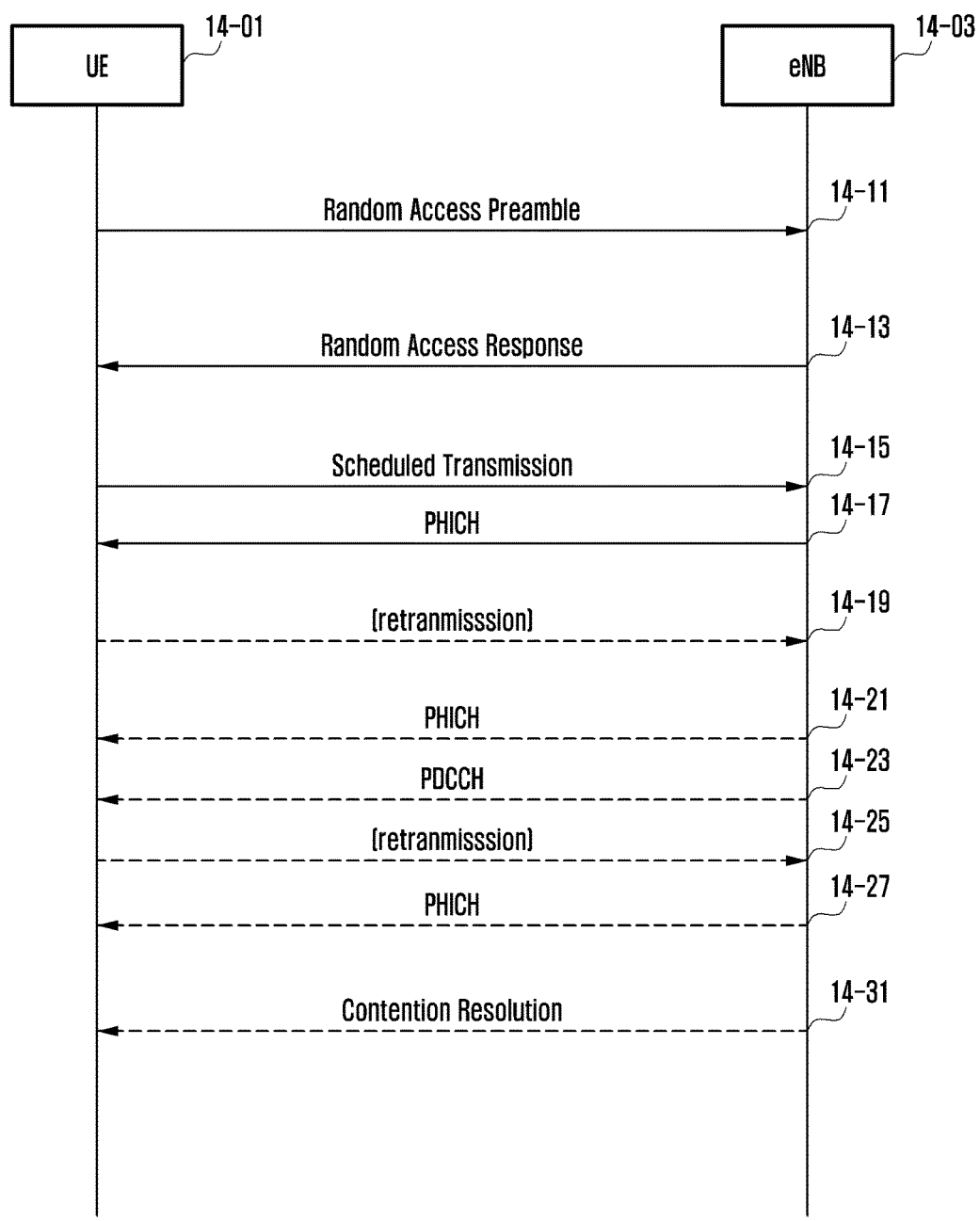
FIG. 14 is a signal flow diagram illustrating a random access procedure in an uplink synchronous HARQ mode.

FIG. 14 is a signal flow diagram illustrating a random access procedure in an uplink synchronous HARQ mode.

The UE 14-01 initiates a random access procedure as follows in a situation requiring random access such as initial access or re-access to an eNB and handover as follows.

First, the UE 14-01 transmits a Random Access Preamble to the eNB 14-03 through a Physical Random Access Channel (PRACH) at step 14-11. The preamble may be randomly selected or preconfigured by the eNB 14-03.

The eNB 14-03 transmits a Random Access Response (RAR) message to the UE 14-01 in response to the Random Access Preamble at step 14-13. The RAR message includes a preamble identity information used at step 14-11, uplink transmission timing information, and uplink resource allocation information and Temporarily UE identifier to be used at a subsequent step (i.e., step 14-15).

The uplink resource allocation information does not include the aforementioned HARQ Process ID and NDI because it is assumed that the synchronous HARQ is used in uplink. For example, it is possible to analogize the HARQ Process ID from the subframe index of the subframe in which uplink resources are allocated and ignore the NDI value for the corresponding resource allocation.

If the RAR message is received, the UE 14-01 transmits to the eNB 14-03, at step 14-15, a message which is determined according to one of the aforementioned purposes using the resources allocated by means of the RAR message. For example, the message may be a Radio Resource Control (RRC) Connection Request message (RRCConnectionRequest) for the purpose of initial access, an RRC Connection Reestablishment Request message (RRCConnectionReestablishmentRequest) for the purpose of re-access, or a RRC Connection Reconfiguration Complete message (RRCConnectionReconfigurationComplete) for the purpose of handover. The message may be a Buffer Status Report (BSR) message for the purpose of resource request.

Whether the message transmission made at step 14-15 has succeeded is determined through a Physical HARQ Indicator Channel (PHICH) at step 14-17 and, if it is determined that the transmission has failed, the UE performs retransmission at step 14-19 and 14-25. If no PDCCH is received after transmission, the retransmission is performed using the resources allocated by means of the RAR message according to a predetermined scheme at step 14-19; if a PDCCH is received in response to the corresponding retransmission at step 14-23, the retransmission is performed according to the information included in the PDCCH at step 14-25. The PDCCH transmitted at step 14-23 includes a HARQ Process ID and an NDI which is ignorable as aforementioned. For every (re)transmission, the UE 14-01 determines whether the (re)transmission has succeed based on the PHICH at steps 14-17, 14-21, and 14-27.

In a contention-based random access procedure (i.e., if the UE transmits a randomly selected preamble), the eNB 14-03 transmits a contention resolution message to the UE 14-01 at step 14-31; however, the eNB 14-03 does not transmit the corresponding message in a non-contention-based random access procedure (i.e., if the eNB has command the UE to use a specific preamble).

Figure 15:
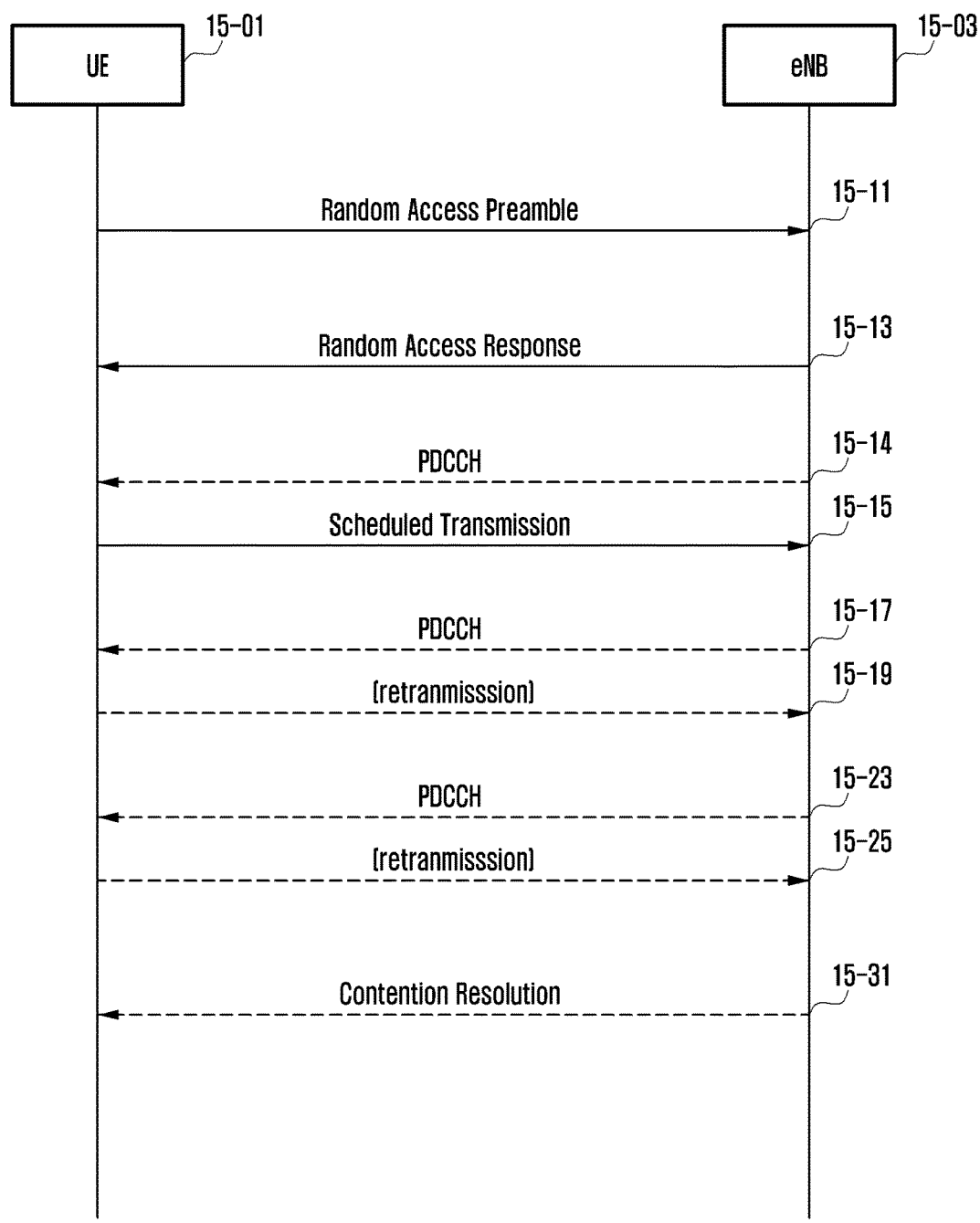
FIG. 15 is a signal flow diagram illustrating a random access procedure in an uplink asynchronous HARQ mode.

FIG. 15 is a signal flow diagram illustrating a random access procedure in an uplink asynchronous HARQ mode.

The UE 15-01 initiates a random access procedure as follows in a situation requiring random access such as initial (re)access or re-access to an eNB and handover.

The UE 15-01 transmits a Random Access Preamble to the eNB 14-03 through a Physical Random Access Channel (PRACH) at step 15-11. The preamble may be randomly selected or preconfigured by the eNB 15-03.

The eNB 15-03 transmits a Random Access Response (RAR) message to the UE 15-01 in response to the Random Access Preamble at step 15-13. The RAR message includes a preamble identity information used at step 15-11, uplink transmission timing information, and uplink resource allocation information and Temporarily UE identifier to be used at a subsequent step (i.e., step 15-15).

Although the uplink resource allocation information does not include the HARQ Process ID and NDI as in FIG. 14, these parameters are used for asynchronous HARQ, and the present disclosure proposes a method for determining a HARQ Process ID according to a predetermined rule or using a predetermined value.

For example, the HARQ Process ID may be calculated through a modulo operation on the subframe index by 4 or fixed to a specific value (e.g., 0). In the asynchronous HARQ process in which every retransmission requires PDCCH transmission, the UE may determine whether the current transmission with the corresponding HARQ process ID is an initial transmission or a retransmission based on the NDI value included in every PDCCH being received afterward under the assumption that the NDI is set to a value included in the initially transmitted PDCCH (e.g., PDCCH transmitted at step 15-14 or, if step 15-14 is skipped, PDCCH transmitted at 15-17) or a fixed value (e.g., 0 or 1).

If the RAR message is received, the UE 15-01 transmits to the eNB 15-03, at step 15-15, a message which is determined according to one of the aforementioned purposes using the resources allocated by means of the RAR message. For example, the message may be a Radio Resource Control (RRC) Connection Request message (RRCConnectionRequest) for the purpose of initial access, an RRC Connection Reestablishment Request message (RRCConnectionReestablishmentRequest) for the purpose of re-access, or a RRC Connection Reconfiguration Complete message (RRCConnectionReconfigurationComplete) for the purpose of handover. The message may be a Buffer Status Report (BSR) message for the purpose of resource request.

Meanwhile, whether the message transmission made at step 15-15 has succeeded is determined based on the HARQ Process ID and NDI value included in every PDCCH at steps 15-14, 15-17, and 15-23 in the asynchronous HARQ unlike the synchronous HARQ using PHICH. For example, if the NDI set to a value in the initial PDCCH or a fixed value (e.g., 0 or 1) which is received along with the same HARQ ID is not toggled, the UE 15-01 determines that the current transmission is a retransmission; otherwise if the NDI is toggled, the UE 15-01 determines that the current transmission is an initial transmission. Whether the current transmission is a retransmission or an initial transmission is determined in this way and, the eNB 15-03 performs transmission at step 15-15 or retransmission at steps 15-19 and 15-25 according to the information included in every PDCCH. That is, the UE 15-01 determines whether the (re)transmission has succeed based on the PDCCH received at step 15-14, 15-17, and 15-23.

In a contention-based random access procedure (i.e., if the UE transmits randomly selected preamble), the eNB 15-03 transmits a contention resolution message to the UE 15-01 at step 15-31; however, the eNB 15-03 does not transmit the corresponding message in a non-contention-based random access procedure (i.e., if the eNB has command the UE to use a specific preamble).

Figure 16:
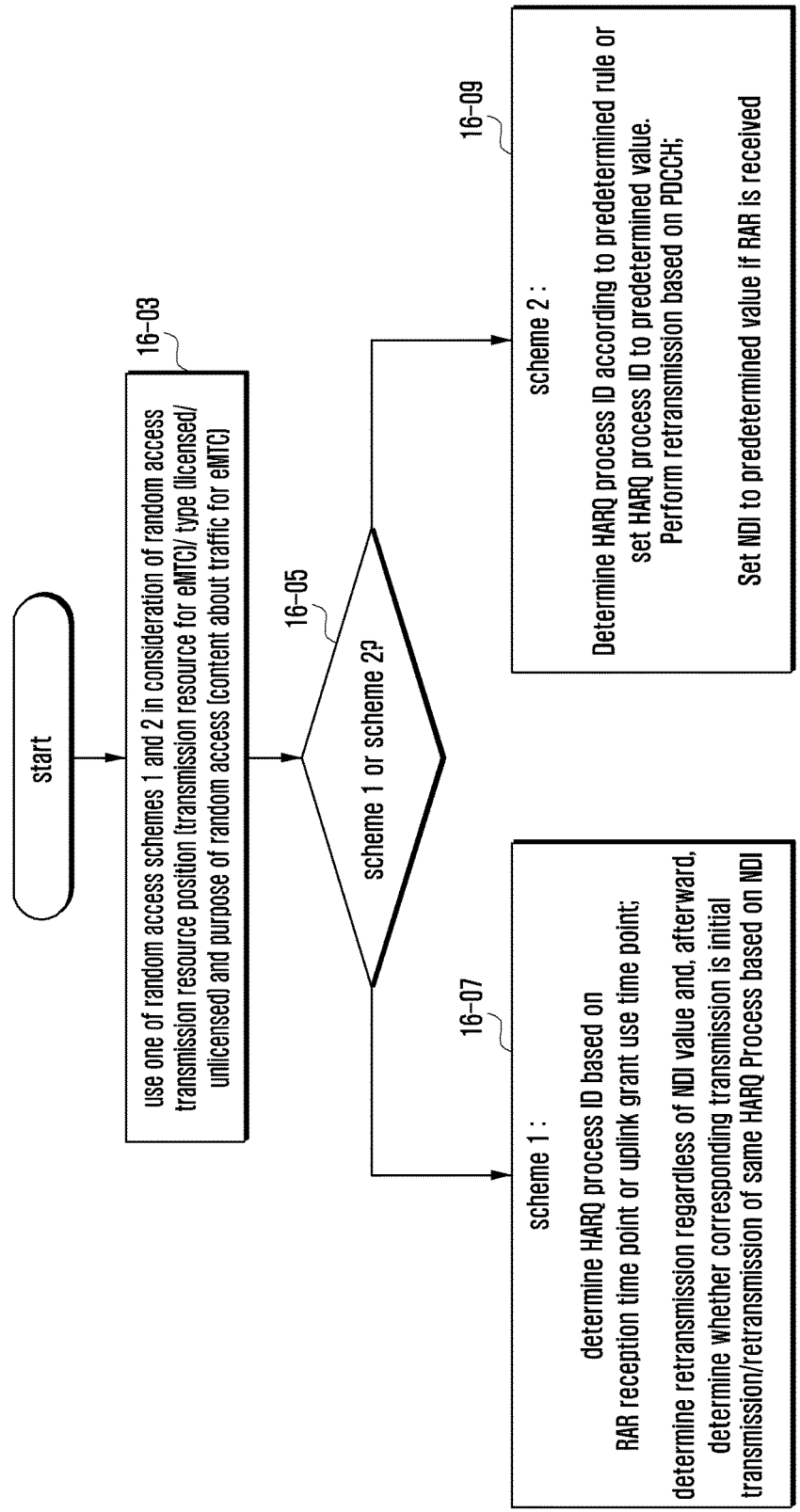
FIG. 16 is a flowchart illustrating a random access procedure of a UE according to an embodiment of the present disclosure.

FIG. 16 is a flowchart illustrating a random access procedure of a UE according to an embodiment of the present disclosure.

In the random access procedure, the UE selects one of random access schemes 1 and 2 in consideration of the PRACH transmission resource position and type (e.g., resource position for enhanced Machine Type Communication (eMTC)) and purpose of random access (e.g., transmission of eMTC traffic) at step 16-03.

For example, if the UE is an MTC UE restricted in bandwidth (Bandwidth reduced Low complexity (BL) UE or Coverage Enhancement (CE) UE), it uses random access scheme 2. The UE also uses random access scheme 2 for transmission in a cell operating in an unlicensed band.

Random access scheme 1 is designed for use in the uplink synchronous HARQ mode described with reference to FIG. 14, and random access scheme 2 is designed for use in the uplink asynchronous HARQ mode described with reference to FIG. 15.

The UE determines whether the selected random access scheme is random access scheme 1 or 2 at step 16-05. If it is determined to use random access scheme 1, the procedure goes to step 16-07.

At step 16-07, if uplink resources are allocated by means of a RAR message received in response to a random access preamble, the UE determines a HARQ process ID based on the RAR message reception time point or the uplink resource use time point. Afterward, the UE may determine whether to perform retransmission on the data transmitted using the allocated uplink resources based on the HARQ feedback (i.e., ACK/NACK received through PHICH). If a PDCCH is additionally received for allocating uplink resources, the UE determines whether to perform the retransmission regardless of the value of the NDI included in the corresponding PDCCH and uses the NDI value to determine whether the subsequent transmission made in the same HARQ process is an initial transmission or retransmission.

If it is determined to use random access scheme 2, the procedure goes to step 16-09.

At step 16-09, if uplink resources are allocated by means of a RAR message received in response to a random access preamble, the UE determines a HARQ process ID according to a predetermined rule or sets the HARQ process ID to a predetermined value. For example, the HARQ process ID may be calculated through a modulo operation on the subframe index by 4, fixed to a specific value (e.g., 0), or determined based on the last PDCCH reception time point.

For example, if the last PDCCH reception time points for HARQ process 0, HARQ process 1, and HARQ process 2 are t0, t1, and t2, respectively, the oldest HARQ process 1 (if t0>t1>t2) may be determined for message 3 transmission. Unlike random access scheme 1, the UE determines whether to perform a retransmission based on the PDCCH rather than PHICH. If the RAR is received, the UE registers an NDI value (e.g., 0 or 1) and determines whether a subsequent transmission is an initial transmission or a retransmission based on the HARQ process ID and the NDI value included in the PDCCH being received afterward, i.e., retransmission with the untoggled NDI value or initial transmission with the toggled NDI value.

Figure 17:
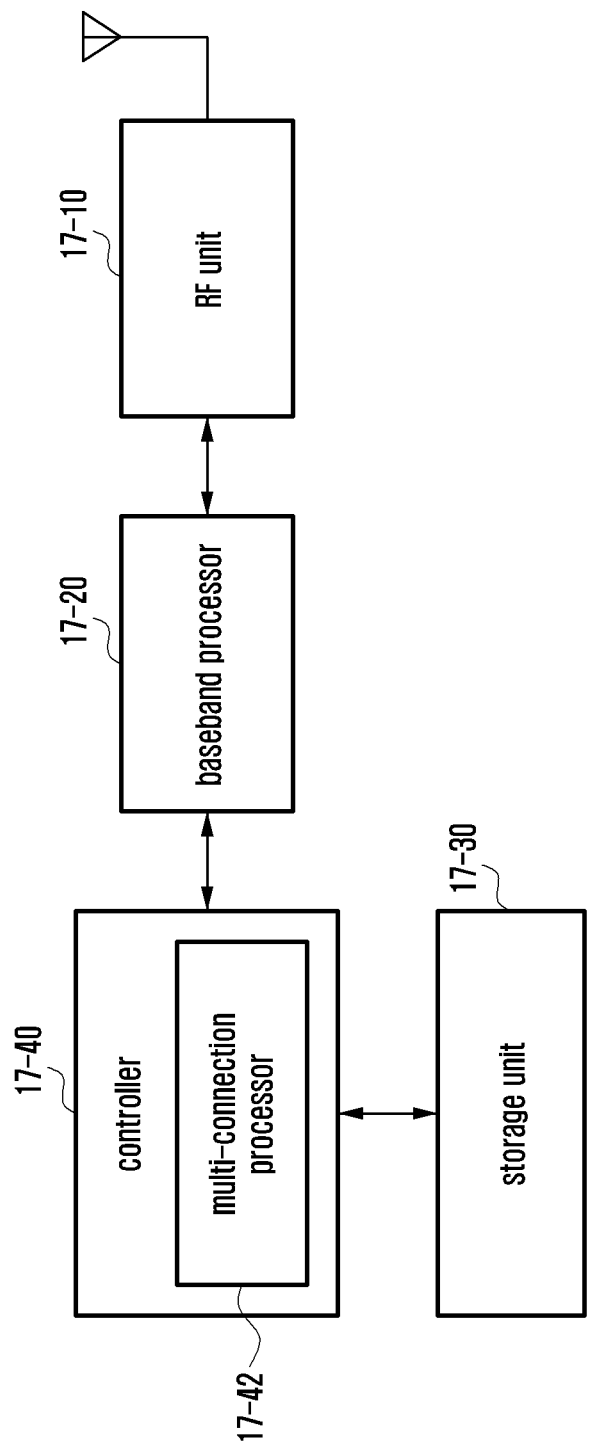
FIG. 17 is a block diagram illustrating UE in a wireless communication system according to an embodiment of the present disclosure.

FIG. 17 is a block diagram illustrating UE in a wireless communication system according to an embodiment of the present disclosure.

In reference to FIG. 17, the UE includes a Radio Frequency (RF) unit 17-10, a baseband processor 17-20, a storage unit 17-30, and a controller 17-40.

The RF unit 17-10 performs signal band conversion and amplification for transmitting/receiving signals over a radio channel. That is, the RF unit 17-10 up-converts a baseband signal output from the baseband processor 17-20 to an RF signal to be transmitted through an antenna and down-converts an RF signal received by the antenna to a baseband signal.

For example, the RF unit 17-10 may include a transmission filter, a reception filter, an amplifier, a mixer, an oscillator, a Digital to Analog Converter (DAC), and an analog to Digital Converter (ADC). Although one antenna is depicted in FIG. 17, the UE may include a plurality of antennas. The RF unit 17-10 may include a plurality of RF chains. Furthermore, the RF unit 17-10 may be configured to perform beamforming. For beamforming operation, the RF unit 17-10 may adjust phases and sizes of the signals transmitted/received through the plural antennas or antenna elements.

The baseband processor 17-20 is responsible for conversion between baseband signals and bit strings according to a physical layer standard of the system. For example, the baseband processor 17-20 performs encoding and modulation on a transmission bit string to generate complex symbols in a data transmission mode. The baseband processor 17-20 also performs demodulation and decoding on the baseband signal output from the RF unit 17-10 to recover the original bit string in a data reception mode. In an exemplary case of using Orthogonal Frequency Division Multiplexing (OFDM), the baseband processor 17-20 performs encoding and modulation on the transmission bit string to generate complex symbols, maps the complex symbols to subcarriers, performs Inverse Fast Fourier Transform (IFFT) operation on the subcarrier-mapped complex symbols, and inserts Cyclic Prefix to generate OFDM symbols in the data transmission mode. The baseband processor 17-20 also segments a baseband signal from the RF unit 17-10 into OFDM symbols, performs Fast Fourier Transform (FFT) operation on the OFDM symbols to recover subcarrier-mapped signals, and performs demodulation and decoding on the subcarrier-mapped signals to recover the original bit string in the data reception mode.

The baseband processor 17-20 and the RF unit 17-10 perform signal processing as described above to transmit and receive the signals. Accordingly, the baseband processor 17-20 and the RF unit 17-10 may be integrally referred to as transmitter, receiver, transceiver, or communication unit.

Also, at least one of the baseband processor 17-20 and the RF unit 17-10 may include a plurality communication modules to support different radio access technologies.

Also, at least one of the baseband processor 17-20 and the RF unit 17-10 may include multiple communication modules designed for processing signals in different frequency bands. For example, the radio access technologies may include a Wireless Local Area Network (WLAN) (e.g., IEEE 802.11) and cellular network (e.g., LTE). The different frequency bands may include a Super High Frequency (SHF) band (e.g., 2.5 GHz and 5 GHz bands) and a millimeter wave (mmWave) band (e.g., 60 GHz band).

The storage unit 17-30 stores basic programs for operation of the UE, application programs, and data including configuration information. Particularly, the storage unit 17-30 may store the information related to a WLAN node performing radio communication with a WLAN access technology. The storage unit 17-30 also provides data stored therein on request from the controller 17-40.

The controller 17-40 controls overall operations of the UE. For example, the controller 17-40 controls the baseband processor 17-20 and the RF unit 17-10 to transmit and receive signals. The controller 17-40 also writes and reads data to and from the storage unit 17-30. For this purpose, the controller 17-40 may include at least one processor. For example, the controller 17-40 may include a Communication Processor (CP) for controlling communication and an Application Processor (AP) for controlling higher layer applications.

According to the second embodiment of the present disclosure, the controller 17-40 includes a multi-connectivity processor 17-42 for supporting multi-connectivity mode. For example, the controller 17-40 may control the UE to perform the UE operations depicted in FIG. 16.

According to the second embodiment of the present disclosure, the controller 17-40 determines whether to use random access mode 1 or 2 and performs random access to the eNB according to the determined random access mode.

The methods disclosed in the claims and embodiments specified in the specification may be implemented in hardware, software, or a combination thereof.

In the case of being implemented in software, it may be possible to store at least one program (software module) in a computer-readable storage medium. The at least one program stored in the computer-readable storage medium may be configured for execution by at least one processor embedded in an electronic device. The at least one program includes instructions executable by the electronic device to perform the methods disclosed in the claims and specifications of the present disclosure.

Such a program (software module or software program) may be stored in a non-volatile memory such as random access memory (RAM) and flash memory, Read Only Memory (ROM), Electrically Erasable Programmable Read Only Memory (EEPROM), a magnetic disc storage device, a Compact Disc-ROM (CD-ROM), Digital Versatile Discs (DVDs) or other type of optical storage device, and a magnetic cassette. It may also be possible to store the program in a memory device implemented in combination of part or whole of the aforementioned media. The storage unit may include a plurality of memories.

The program may be stored in an attachable storage device accessible through a communication network implemented as a combination of Internet, intranet, Local Area Network (LAN), Wireless LAN (WLAN), and Storage Area Network (SAN). The storage device may be attached to the device performing the methods according to embodiments of the present disclosure by means of an external port. It may also be possible for a separate storage device installed on a communication network to attach to the device performing the methods according to embodiments of the present disclosure.

Third Embodiment

Figure 18:
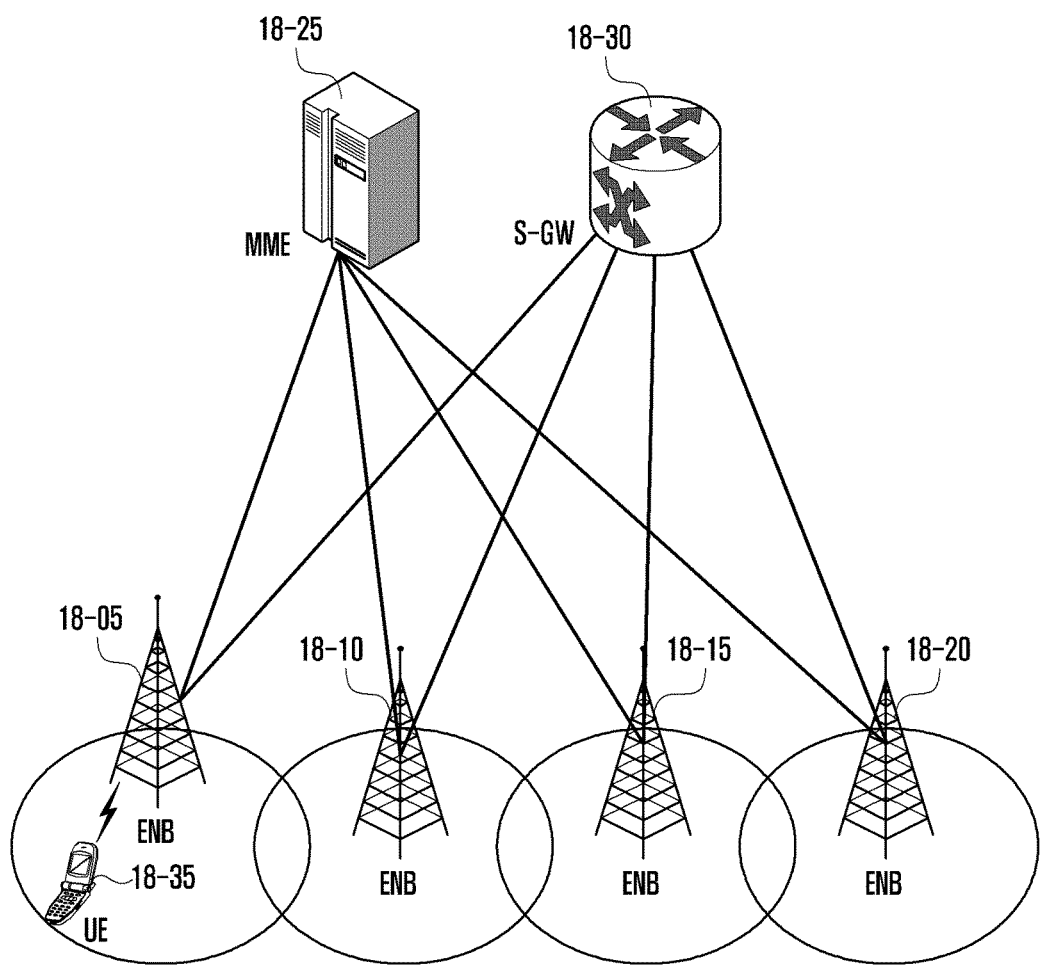
FIG. 18 is s a diagram illustrating architecture of an LTE system to which the third embodiment of the present disclosure is applied.

FIG. 18 is s a diagram illustrating architecture of an LTE system to which the third embodiment of the present disclosure is applied.

In reference to FIG. 18, the LTE system includes eNBs 18-05, 18-10, 18-15, and 18-20; a Mobility Management Entity (MME) 18-25; and a Serving Gateway (S-GW) 18-30. A user terminal (User Equipment (UE)) 18-35 connects to an external network via the eNBs 18-05, 18-10, 18-15, and 18-20 and the S-GW 18-30.

The eNBs 18-05, 18-10, 18-15, and 18-20 access nodes of a cellular network to provide network access service to UEs camped thereon. That is, the eNBs 18-05, 18-10, 18-15, and 18-20 schedules the UEs based on buffer status, power headroom status, and channel status collected from the UEs to connect the UEs to the Core Network (CN).

The MME 18-25 is an entity taking charge of UE mobility management and other control functions and maintains connections with a plurality of eNBs, and the S-GW 18-30 is an entity for handling bearers. The MME 18-25 and the S-GW 18-30 may perform authentication on the UEs connected to the network, manage bearers, and process the packets from the eNBs 18-05, 18-10, 18-15, and 18-20 or to be transmitted to the eNBs 18-05, 18-10, 18-15, and 18-20.

Figure 19:
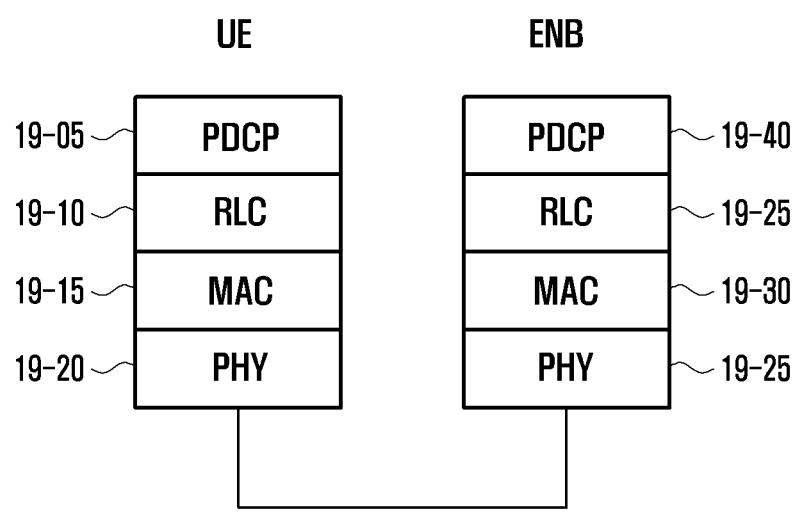
FIG. 19 is a diagram illustrating a protocol stack of an interface between UE and an eNB in an LTE system to which the third embodiment of the present disclosure is applied.

FIG. 19 is a diagram illustrating a protocol stack of an interface between UE and an eNB in an LTE system to which the third embodiment of the present disclosure is applied.

In reference to FIG. 19, the protocol stack of the interface between the UE and the eNB includes a plurality of protocol layers stacked from the bottom to the top: physical layer denoted by reference numbers 19-20 and 19-25, medium access control (MAC) layer denoted by reference numbers 19-15 and 19-30, radio link control (RLC) layer denoted by reference numbers 19-10 and 19-35, and packet data convergence control (PDCP) layer denoted by reference numbers 19-05 and 19-40. The PDCP layer denoted by reference numbers 19-05 and 19-40 takes charge of compressing/decompressing an IP header, and the RLC layer denoted by reference numbers 19-10 and 19-35 takes charge of segmenting a PDCP Packet Data Unit (PDU) into segments of appropriate size.

The MAC layer denoted by reference number 19-15 and 19-30 allows for connection of multiple RLC entities and takes charge of multiplexing RLC PDUs from the RLC layer into a MAC PDU and demultiplexing a MAC PDU into RLC PDUs. The PHY layer denoted by reference numbers 19-20 and 19-25 takes charge of channel-coding and modulation on higher layer data to generate and transmit OFDM symbols over a radio channel, and demodulating and channel-decoding on OFDM symbols received over the radio channel to deliver the decoded data to the higher layers. The PHY layer uses Hybrid ARQ (HARQ) for additional error correction by transmitting 1-bit information indicative of positive or negative acknowledgement from the receiver to the transmitter. This is referred to as HARQ ACK/NACK information.

The downlink HARQ ACK/NACK corresponding to the uplink transmission is carried by Physical Hybrid-ARQ Indicator Channel (PHICH), and the uplink HARQ ACK/NACK corresponding to downlink transmission is carried by Physical Uplink Control Channel (PUCCH) or Physical Uplink Shared Channel (PUSCH).

Although not shown in the drawing, a Radio Resource Control (RRC) layer resides above the PDCP layer at both the UE and the eNB, and the UE and the eNB may exchange connection and measurement configuration control messages for radio resource management through RRC layer signaling.

In the LTE system, a UE to which no connection is configured (idle UE) performs a random access procedure to connect to a network.

Figure 20:
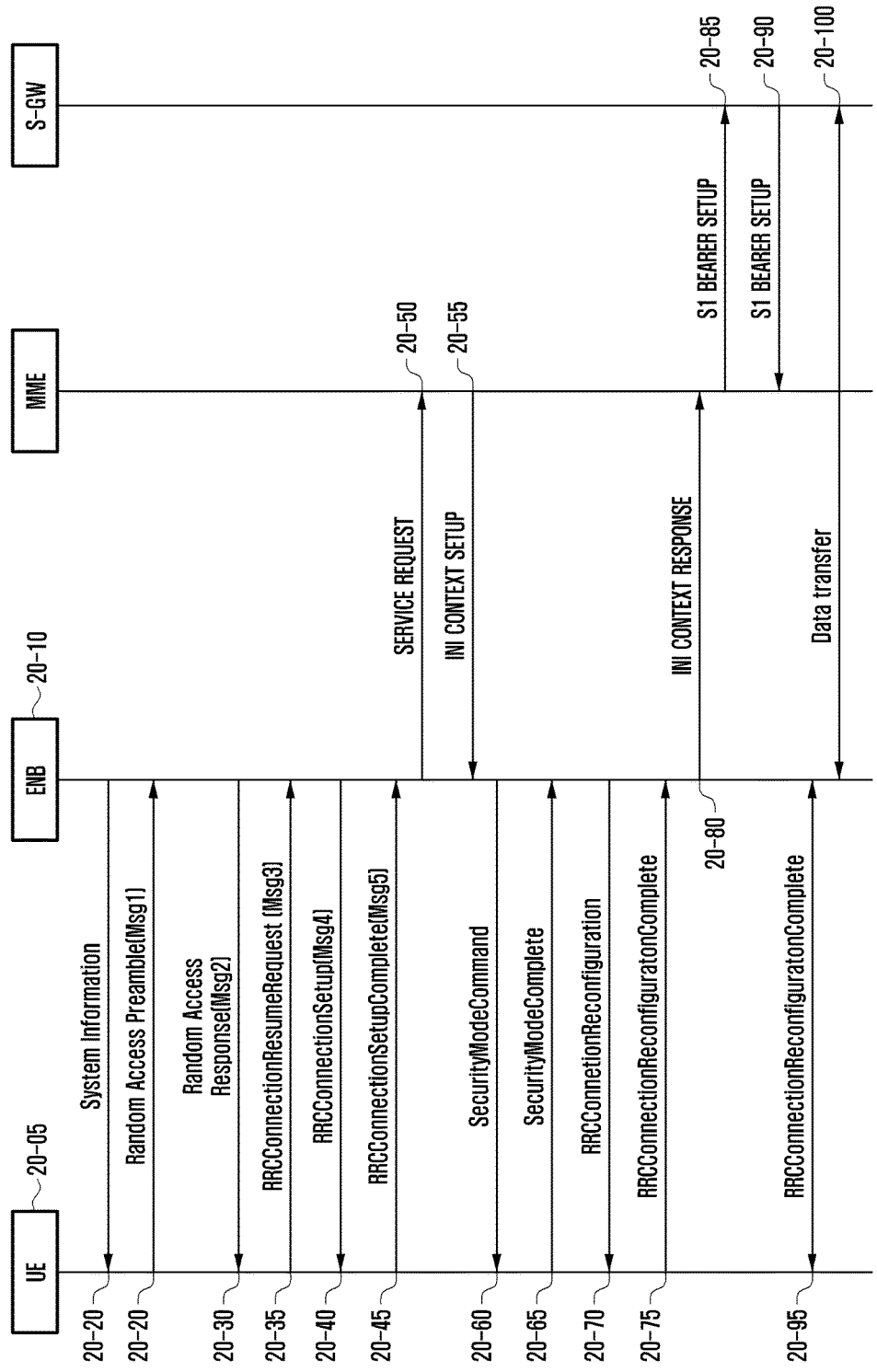
FIG. 20 is a signal flow diagram illustrating a legacy random access procedure.

FIG. 20 is a signal flow diagram illustrating a random access procedure.

At step 20-20, RACH procedure-related system information is broadcast. The system information includes information on the preamble ID range of RACH preamble group A, the preamble ID range of RACH preamble group B, UE transmission message size threshold (THRES), and channel status offset. For more details on the above parameters, refer to the 3GPP standard TS36.331.

If a preamble group and a preamble are selected, the UE 20-05 transmits the preamble (hereinafter, interchangeably referred to as message 1 or Msg1) to the eNB 20-10, using PRACH resource, at step 20-25. If the preamble is received, the eNB 20-10 transmits to the UE 20-05 a Random Access Response (RAR) message (hereinafter, interchangeably referred to as message 2 or Msg2), as an RACH response message, including a Random Access Preamble ID (RAPID) for identifying the received preamble, Timing Advance (TA) information for adjusting uplink timing, an uplink (UL) resource allocation information for transmitting the message at step 20-35 (UL grant), and a Temporary UE identity information (Temporary C-RNTI) at step 20-30.

The RAR message may also include the information on various types of preambles as described above. That is, the RAR message may include a plurality of RAPIDs, TAs, UL grants, Temporary C-RNTIs. The UE 20-05 may identify the signal carrying information for it with the RAPID.

If multiple UEs transmit the same preamble at step 20-25, collision may occur and, in this case, the eNB 20-10 transmits to the UE 20-05 a collision resolution message at step 20-40, the collision resolution message including UE-specific IDs (S-TMSIs) or random number information of the UEs which have transmitted the preamble in the collision situation, the information being received at step 20-35.

Each of the UEs which have used the same preamble at step 20-25 determines whether any of the UE-specific IDs or random number information included in the message received at step 20-40 matches the UE-specific ID or random number information it has transmitted at step 20-35 and, if so, performs an RRC connection establishment procedure and otherwise, if not, the RACH procedure again.

In the RRC connection establishment procedure, the UE 20-05 achieves uplink synchronization with the eNB 20-10 through the random access procedure and transmits the RRCConnectionRequest message (hereinafter, interchangeably referred to as message 3 or Msg3) at step 20-35. The RRCConnectionRequest message includes the identifier of the UE 20-05 and a connection establishment cause.

The eNB 20-10 transmits an RRCConnectionSetup message (hereinafter, interchangeably referred to as message 4 or Msg4) for establishing an RRC connection along with the collision resolution message at step 20-40. The RRCConnectionSetup message includes RRC connection setup information. The RRC connection is also referred to as Signaling Radio Bearer (SRB) and used for exchanging RRC messages as control messages between the UE 20-05 and the eNB 20-10.

After the RRC connection setup has been completed, the UE 20-05 transmits an RRCConnectionSetupComplete message (hereinafter, interchangeably referred to as message 5 or Msg5) to the eNB 20-10 at step 20-45. The RRCConnectionSetupComplete message includes a control message called SERVICE REQUEST in order of the UE 20-05 to request to the MME for bearer establishment for a predetermined service.

The eNB 20-10 transmits to the MME the SERVICE REQUEST message included in the RRCConnectionSetupComplete message at step 20-50, and the MME determines whether to provide the service requested by the UE 20-05. If it is determined to provide the service requested by the UE 20-05, the MME transmits an INITIAL CONTEXT SETUP REQUEST message to the eNB 20-10 at step 20-55.

The INITIAL CONTEXT SETUP REQUEST message includes Quality of Service (QoS) and security information (e.g., Security Key and Security Algorithm) for use in establishing a Data Radio Bearer (DRB). The eNB 20-10 transmits a SecurityModeCommand message to the UE 20-05 at step 20-60, and the UE 20-05 transmits a SecurityModeComplete message to the eNB 20-10 in response to the SecurityModeCommand message at step 20-65, resulting in security setup.

If the security setup has been completed, the eNB 20-10 transmits an RRCConnectionReconfiguration message to the UE 20-05 at step 20-70. The RRCConnectionReconfiguration message includes DRB configuration information for use in processing user data and thus the UE 20-05 configure a DRB based on the DRB configuration information and then transmits an RRCConnectionReconfigurationComplete message to the eNB 20-10 at step 20-75.

After configuring the DRB to the UE 20-05, the eNB 20-10 transmits an INITIAL CONTEXT SETUP COMPLETE message to the MME at step 20-80 and, upon receipt of this message, the MME transmits an S1 BEARER SETUP message to the S-GW at step 20-85 and receives an S1 BEARER SETUP RESPONSE message from the S-GW to configure an S1 bearer. The S1 bearer is a dedicated data connection being established between the S-GW and the eNB 20-1 and corresponds to the DRB one by one. If the above operations have been completed, the UE 20-05 and the eNB 20-10 perform data communication via the S-GW at steps 20-95 and 20-100.

As described above, the data transmission procedure is typically divided into three phases: RRC connection setup, security configuration, and DRB configuration. If there is no data to transmit during a predetermined period or if connection failure occurs because of a network condition, the eNB in the RRC connected state transitions back to the idle state in which, in order to attempt to connect the network again, it has to perform the above-described procedure.

If a large number of UEs perform the procedure represented by steps 20-20 to 20-90 simultaneously, this may cause significant battery consumption problem as well as significant signaling overhead. Furthermore, if the number of UEs operating in an extended coverage mode (such as NB-IoT UEs, BL UEs, UEs in CE, and eMTC UEs) increased in addition to the ordinary UEs in the network, the signaling overhead problem may become worse.

There are two solutions to solve the above problems. The first solution is a Control Plane-based (CP-based) solution for transmitting the data in Non Access Stratum (NAS) messages over control plane SRB to efficiently process the packets of the extended coverage mode UEs, the packets being small in size and occurring sporadically. That is, the UE 20-05 may transmit packets to the eNB 20-10 using a dedicatedNASInfo field of the RRCConnectionSetupComplete message at step 20-45 of FIG. 20. Here, the NAS messages are control messages exchanged between the UE 20-05 and the MME.

The second solution is a User Plane-based (UP-based) solution in which the UE 20-05 and the network store the UE information (UE context) for reuse in the next connection.

An embodiment of the present disclosure proposes the elements used for implementing the second solution along with detailed description thereof.

If a UE in the RRC-connected state has no data to transmit/receive during a predetermined period, the eNB releases the connection with the UE and thus the UE enters the idle state and, in this case, the eNB and the UE delete the UE context. In order for the UE in the idle state to connect to the network again, it has to perform the procedure represented by steps 20-20 to 20-90 of FIG. 20.

In order to reduce such signaling overhead, it may be considered that the eNB and the UE maintain the UE context, even when the UE enters the idle state, for reuse in the next network connection attempt. However, this operation requires a new request message (hereinafter, referred to as Resume Request message or RRCConnectionResumeRequest).

It may be possible to use a message defined for Common Control Channel (CCCH) (e.g., RRCConnectionRequest) as the Resume Request message or to newly define the Resume Request message. The Resume Request message may include a Resume ID, a Short MAC-I, and an Establishment cause.

The Resume ID included in the Resume Request message is used by the eNB which has received the Resume Request message from the UE for identifying the corresponding UE. The Resume ID may have a size of 40 bits or 25 bits and, for convenience of explanation, the 40-bit Resume ID is referred to as Full ID (FID) while the 25-bit Resume ID is referred to as Truncated ID (TID).

If the eNB releases the connection of the UE in the RRC-connected state, it allocates a 40-bit Resume ID. If it becomes beneficial to connect to the network afterward, the UE transmits the Msg3 including the Resume ID to a new eNB or the old eNB to which it has connected (when the UE mobility is low).

In order to use the 40-bit Resume ID, however, it is useful to extend the size of the current Msg3. The Transport Block Size (TBS) of the legacy Msg3 (i.e., legacy RRCConnectionRequest) is 56 bits which is not enough to carry the 4-bit FID. In the present disclosure, it is proposed to use the legacy 56-bit TBS for TID and a 72-bit TBS for FID. The eNB notifies the UE of the type of the Resume ID (i.e., FID or TID) to use, and the UE determines whether to perform a Resume procedure or the legacy RRC Connection Setup (or establishment) procedure based on the type of the Resume ID and channel condition.

In the present disclosure, the UE determines the type of Msg3 (or type of Resume ID or CCCH message) according to its operation mode. The operation mode is categorized into one of and enhanced coverage mode for machine type communication and a normal mode for ordinary communication. In the enhanced coverage mode, the UE perform all uplink transmission and downlink reception repeatedly a number of times as instructed by the eNB. Meanwhile, in the normal mode, the UE does not repeat receiving downlink signals (downlink reception in the random access procedure)

and, unless otherwise instructed by the eNB using a dedicated RRC message, transmitting uplink signals.

The UE may determine its operation mode in the cell selection/reselection procedure and, if a normal mode operation-capable cell and an enhanced coverage mode-only cell coexist, selects the normal mode operation-capable cell with priority. The radio resources designated for the enhanced coverage mode and normal mode are mutually exclusive. For example, the UE can use only dedicated-coverage mode frequency/time resources in the enhanced coverage mode and only dedicated-normal mode frequency/time resources in the normal mode.

In the present disclosure, the eNB broadcasts a UP solution (or UEL context retrieval solution) supportability and type of required Resume ID using its system information, and the UE determine the types of the CCH message and Resume ID in consideration of its operation mode, the broadcast information, the channel condition.

If the UE operating in the enhanced coverage mode performs the Resume operation, it determines the type of CCCH message based on whether the serving cell supports the UP solution. If the serving cell supports the UP solution, the UE transmits a Resume Request message including the FID; if the serving cell does not support the UP solution, the UE transmits a RRC Connection Request message. The reason why the TID is not used in the enhanced coverage mode is that it is possible to transmit a large CCCH message through repetitive transmission even when the channel condition is bad. For the UE operating in the normal mode, it is required for the serving cell to support the UP solution and for the UE to use the FID and, if the channel condition is better than a predetermined threshold, the UE transmits the Resume Request message including the FID. If the UP solution is supported and the use of TID is required, the UE transmits the Resume Request message including the TID without consideration of the channel condition. If the channel condition is worse than a predetermined threshold although the UP solution is supported and the use of FID is required, the UE initiates the legacy RRC Connection Setup procedure rather than the Resume procedure. That is, the UE transmits an RRC Connection Request message.

Figure 21:
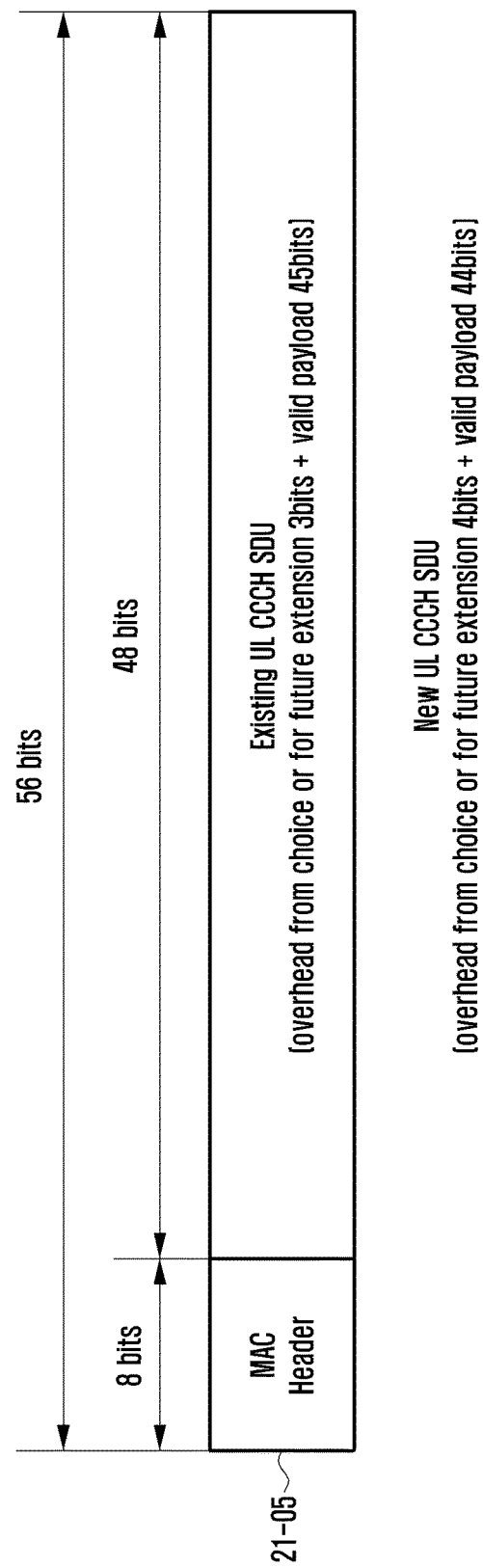
FIG. 21 is a diagram illustrating a message format of Msg3 including a CCCH SDU for use in LTE uplink.

FIG. 21 is a diagram illustrating a message format of Msg3 including a CCCH SDU for use in LTE uplink.

As shown in FIG. 21, the legacy LTE Msg3 is 56 bits and includes a MAC header and a CCCH SDU. The extended Msg3 (e.g., 72-bit extended Msg3) may include a Resume ID (40 bits), an Establishment cause (3 bits), a Short MAC-I (16 bits), a MAC/RRC overhead (12 bits), and a Spare (1 bit). In the case of using a new Resume Request message, it may be useful to define the new Resume Request message with 1 extra bit to be distinguished from the legacy LTE Msg3.

In the Resume Request message 21-05, an available payload size is 44 bits including 16 bits for the short MAC-I and 3 bits for the Establishment cause. Accordingly, the Resume ID may be allocated the remaining 25 bits (or 24 bits if one bit is reserved for future use). However, when the eNB serving the UE in the RRC-connected state releases the connection with the corresponding UE, it allocates a 40-bit Resume ID. Accordingly, in order for a normal UE to use the legacy LTE Msg3 (56 bits), it is useful to divide the 40-bit Resume ID into several parts and combine a few of the parts into a Truncated resume ID (e.g., 25-bit Truncated resume ID).

Figure 22:
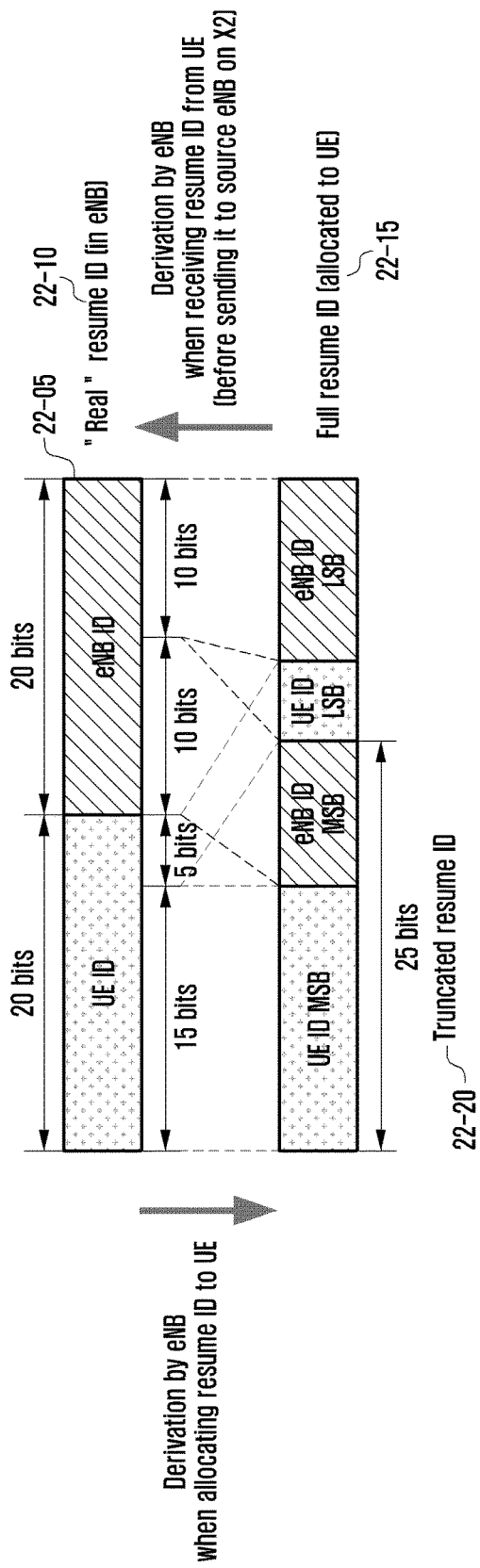
FIG. 22 is a diagram illustrating truncating option 1 for generating a Truncated resume ID by dividing a 40-bit Resume ID into several parts and rearranging the parts according to the third embodiment of the present disclosure.

FIG. 22 is a diagram illustrating truncating option 1 for generating a Truncated resume ID (e.g., 25-bit TID) by dividing a 40-bit Resume ID into several parts and combining a few of the parts according to an embodiment of the present disclosure.

The eNB has a real Resume ID (RID) 22-10 to be allocated to the UE to which the connection the eNB intends to release, the real RID consisting of a 20-bit UE ID and a 20-bit eNB ID 22-05. The eNB divides the RID into several parts and rearranges the parts to generate a full resume ID (FID) 22-15.

In the process, the eNB divides the 20-bit UE ID into a UE ID Most Significant Bits (MSB) part of 15 bits and a UE ID Least Significant Bits (LSB) part of 5 bits and the 20-bit eNB ID into an eNB ID MSB part of 10 bits and an eNB ID LSB part of 10 bits and then rearranges the UE ID MSB and LSB parts and the eNB ID MSB and LSB parts to generate the FID. Here, the combination of the UE ID MSB part and the eNB ID MSB part is used as the Truncated resume ID (TID). If the FID is received, the UE may use the 40-bit resumed FID 22-15 in need of FID transmission and the 25-bit TID 22-20 in need of TDI transmission.

Figure 23:
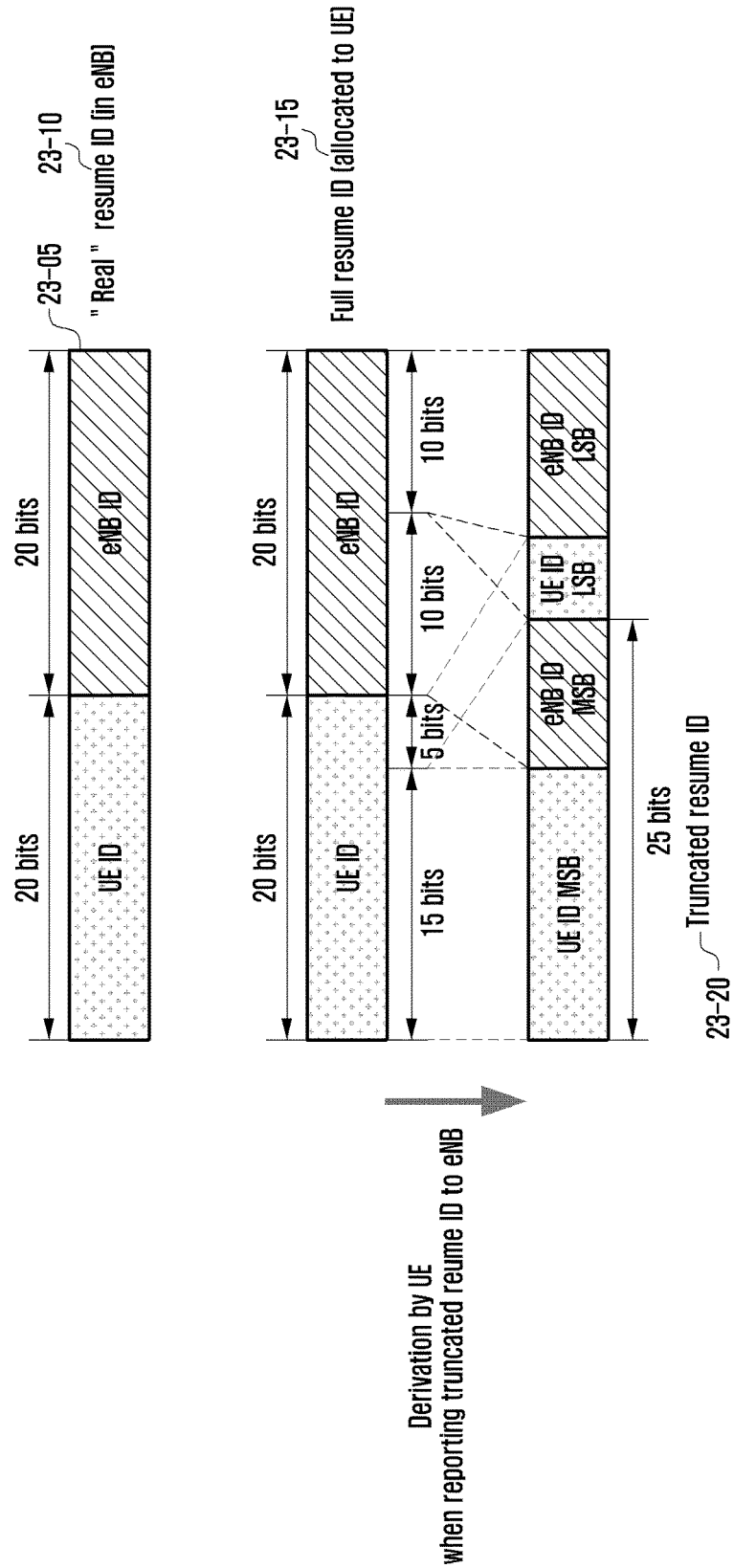
FIG. 23 is a diagram illustrating truncating option 2 for generating a Truncated resume ID by dividing a 40-bit Resume ID into several parts and rearranging the parts according to the third embodiment of the present disclosure.

FIG. 23 is a diagram illustrating truncating option 2 for generating a Truncated resume ID (e.g., 25-bit TID) by dividing a 40-bit Resume ID into several parts and rearranging the parts according to an embodiment of the present disclosure. The eNB has a Real Resume ID (RID) 23-10 to be allocated to the UE to which the connection the eNB intends to release, the real RID consisting of a 20-bit UE ID and a 20-bit eNB ID 23-05.

The eNB has an RID and allocates the RID as a FID 23-15 to the UE without modification. The UE processes the FID to generate a TID 23-20. In this process, the UE divides the 20-bit UE ID into a UE ID Most Significant Bits (MSB) part of 15 bits and a UE ID Least Significant Bits (LSB) part of 5 bits and the 20-bit eNB ID into an eNB ID MSB part of 10 bits and an eNB ID LSB part of 10 bits and then combines the UE ID MSB and the eNB ID MSB to generate the 25-bit TID. The UE may use the FID 23-15 identical with the RID 23-10 in need of FID transmission and the 25-bit TID 23-20 in need of TID transmission.

As described above, the UE operating in an extended coverage mode (NB-IOT UE, BL UE, UE in CE, or eMTC UE) uses the legacy LTE Msg3 of 56 bits or the extended Msg3 of 72 bits according to the system information broadcast by the eNB, and a normal UE determines the type of Msg3 to use according to the system information and uplink channel condition.

However, the eNB cannot be aware of the type of Msg3 selected by the UE (legacy LTE Msg3 or extended Msg3). This means that the eNB cannot allocate resources suitable for the size of the Msg3 to be transmitted by the UE in the RAR Msg2 for allocating uplink resources to the UE (uplink grant) at step 20-30 of FIG. 20. Such an operation causes resource waste.

In order to protect against such resource waste, the third embodiment of the present disclosure proposes a method for sorting random access preamble resources into preamble groups and determining one of the preamble group for the UE to inform the eNB of the type of Msg3 to be used using the Msg1 along with the eNB operation in association with Msg2 and UE operation in association with Msg3, the method being described in detail with reference to FIG. 24 and tables 2 and 3.

Figure 24:
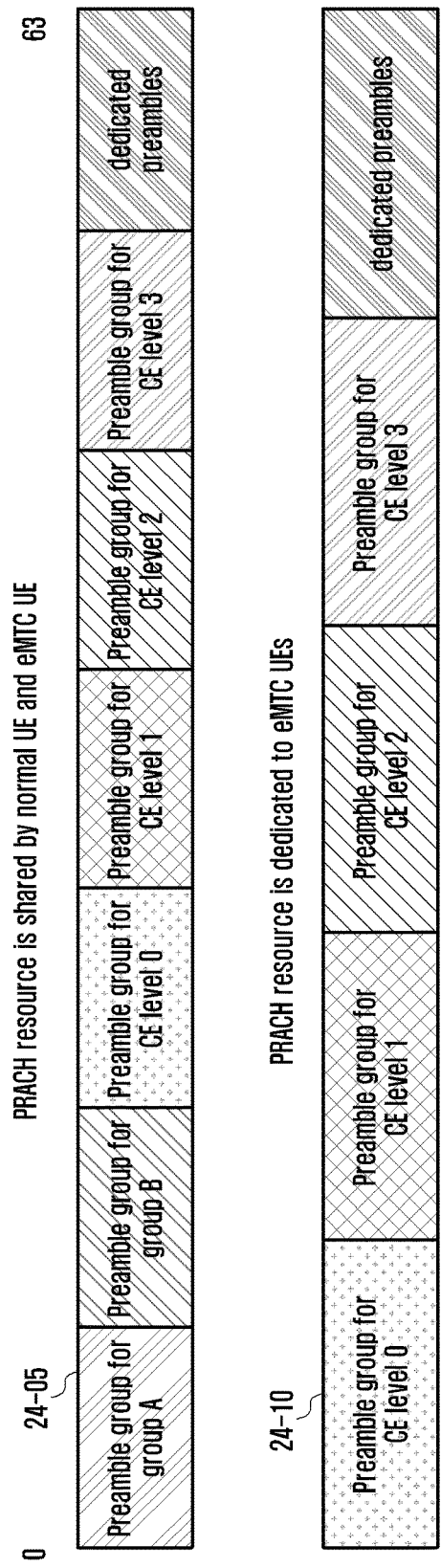
FIG. 24 is a diagram illustrating PRACH resource structures for an eNB to support normal UEs and UEs operating in the extended coverage modes (or normal mode and enhanced mode)

FIG. 24 is a diagram illustrating PRACH resource structures for an eNB to support normal UEs and UEs operating in the extended coverage modes (or normal mode and enhanced mode). As denoted by reference number 24-05, 64 preamble resources are sorted for use by the normal UE and UEs operating in the extended coverage UEs.

A normal UE selects one of group A and group B in consideration of channel condition and transmits the Msg1 20-25 of FIG. 20 (random access procedure) with a preamble selected in the corresponding group. Whether the channel is good or bad is may be determined based on path-loss. If the path-loss is greater than a predetermined threshold, the UE may determine that the channel is bad and, as a consequence, select the preamble group A; if the path-loss is less than a predetermined threshold, the UE may determine that the channel is good and, as a consequence, select the preamble group B.

The UE operating in the extended coverage mode has a Coverage Extension (CE) function to overcome a low transmit power because it is likely to be installed in an area with bad communication conditions. For the CE function, the UEs operating in the extended coverage mode may be categorized into CE levels 0 to 3 based on the cell level (CE level 0 indicates a normal coverage, and the coverage increases in the ascending order of the CE levels).

In the case of a UE operating in the extended coverage mode, the UE may sort the preamble resources into groups by the CE level as denoted by reference number 24-05 of FIG. 24. An eNB supporting the UEs operating in the extended coverage mode may sort the preamble resources into preamble groups by the CE level as denoted by reference number 24-10 of FIG. 24.

TABLE 2

| Preamble Group/Resume ID type Selection | | Supported resume ID in the current cell | |
|---|---|---|---|
| | | Truncated resume ID (TID) | Full resume ID (FID) |
| PRACH partitioning in the current cell | Only Group A | Always Group A & TID | Invalid Configuration |
| | Both Group A and B | Always Group A & TID | If path loss < threshold, Group B & FID otherwise, Group A (fail back). |

Table 2 shows the types of resume ID available for Msg3 and preamble groups from which a preamble is selected for Msg1 for use by a normal UE according to an embodiment of the present disclosure. A UE operating in the extended coverage mode uses a resume ID supported by the cell in consideration of the system information.

The normal UE may receive the information on the resume ID supported by the corresponding cell, preamble groups, and path loss through the system information. If the corresponding cell supports TID, the UE transmits the Msg1 with a preamble belonging to Group A. If the corresponding cell supports FID, the UE transmits the Msg1 with a preamble belonging to Group B for the case where the path loss is less than a predetermined threshold (channel condition is good) or with a preamble belonging to Group A for the case where the path loss is greater than a predetermined threshold (channel condition is bad) and then returns to the RRC Connection Request procedure without Resume Request Procedure. That is, the UE determines that the 72-bit extended message longer than the legacy 56-bit LTE message is supported when the channel condition is good.

| Expected behavior | Supported resume ID in the current cell | |
|---|---|---|
| | Truncated resume ID (TID) | Full resume ID (FID) |
| eNB | 56 bits grant in RAR (Msg2) | 72 bits grant in RAR (Msg2) |
| UE | Resume with TID (Msg3) | Resume with FID (Msg3) |

Table 3 summarizes an eNB operation in association with Msg2 transmission and a normal UE operation in association with Msg3 transmission when the normal UE selects a preamble group and transmits the Msg1 with a preamble from the corresponding preamble group. If it is determined that the preamble received from the UE belongs to preamble group A, the eNB allocates 56-bit uplink resource to the UE using the Msg2. If the Msg2 is received, the UE transmits the Msg3 including a TID to the eNB. If it is determined that the preamble received from the UE belongs to preamble group B, the eNB allocates 72-bit uplink resources to the UE using the Msg2. If the Msg2 is received, the UE transmits the Msg3 including a FID to the eNB.

Figure 25:
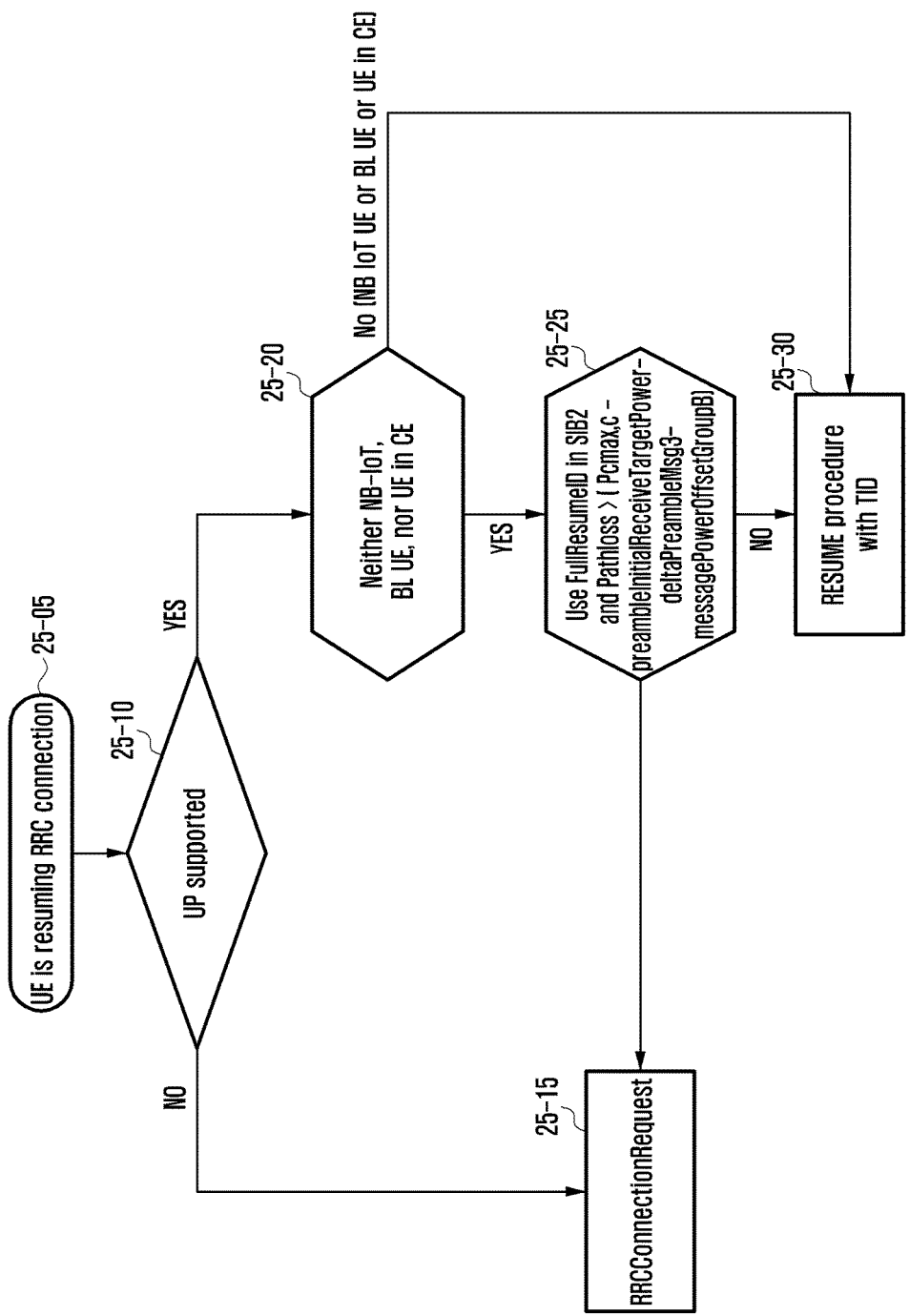
FIG. 25 is a flowchart illustrating a procedure for a UE to resume the RRC connection according to the third embodiment of the present disclosure.

FIG. 25 is a flowchart illustrating a procedure for a UE to resume the RRC connection according to the third embodiment of the present disclosure. The UE of which connection to the network is suspended may resume the connection at step 25-05. The UE camps on a cell through an initial procedure for RRC connection setup and receives system information of the corresponding cell.

The system information may include type of resume ID supported in the corresponding cell, CP-based scheme or UP-based scheme supportability, preamble group information, and path-loss information. The UE determines step 25-10 whether the corresponding cell support the UP-based scheme based on the system information. If it is determined that the cell does not support the UP-based scheme, the UE performs the connection setup procedure using the RRCConnectionRequest message of the legacy LTE system at step 25-15.

If it is determined at step 25-10 that the cell supports the UP-based scheme, the procedure goes to step 25-20. At step 25-20, if the UE is a NB-IoT UE, a BL UE, a UE in CE, or an eMTC UE, it attempts connection setup using the newly defined RRCConnectionResumeRequest message at step 25-30.

Otherwise, if it is determined at step 25-20 that the UE is neither a NB-IoT UE, a BL UE, a UE in CE, nor an eMTC UE, the procedure goes to step 25-25. At step 25-25, the UE determines whether the cell on which the UE camps uses FID and path-loss in the cell is greater than a predetermined value and, if so, performs the connection setup procedure using the RCCConnectionRequest message of the legacy LTE system at step 25-15

The type of resumed ID for use in determining whether the UE uses FID may be included in the system information, particularly, SIB2. The predetermined value may be calculated by Pcmax,c−preambleInitialReceiveTargetPower−deltaPreambleMsg3−messagePowerOffsetGroupB. The above parameters are defined in TS36.331, and the predetermined value may be calculated using other parameters.

If it is determined at step 25-25 that the cell on which the UE camps neither uses FID nor path-loss in the cell is greater than the predetermined value, the UE attempts connections setup using the newly defined RRCConnectionResumeRequest message at step 25-30.

Figure 26:
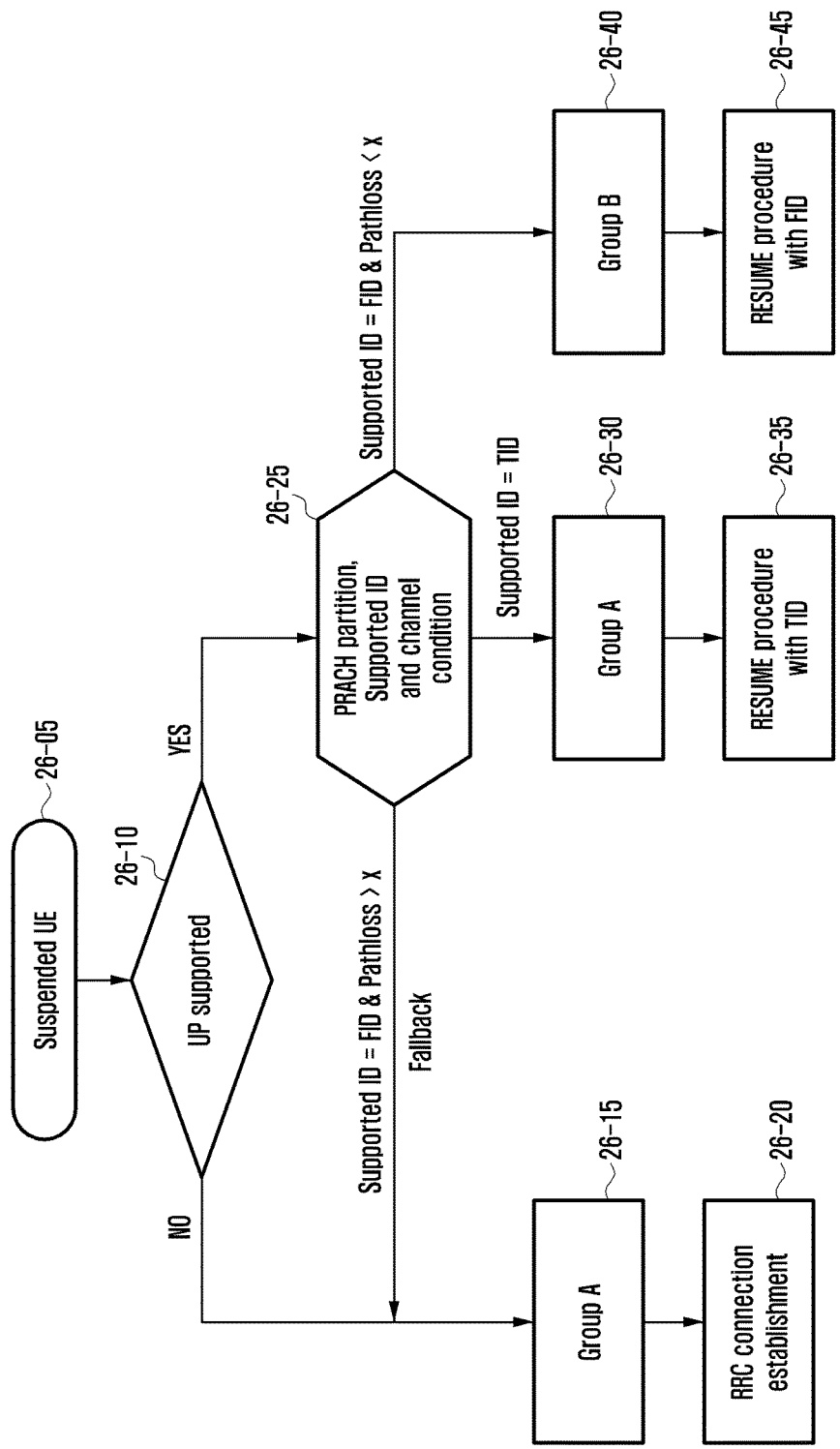
FIG. 26 is a flowchart illustrating a procedure for a normal UE to determine the type of preamble for use in Msg1 and the type of resume ID for use in Msg3 in the random access procedure based on the system information and channel condition according to an embodiment of the present disclosure.

FIG. 26 is a flowchart illustrating a procedure for a normal UE to determine the type of preamble for use in Msg1 and the type of resume ID for use in Msg3 in the random access procedure based on the system information and channel condition according to an embodiment of the present disclosure.

The eNB releases the connection of a normal UE in the RRC-connected state thereto without data transmission during a predetermined period and allocates a 40-bit resume ID to the UE. The 40-bit resume ID may have a structure of FID as shown in FIGS. 22 and 23. The normal UE of which connection is released (hereinafter, referred to as suspended UE) may trigger a connection resume procedure at step 26-05. The normal UE camps on a cell through an RRC Connection setup procedure and receives system information of the corresponding cell.

The system information may include type of resume ID supported in the corresponding cell, CP-based scheme or UP-based scheme supportability, preamble group information, and path-loss information. The UE determines at step 26-10 whether the corresponding cell supports the UP-based scheme based on the system information.

If it is determined that the cell does not support the UP-based scheme, the UE transmits a preamble selected from preamble group A using Msg1 for the random access procedure at step 26-15 and performs the RRC Connection Establishment procedure at step 26-20. If it is determined at step 26-10 that the cell supports the UP-based scheme, the UE checks for preamble group information, type of resume ID supported by the corresponding cell, and channel condition at step 26-25.

If the type of resume ID supported by the corresponding cell is TID, the UE transmits a preamble selected from preamble group A using the Msg1 of the random access procedure at step 26-30 and generates the Msg3 with the TID as the resume ID at step 26-35.

If the type of the resume ID supported by the corresponding cell is FID, the UE determines whether the path-loss is less than a predetermined threshold (channel is good), and if so, transmits a preamble selected from preamble group B using the Msg1 of the random access procedure at step 26-40 and generates the Msg3 with the FID as the resume ID at step 26-45. If it is determined at step 26-25 that the resume ID supported by the corresponding cell is FID and the path-loss is greater than a predetermined threshold (channel is bad), the UE transmits a preamble selected from preamble group A using the Msg1 of the random access procedure at step 26-15 and performs the RRC connection establishment procedure at step 26-20.

Figure 27:
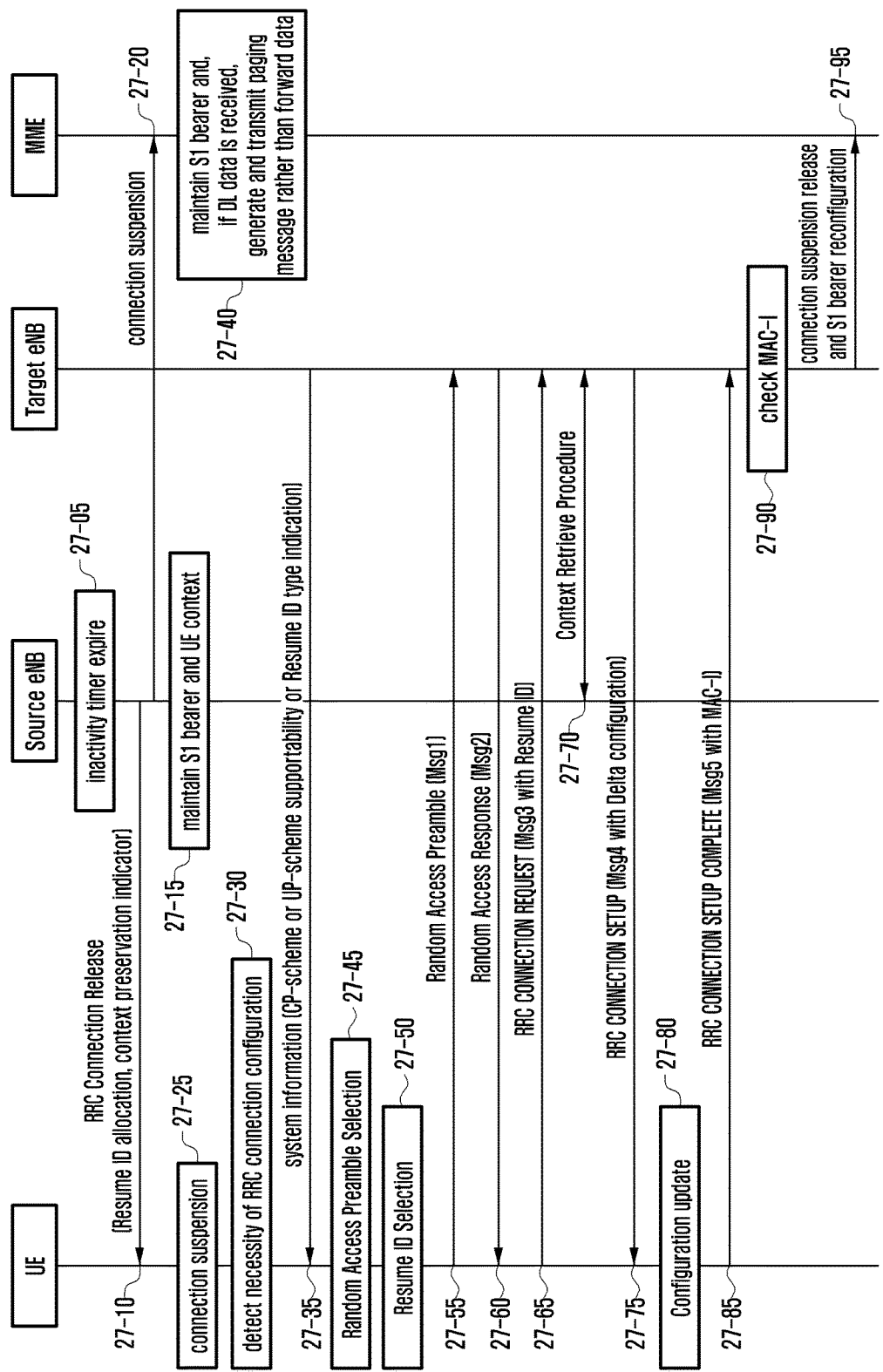
FIG. 27 is a signal flow diagram illustrating signal flows among a UE, a source eNB, a target eNB, and an MME in a Resume request procedure according to the third embodiment of the present disclosure.

FIG. 27 is a signal flow diagram illustrating signal flows among a UE, a source eNB, a target eNB, and an MME in a Resume request procedure according to the third embodiment of the present disclosure. The resume request procedure is performed efficiently by reuse of the UE context between a UE and an eNB to reuse the UE context, resulting reduction of battery power waste and signaling overhead.

In FIG. 27, the UE in the RRC-connected state is communicating data with the source eNB. If the data communication is stopped, the source eNB starts a timer and, if data transmission is not resumed before the expiry of the timer at step 27-05, considers releasing the RRC connection of the UE. The source eNB releases the RRC connection of the UE according to a predetermined rule, stores the UE context, and transmits a control message indicating the UE to release the RRC connection with a 40-bit resume ID.

The UE is aware of the necessity of storing the UE context based on the allocation of the resume ID or a separate context preservation indicator transmitted by the source eNB at step 27-10. The control message may include a context preservation period of the eNB or a list of cells in which the UE is capable of performing the RRC connection reconfiguration procedure with the stored context during a validity period. The resume ID may be allocated according to the methods proposed in FIGS. 4E and 4F.

After releasing the RRC connection of the UE, the source eNB maintains the UE context and S1 bearer at step 27-15. The S1 bearer denotes the S1-control bearer for use in exchanging control messages between the eNB and the MME and the S1-user plane bearer for use in transmitting user data between the eNB and the S-GW. By maintaining the S1 bearer, it is possible to skip an S1 bearer configuration procedure when the UE establish an RRC connection to the same cell or same eNB. Upon expiry of the validity period, the source eNB may delete the UE context and release the S1 bearer.

The source eNB transmits a control message requesting to the MME for connection suspension at step 27-20. If the control message is received, the MME instructs the S-GW to request, when downlink data for the UE is received, to the MME for triggering a paging procedure rather than to forward the downlink data to the source eNB, and the S-GW operates according to the instruction at step 27-40.

If the network entities do not operate as above, i.e., if the S-GW forwards the downlink data to the source eNB, the source eNB has to receive and store the downlink data destined for the UE of which RRC connection has been released and perform a paging procedure. If the UE has moved to the service area of another target eNB (target eNB in FIG. 27), it may be useful to laboriously request to the MME to trigger a paging procedure. In order to avoid this laboriousness, the source eNB transmits to the MME the connection suspension control message for the UE of which the RRC connection has been released but the UE context has been stored.

If the RRC connection release message including context preservation indicator information and the 40-bit resume ID is received at step 27-10, the UE releases the RRC connection, starts a timer for monitoring the validity period, writes an available cell list in the memory, and maintain the current UE context at step 27-25.

The UE context information includes various types of information related to the RRC configuration of the UE such as SRB configuration information, DRB configuration information, and security information. Afterward, the UE may establish an RRC connection for a certain reason at step 27-30. A UE which is neither allocated a resume ID nor instructed to maintain the UE context in the previous RRC connection release procedure initiates the legacy RRC connection setup procedure, but a UE which is allocated the resume ID in the previous RRC connection release procedure attempts the RRC connection setup procedure with the stored UE context (UP-based scheme).

The UE receives the system information of the cell on which it has camped on at step 27-35. The system information may include type of resume ID, CP-scheme or UPscheme supportability, preamble group, and path-loss. The UE selects a preamble to be transmitted as the Msg1 and a resume ID to be transmitted with the Msg3 in the random access procedure using tables 2 and 3 according to the procedure of FIG. 26 at step 27-50.

The UE transmits the selected preamble, i.e., Msg1 at step 27-55. The eNB which has received the Msg1 (preamble) determines the preamble group to which the preamble belongs and allocates uplink resources to the UE using the Msg2 according to the determined preamble group using table 2 at step 27-60. The UE transmits a Resume request message including the selected resume ID using the allocated uplink resources at step 27-65.

The Resume request message may be generated by modifying the RRC Connection Request message or newly defined (e.g., RRC Connection Resume Request message). If the UE of which the connection to the source eNB is released and moves, in the idle state, and camps on a cell of another eNB (target eNB in FIG. 27), the target eNB receives checks the resume request message for the resource ID of the UE and identify the source eNB which has served the UE.

If the target eNB identifies the source eNB successfully with the resume ID, it triggers a context retrieve procedure at step 27-70. The target eNB may bring the UE context from the source eNB through the S1 or X2 interface (if the target eNB fails identifying the source eNB although it has received the resume ID, it may transmit an RRC Connection Setup message to the UE to return to the legacy RRC connection establishment procedure).

The target eNB determines the RRC connection configuration for the UE based on the retrieved UE context and transmits to the UE a modified RRC connection setup message including the configuration information at step 27-75. The modified RRC connection setup message may be generated by including a REUSE INDICATOR indicating 'RRC context reuse' in the legacy RRC connection setup message.

The modified RRC connection setup message may include information related to the RRC connection configuration of the UE like the legacy RRC connection setup message. If the UE receives the legacy RRC connection setup message it configures the RRC connection based on the configuration information included in the RRC connection setup message; if the UE receives the modified RRC connection setup message, it configures the RRC connections in consideration of both the previously store configuration information and the configuration information included in the control message (Delta configuration).

The UE determines the received configuration information as the delta information corresponding to the stored configuration information and updates the configuration information the UE context with the data information at step 27-80. For example, if the modified RRC connection setup message includes SRB configuration information, the UE configures an SRB based on the SRB configuration information; if the modified RRC connection setup message does not include any SRB configuration information, the UE configures an SRB based on the SRB configuration information contained in the UE context.

The UE configures the RRC connection based on the update UE context and configuration information and transmits a modified RRC connection setup complete message to the target eNB at step 27-85. The modified RRC connection setup complete message may be generated by including message authentication information (MAC-I) in the legacy RRC connection setup complete message. The MAC-I is a message authentication code generated by the UE in such a way of applying the security information of the retrieved UE context, i.e., security key and security counter, for use in the control message.

If the modified RRC connection setup complete message is received, the target eNB checks the message for integrity using the MAC-I of the modified RRC connection setup complete message and the security key and security counter contained in the UE context at step 27-90. If the integrity test succeeds, the target eNB transmits to the MME a control message requesting for release of the connection suspension and reconfiguration of the S1 bearer to the target eNB at step 27-95. If this control message is received, the MME instructs the S-GW to reconfigure the S1 bearer to the target eNB and to process data destined for the UE normally.

If the above described procedure has been completed, the UE resumes data communication in the cell. If the UE lost the connection to the source eNB moves little in the idle state and thus camps on the cell of the source eNB again, the source eNB retrieves the UE context of the UE based on the resume ID received in the Msg3 and reconfigures the connection in a similar way as described above based on the retrieved UE context in the above procedure.

Figure 28:
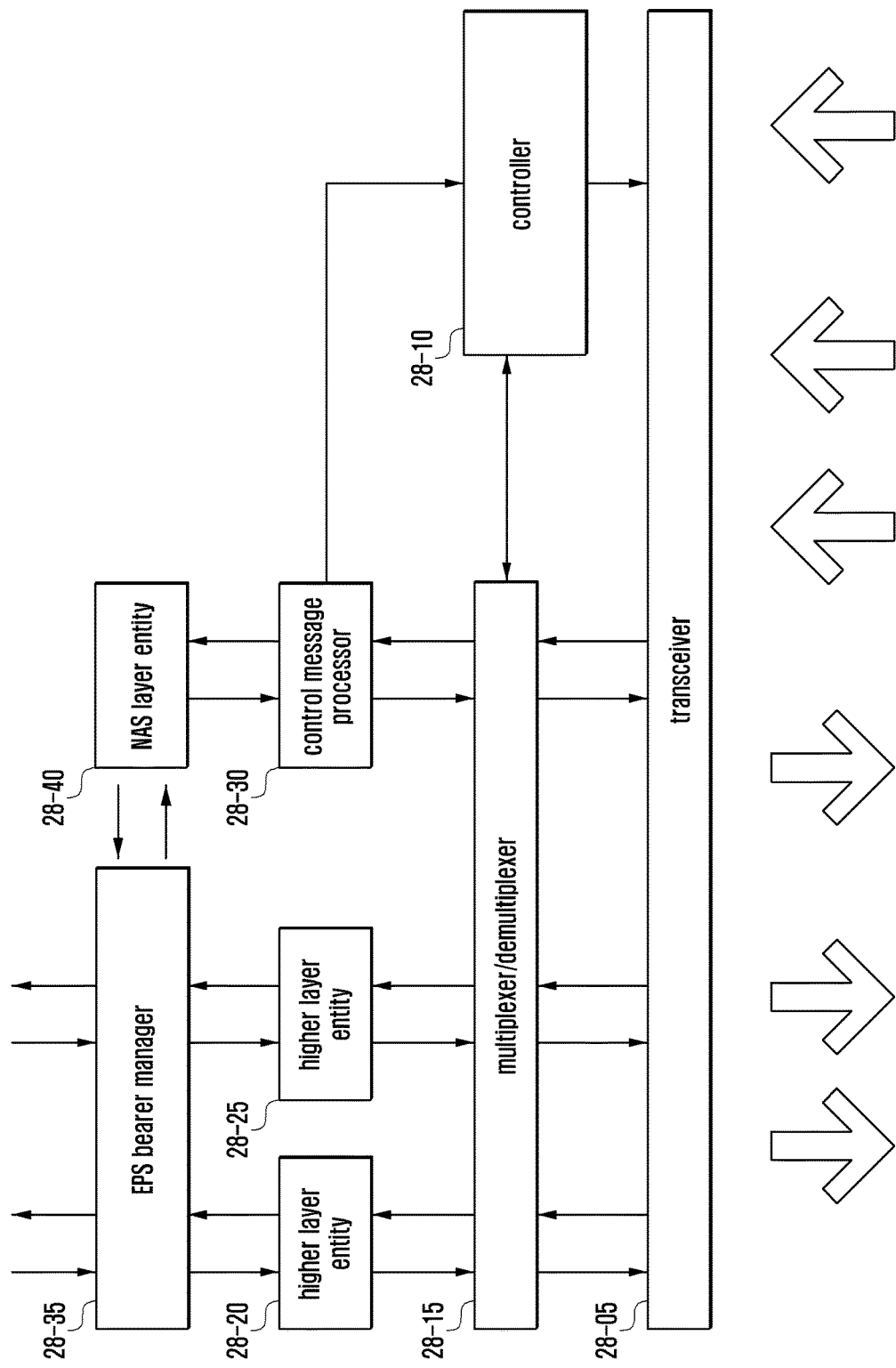
FIG. 28 is a block diagram illustrating a configuration of a UE according to the third embodiment of the present disclosure.

FIG. 28 is a block diagram illustrating a configuration of a UE according to the third embodiment of the present disclosure. As shown in FIG. 28, the UE according to the third embodiment of the present disclosure includes a transceiver 28-05, a controller 28-10, a multiplexer/demultiplexer 28-15, a control message processor 28-30, higher layer entities 28-20 and 28-25, an EPS bearer manager 28-35, and a NAS layer entity 28-40.

The transceiver 28-05 receives data and predetermined control signals through a downlink channel and transmits data and predetermined control signals through an uplink channel in a serving cell. In the case that multiple serving cells are configured, the transceiver 28-05 may perform data communication through the multiple serving cells.

The multiplexer/demultiplexer 28-15 multiplexes data generated from the higher layer entities 28-20 and 28-25 and the control message processor 28-30 and demultiplexes the data received by the transceiver 28-05, the demultiplexed data being delivered to the higher layer entities 28-20 and 28-25 and/or the control message processor 28-30.

The control message processor 28-30 is an RRC layer entity for processing the control message received from the eNB. For example, if the RRC CONNECTION SETUP message is received, the control message processor 28-30 configures an SRB and a temporary DRB.

The higher layer entities 28-20 and 28-25 (each higher layer entity being established by EPS bearer) are DRB entities (each DRB entity being configured by the service). The higher layer entities 28-20 and 28-25 process the data generated in association with a user service such as File Transfer Protocol (FTP) and Voice over Internet Protocol (VoIP) services and transfer the processed data to the multiplexer/demultiplexer 28-15 or process the data output from the multiplexer/demultiplexer 28-15 and transfer the processed data to higher layer service applications. One service may be mapped to one EPS bearer and one higher layer entity one by one.

The controller 28-10 checks for the scheduling command, e.g., uplink grant, received by the transceiver 28-05 and control the transceiver 28-05 and the multiplexer/demultiplexer 28-15 to perform uplink transmission using appropriate transmission resources at appropriate timings.

Figure 29:
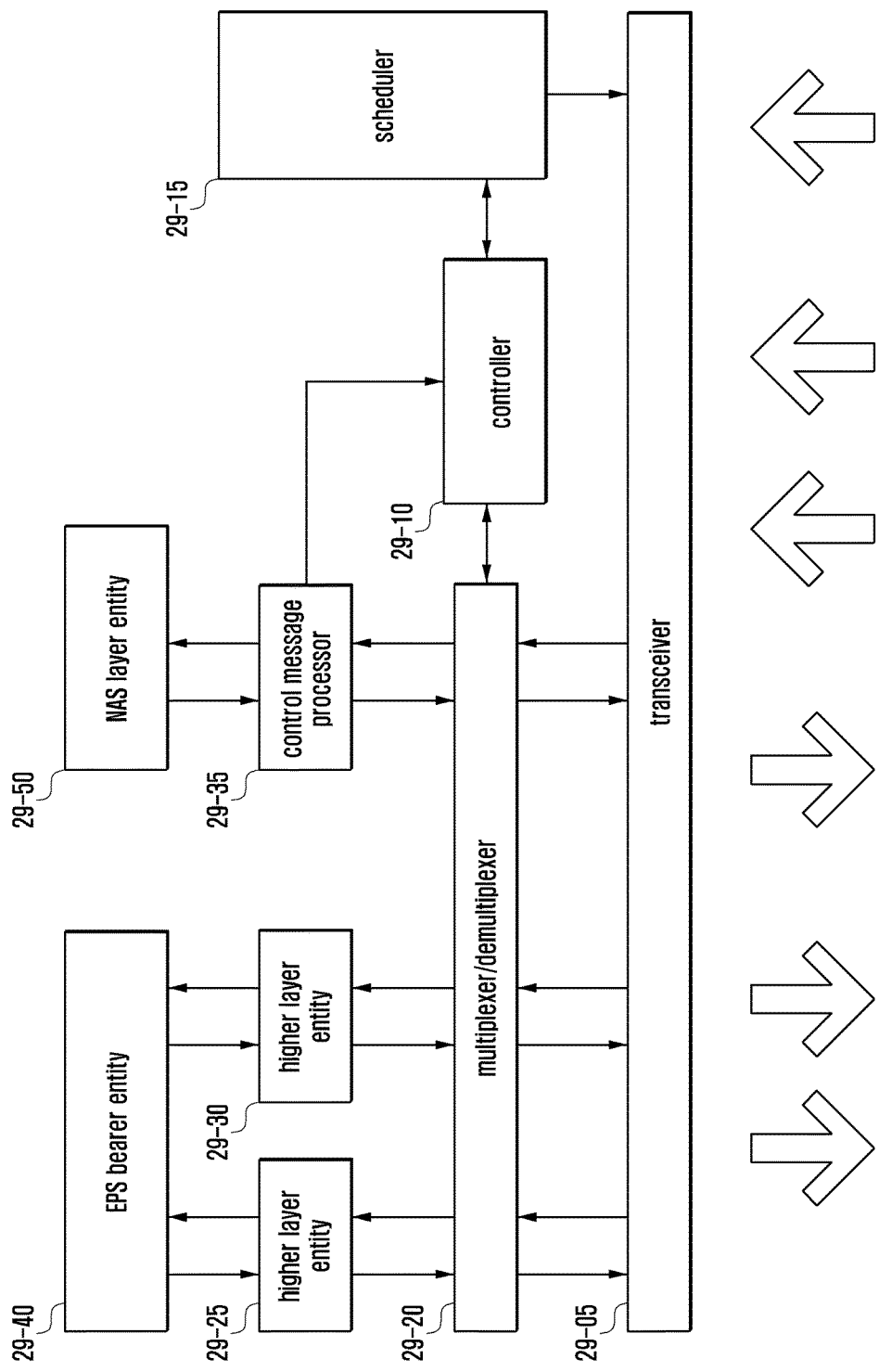
FIG. 29 is a block diagram illustrating a configuration of an eNB, MME, and S-GW according to the third embodiment of the present disclosure.

FIG. 29 is a block diagram illustrating a configuration of an eNB, MME, and S-GW according to the third embodiment of the present disclosure. As shown in FIG. 29, the eNB according to the third embodiment of the present disclosure includes a transceiver 29-05, a controller 29-10, a multiplexer/demultiplexer 29-20, a control message processor 29-35, higher layer entities 29-25 and 29-30, a scheduler 29-15, EPS bearer entities 29-40 and 29-45, and a NAS layer entity 29-50. The EPS bearer entity is located in an S-GW, and the NAS layer entity is located in an MME.

The transceiver 29-05 transmits data and predetermined control signals over a downlink carrier and receives data and predetermined control signals over an uplink carrier. If multiple carriers are configured, the transceiver 29-05 transmits and receives the data and control signals over the multiple carriers.

The multiplexer/demultiplexer 29-20 multiplexes data generated by the higher layer entities 29-25 and 29-30 and the control message processor 29-35 and demultiplex the data from the transceiver 29-05, the demodulated data being delivered to the higher layer entities 29-25 and 29-30, the control message processor 29-35, and or the controller 29-10. The control message processor 29-35 processes the control message received from the UE and takes an action according to the processing result or generates a control message to be transmitted to the UE, the control message being transferred to a higher layer.

The higher layer entities 29-25 and 29-30 (each higher layer entity being established by EPS bearer) process the data from the EPS bearer entities 29-40 and 29-45 into RLC PDUs, the RLC PDUs being transferred to the multiplexer/demultiplexer 29-20, or to process the RLC PDUs from the multiplexer/demultiplexer 29-20 into PDCP SDUs, the PDCP SDUs being delivered to the EPS bearer entities 29-40 and 29-45.

The scheduler allocates transmission resources to a UE at an appropriate timing in consideration of the buffer status and channel condition of the UE and controls the transceiver 29-05 to process the signals transmitted by the UE and to be transmitted to the UE.

The EPS bearer entities 29-40 and 29-45 configure EPS bearers and process the data from the higher layer entities 29-25 and 29-30, the processed data being transmitted to a next network node.

The higher layer entities 29-25 and 29-30 and the EPS bearer entities 29-40 and 29-45 are connected through S1-U bearers. The higher layer entity corresponding to a common DRB connects to an EPS bearer entity established for the common DRB through a common S1-U bearer.

The NAS layer entity 29-50 processes an IP packet contained in a NAS message and transmits the processed IP packet to the S-GW.

Fourth Embodiment

The fourth embodiment proposes a contention resolution method of a UE supporting the resume procedure and the RRC Connection Establishment procedure.

A random access procedure consists of a preamble transmission phase, a random access response message reception phase, a Msg3 transmission phase, and a contention resolution message reception phase.

The contention resolution can be achieved in such way that the eNB which has received the Msg3 indicting successful random access procedure sends the Msg3 back to the UE in a situation where more than one UE transmit same preamble. The Msg3 includes identity information capable of identifying the UE and thus the UE can determine whether it has succeeded the random access procedure based on whether the received contention resolution message is identical with the Msg3 it has transmitted.

As described in embodiment 3, a RESUME request message is carried in the Msg3 of the random access procedure and has the size of 64 bits for FID or 48 bits for TID.

The contention resolution message includes a 48-bit contention resolution MAC Control Element (CE) or a 64-bit contention resolution MAC CE, and the UE determines the type of the contention resolution MAC CE to be applied for contention resolution based on the size of the CCCH message it has transmitted.

The contention resolution MAC CE is carried in a MAC PDU and includes a Logical Channel ID for use in identifying the 48-bit contention resolution MAC CE and 64-bit contention resolution MAC CE in order to minimize the size of the MAC header by negating the necessity of header information indicating the size of the contention resolution MAC CE.

The LCID may be set to a first value (e.g., 11100) for the 48-bit MAC CE or a second value (e.g., 10111) for the 64-bit MAC CE, the first and second values being different from each other. Hereinafter, the contention resolution MAC CE identified by the LCID set to the first value is referred to as the first contention resolution MAC CE and the contention resolution MAC CE identified by the LCID set to the second value is referred to as the second contention resolution MAC CE. The first contention resolution MAC CE has a first size (e.g., 6 bytes), and the second contention resolution MAC CE has a second size (e.g., 8 bytes).

Figure 30:
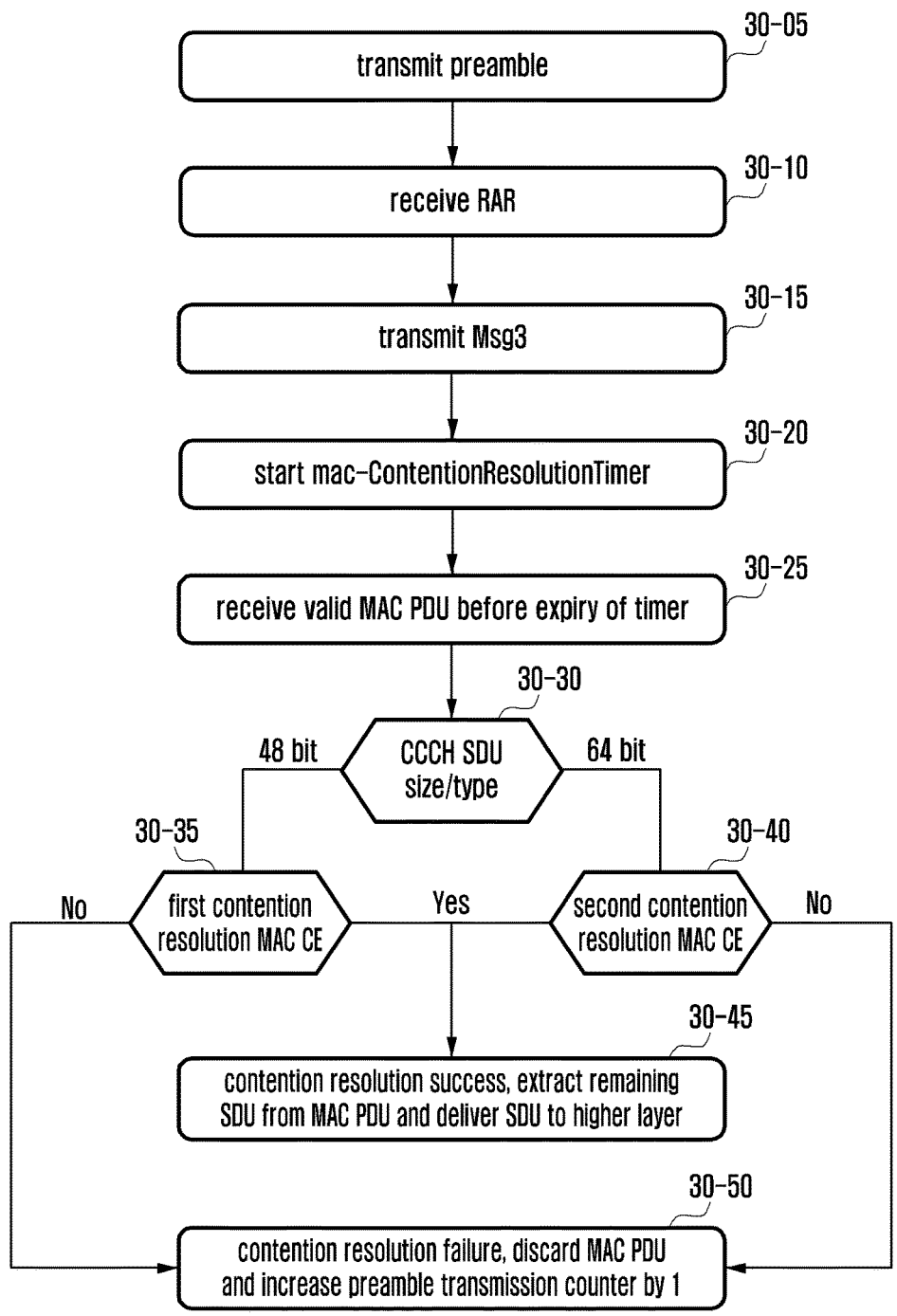
FIG. 30 is a flowchart illustrating operations of a UE according to the fourth embodiment of the present disclosure.

FIG. 30 is a flowchart illustrating operations of a UE according to the fourth embodiment of the present disclosure.

The UE selects one of available preambles and transmits the selected preamble at step 30-05, and receives a random access response message addressed with a Radio Network Temporary Identifier in response to the preamble at step 30-10. If the random access response message includes the preamble identifier indicating the preamble the UE has transmitted, the UE transmits a message 3 (Msg3) based on the information included in the random access response message at step 30-15.

The random access response message includes the information on the radio resources for Msg3 transmission, transmission timing for Msg3 transmission, and RNTI for use in receiving a contention resolution message. The Msg3 consists of a MAC header and a CCCH SDU as depicted in FIG. 21. The MAC header is 8 bits, and the CCCH SDU is 48 bits or 64 bits.

After transmitting the Msg3, the UE starts a timer, i.e., mac-ContentionResolutionTimer at step 30-20. This timer is used for determining whether the contention resolution fails. If no contention resolution is received before expiry of the timer, this means contention resolution failure. The timer value is broadcast in the system information.

The UE attempts to receive a MAC PDU with the RNTI carried in the Msg3 which the time is running. If a MAC PDU addressed by the RNIT is received before the expiry of the timer at step 30-25, the UE stops the mac-ContentionResolutionTimer and determines whether the MAC PDU includes a valid contention resolution MAC CE at step 30-30.

The procedure progresses from step 30-25 or 30-40 according to the type and size of the CCCH SDU of the Msg3 the UE has transmitted. If the CCCH SDU contains an RRC Connection Request message, RRC Connection Reestablishment Request message, or 48-bit (or TID-containing)

RESUME request message, the procedure goes to step 30-35; if the CCCH SDU contains the 64-bit (of FID-containing) RESUME request message, the procedure goes to step 30-40.

At step 30-35, the UE determines whether the MAC PDU includes the first contention resolution MAC CE and, if so, if the first contention resolution MAC CE is identical with the CCCH SDU carried in the Msg3. If both the two conditions are fulfilled, the procedure goes to step 30-45; if at least one of the two conditions is not fulfilled, the procedure goes to step 30-50.

At step 30-40, the UE determines whether the MAC PDU includes the second contention resolution MAC CE and, if so, if the second contention resolution MAC CE is identical with the CCCH SDU. If both the two conditions are fulfilled, the procedure goes to step 30-45; if at least one of the two condition is not fulfilled, the procedure goes to step 30-50.

That is, if the UE transmits the Msg3 including the 64-bit CCCH SDU (or Resume request message containing an FID), if the MAC PDU received by the UE includes the second contention resolution MAC CE, and if the second contention resolution MAC CE is identical with the CCCH SDU, the procedure goes to step 30-45. If the UE transmits the Msg3 including the 48-bit CCCH SDU (or Resume request, RRC Connection Request, or RRC Connection Reestablishment message including a TID, if the MAC PDU received by the UE includes the first contention resolution MAC CE, and if the first contention resolution MAC CE is identical with the CCCH SDU transmitted by the UE, the procedure goes to step 30-45.

At step 30-45, the UE determines that the contention resolution has succeeded and thus performs demodulation on the MAC SDU (e.g., RRC message) contained in the received MAC PDU to deliver the demodulated data to the higher layer entity and end the random access procedure.

At step 30-50, the UE determines that the contention resolution has failed, discards the received MAC PDU, increases a preamble transmission counter by 1, and performs a predetermined subsequent operation. For example, if the preamble transmission counter has not reached its maximum value, the UE returns to the preamble transmission step to repeat the random access procedure; if the preamble transmission counter has reached its maximum value, the UE determines that the random access procedure has failed and reports the random access failure to the higher layer.

As described above, the present disclosure is advantageous in terms of facilitating light connection in a mobile communication system.

Also, the present disclosure is advantageous in that a base station is capable of determining presence/absence of traffic offloaded to a WLAN in association with a terminal and acquiring more detailed information from the terminal to determine whether to the offloaded traffic on the WLAN or transfer to an LTE network.

Also, the present disclosure is advantageous in that a terminal is capable of using uplink resources allocated in a random access procedure for uplink asynchronous HARQ.

Also, the present disclosure is advantageous in terms of providing a procedure and method for allowing an ordinary terminal and a terminal operating in an extended coverage mode (NB-IOT UE, BL UE, UE in CE, or eMTC UE) to select a resume ID which is used for fast reconnection of the terminal disconnected from a network. Also, the present disclosure is advantageous in terms of reducing signaling overhead of RRC connection setup, security configuration, and Data Radio Bearer (DRB) configuration saving battery power of the terminal.

Furthermore, the multiple semi-persistent scheduling-based resource allocation method and apparatus for V2V communication according to the present disclosure is advantageous in terms of supporting the semi-persistent scheduling for V2V messages varying in size and amount and, as a consequence, reducing waste of radio resources between a terminal requesting for V2V communication and a base station allocating resources for V2V communication to the terminal.

In the embodiments of the present disclosures, the components are described in singular or plural forms depending on the embodiment. However, the singular and plural forms are selected appropriately for the proposed situation just for explanation convenience without intension of limiting the present disclosure thereto and thus singular form include the plural forms as well, unless the context clearly indicates otherwise.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   transmitting to a base station, a random access preamble;
   receiving, from the base station, a random access response message including an uplink grant in response to the random access preamble;
   identifying that the terminal is configured to use asynchronous hybrid automatic repeat request (HARQ) operation for an uplink HARQ operation; and
   transmitting, to the base station, a message using the uplink grant based on the identification that the terminal is configured to use the asynchronous HARQ operation for the uplink HARQ operation, wherein a HARQ process identifier "0" is used for an uplink transmission of the message using the uplink grant in the random access response message, and
   wherein a physical HARQ indicator channel (PHICH) is not used for the asynchronous HARQ operation associated with an uplink transmission of the message using the uplink grant included in the random access response message.

2. The method of claim 1, further comprising:
   receiving, from the base station, a physical downlink control channel (PDCCH) including the HARQ process identifier "0" and a new data indicator (NDI); and
   identifying whether the message has successfully received in the base station based on the HARQ process identifier "0" and the NDI.

3. The method of claim 2, further comprising:
   retransmitting, to the base station, the message with the HARQ process identifier "0" based on the identification that the message has not successfully received in the base station.

4. The method of claim 1, wherein the terminal is configured to use the asynchronous HARQ operation for a serving cell operating in an unlicensed band.

5. A method performed by a base station in a wireless communication system, the method comprising:
  receiving, from a terminal, a random access preamble;
  transmitting, to the terminal, a random access response message including an uplink grant in response to the random access preamble;
  identifying that the terminal is configured to use asynchronous hybrid automatic repeat request (HARQ) operation for an uplink HARQ operation; and
  receiving, from the terminal, a message using the uplink grant based on the identification that the terminal is configured to use the asynchronous HARQ operation for the uplink HARQ operation,
  wherein a HARQ process identifier "0" is used for an uplink transmission of the message using the uplink grant in the random access response message, and
  wherein a physical HARQ indicator channel (PHICH) is not used for the asynchronous HARQ operation associated with an uplink transmission of the message using the uplink grant included in the random access response message.

6. The method of claim 5, further comprising:
  transmitting, to the terminal, a physical downlink control channel (PDCCH) including the HARQ process identifier "0" and a new data indicator (NDI), wherein the HARQ process identifier "0" and the NDI is used to identify whether the message has successfully received in the base station.

7. The method of claim 6, further comprising:
  receiving, from the terminal, the message with the HARQ process identifier "0" based on the identification that the message has not successfully received in the base station.

8. The method of claim 5, wherein the terminal is configured to use the asynchronous HARQ operation for a serving cell operating in an unlicensed band.

9. A terminal in a wireless communication system, the terminal comprising:
  a transceiver; and
  a controller configured to:
    transmit, to a base station via the transceiver, a random access preamble,
    receive, from the base station via the transceiver, a random access response message including an uplink grant in response to the random access preamble,
    identify that the terminal is configured to use asynchronous hybrid automatic repeat request (HARQ) operation for an uplink HARQ operation, and
    transmit, to the base station via the transceiver, a message using the uplink grant based on the identification that the terminal is configured to use the asynchronous HARQ operation for the uplink HARQ operation,
  wherein a HARQ process identifier "0" is used for an uplink transmission of the message using the uplink grant in the random access response message, and
  wherein a physical HARQ indicator channel (PHICH) is not used for the asynchronous HARQ operation associated with an uplink transmission of the message using the uplink grant included in the random access response message.

10. The terminal of claim 9, wherein the controller is further configured to control the transceiver to receive, from the base station, a physical downlink control channel (PDCCH) including the HARQ process identifier "0" and a new data indicator (NDI), and to identify whether the message has successfully received in the base station based on the HARQ process identifier "0" and the NDI.

11. The terminal of claim 10, wherein the controller is further configured to control the transceiver to retransmit, to the base station, the message with the HARQ process identifier "0" based on the identification that the message has not successfully received in the base station.

12. The terminal of claim 9, wherein the terminal is configured to use the asynchronous HARQ operation for a serving cell operating in an unlicensed band.

13. A base station in a wireless communication system, the base station comprising:
  a transceiver; and
  a controller configured to:
    receive, from a terminal via the transceiver, a random access preamble,
    transmit, to the terminal via the transceiver, a random access response message including an uplink grant in response to the random access preamble,
    identify that the terminal is configured to use asynchronous hybrid automatic repeat request (HARQ) operation for an uplink HARQ operation, and
    receive, from the terminal via the transceiver, a message using the uplink grant based on the identification that the terminal is configured to use the asynchronous HARQ operation for the uplink HARQ operation,
  wherein a HARQ process identifier "0" is used for an uplink transmission of the message using the uplink grant in the random access response message, and
  wherein a physical HARQ indicator channel (PHICH) is not used for the asynchronous HARQ operation associated with an uplink transmission of the message using the uplink grant included in the random access response message.

14. The base station of claim 13, wherein the controller is further configured to control the transceiver to transmit, to the terminal, a physical downlink control channel (PDCCH) including the HARQ process identifier "0" and a new data indicator (NDI), wherein the HARQ process identifier "0" and the NDI is used to identify whether the message has successfully received in the base station.

15. The base station of claim 14, wherein the controller is further configured to control the transceiver to receive, from the terminal, the message with the HARQ process identifier "0" based on the identification that the message has not successfully received in the base station.

16. The base station of claim 13, wherein the terminal is configured to use the asynchronous HARQ operation for a serving cell operating in an unlicensed band.

17. A terminal in a wireless communication system, the terminal comprising:
  a transceiver; and
  a controller configured to control to:
    transmit, to a base station via the transceiver, a random access preamble,
    receive, from the base station via the transceiver, a random access response message including an uplink grant in response to the random access preamble,
    identify that the terminal is configured to use asynchronous hybrid automatic repeat request (HARQ) operation for an uplink HARQ operation, and
    transmit, to the base station via the transceiver, a message using the uplink grant based on a fixed HARQ process identifier according to the identification that the terminal is configured to use the asynchronous HARQ operation for the uplink HARQ operation, wherein only a HARQ process identifier "0" is used as the fixed HARQ process identifier for the asynchronous HARQ operation associated with an uplink transmission of the message using the uplink grant included in the random access response message, and wherein a physical HARQ indicator channel (PHICH) is not used for the asynchronous HARQ operation associated with an uplink transmission of the message using the uplink grant included in the random access response message.

18. A base station in a wireless communication system, the base station comprising:

a transceiver; and a controller configured to control to:
  receive, from a terminal via the transceiver, a random access preamble,
  transmit, to the terminal via the transceiver, a random access response message including an uplink grant in response to the random access preamble,
  identify that the terminal is configured to use asynchronous hybrid automatic repeat request (HARQ) operation for an uplink HARQ operation, and
  receive, from the terminal via the transceiver, a message using the uplink grant based on a fixed HARQ process identifier according to the identification that the terminal is configured to use the asynchronous HARQ operation for the uplink HARQ operation, wherein only a HARQ process identifier "0" is used as the fixed HARQ process identifier for the asynchronous HARQ operation associated with an uplink transmission of the message using the uplink grant included in the random access response message, and wherein a physical HARQ indicator channel (PHICH) is not used for the asynchronous HARQ operation associated with an uplink transmission of the message using the uplink grant included in the random access response message.

* * * * *